United States Patent
Encarnacion et al.

(10) Patent No.: US 7,555,543 B2
(45) Date of Patent: Jun. 30, 2009

(54) SERVER ARCHITECTURE FOR NETWORK RESOURCE INFORMATION ROUTING

(75) Inventors: Mark J. Encarnacion, Bellevue, WA (US); Jason Flaks, Bellevue, WA (US); Jai Srinivasan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 782 days.

(21) Appl. No.: 10/742,570

(22) Filed: Dec. 19, 2003

(65) Prior Publication Data

US 2005/0138192 A1   Jun. 23, 2005

(51) Int. Cl.
G06F 15/173   (2006.01)

(52) U.S. Cl. .................. 709/223; 709/224; 709/225; 709/226

(58) Field of Classification Search .......... 709/223–226
See application file for complete search history.

(56) References Cited

U.S. PATENT DOCUMENTS

| | | | |
|---|---|---|---|
| 5,966,135 A | 10/1999 | Roy et al. | |
| 6,192,415 B1 | 2/2001 | Haverstock et al. | |
| 6,430,624 B1 | 8/2002 | Jamtgaard et al. | |
| 6,564,257 B1 | 5/2003 | Emens et al. | |
| 6,643,650 B1 * | 11/2003 | Slaughter et al. | 707/10 |
| 6,839,748 B1 | 1/2005 | Allavarpu et al. | |
| 6,910,068 B2 * | 6/2005 | Zintel et al. | 709/220 |
| 6,925,483 B1 | 8/2005 | Niemi | |
| 7,120,585 B2 | 10/2006 | Boulanov | |
| 7,149,755 B2 | 12/2006 | Obrador | |

(Continued)

FOREIGN PATENT DOCUMENTS

JP   2003256260   9/2003

(Continued)

OTHER PUBLICATIONS

"TwonkyMedia—Features," available at <<http://www.twonkyvision.de/UPnP/>>, accessed on Nov. 8, 2005, 2 pages.

(Continued)

*Primary Examiner*—William C Vaughn, Jr.
*Assistant Examiner*—Maceeh Anwari
(74) *Attorney, Agent, or Firm*—Lee & Hayes, PLLC

(57) ABSTRACT

A media server in a Universal Plug and Play (UPnP) network includes a resource sharing service to govern the distribution of media resource information to rendering devices. The media server includes: a media service module operating in a clamped down user context (e.g., a local service user context) and configured to share resource information over the network; a supplemental module operating in a local system user context and configured to assist the media service module in sharing resource information over the network; and a control panel module operating in a logged on user context and configured to interact with a user via a user interface display. The local system user context provides a higher level of access to media server resources compared to the clamped down user context. The media server also provides fast user switching (FUS) functionality that allows multiple users to have respective instances of the control panel module pending at the same time. Further, the media server includes a mechanism to prevent rogue applications from masquerading as the control panel module and thereby gaining unauthorized access to the media service module.

39 Claims, 21 Drawing Sheets

U.S. PATENT DOCUMENTS

| | | | |
|---|---|---|---|
| 2002/0027569 A1 | 3/2002 | Manni et al. | |
| 2002/0029256 A1 | 3/2002 | Zintel et al. | |
| 2002/0077988 A1 | 6/2002 | Sasaki et al. | |
| 2002/0120577 A1 | 8/2002 | Hans et al. | |
| 2002/0161755 A1 | 10/2002 | Moriarty | |
| 2002/0161884 A1 | 10/2002 | Munger et al. | |
| 2002/0194604 A1 | 12/2002 | Sanchez et al. | |
| 2003/0097338 A1 | 5/2003 | Mankovich et al. | |
| 2003/0117433 A1 | 6/2003 | Milton et al. | |
| 2003/0135576 A1 | 7/2003 | Bodin | |
| 2003/0163811 A1* | 8/2003 | Luehrs | 725/25 |
| 2003/0233471 A1 | 12/2003 | Mitchell et al. | |
| 2004/0143667 A1 | 7/2004 | Jerome | |
| 2004/0148399 A1 | 7/2004 | Fenizia et al. | |
| 2004/0158823 A1 | 8/2004 | Saint-Hilaire et al. | |
| 2004/0172376 A1 | 9/2004 | Kobori et al. | |
| 2004/0220926 A1* | 11/2004 | Lamkin et al. | 707/3 |
| 2004/0243700 A1 | 12/2004 | Weast | |
| 2005/0044197 A1 | 2/2005 | Lai | |
| 2005/0058066 A1 | 3/2005 | Sung | |
| 2005/0091268 A1 | 4/2005 | Meyer et al. | |
| 2005/0125564 A1 | 6/2005 | Bushmitch | |
| 2005/0138137 A1 | 6/2005 | Encarnacion et al. | |
| 2005/0138179 A1 | 6/2005 | Encarnacion et al. | |
| 2005/0138192 A1 | 6/2005 | Encarnacion et al. | |
| 2005/0138193 A1 | 6/2005 | Encarnacion et al. | |
| 2005/0160458 A1 | 7/2005 | Baumgartner | |
| 2005/0166231 A1 | 7/2005 | Terakado et al. | |
| 2005/0188092 A1 | 8/2005 | Short et al. | |
| 2005/0198493 A1 | 9/2005 | Bartas | |
| 2005/0220139 A1 | 10/2005 | Aholainen | |
| 2005/0254524 A1 | 11/2005 | An | |
| 2006/0168225 A1 | 7/2006 | Gunning et al. | |
| 2007/0088832 A1 | 4/2007 | Tsang et al. | |
| 2007/0107016 A1 | 5/2007 | Angel et al. | |
| 2007/0156726 A1 | 7/2007 | Levy | |
| 2008/0077501 A1 | 3/2008 | Kamei et al. | |
| 2008/0090513 A1 | 4/2008 | Collins et al. | |

FOREIGN PATENT DOCUMENTS

| | | |
|---|---|---|
| WO | WO03098446 A1 | 11/2003 |

OTHER PUBLICATIONS

"RomPager Product Family," available at <<http://www.allegrosoft.com/products.html>>, accessed on Nov. 8, 2005, 2 pages.

"SimpleWare Media Server," available at <<http://www.simpledevices.com/mediaserver.shtml>>, accessed on Nov. 8, 2005, 2 pages.

"SoftPedia, Nero MediaHome," available at <<http://www.softpedia.com/get/Internet/File-Sharing/Nero-MediaHome.shtml>>, accessed on Nov. 8, 2005, 3 pages.

U.S. Appl. No. 11/192,510, entitled, "Strategies for Queuing Events for Subsequent Processing," filed on Jul. 29, 2005, naming the inventors of James H. Dooley, Jason S. Flaks, Mukal Gupta, Sean D. Kelly, and Charles Alan Ludwig.

Steinfeld, Edward F., "Devices that play together, work together," EDN, Sep. 13, 2001, pp. 65-70.

Steinfeld, Edward F., "Knock! Knock! 'Who's There?': Using UPnP to Respond to Inquiries," Circuit Cellular Online, May 2001, pp. 1-5.

Bell, Gordan et al., "A Call for the Home Media Network," Communications of the ACM, vol. 45, No. 7, Jul. 2002, pp. 71-75.

Universal plug and Play Device Architecture: Version 1.0, Microsoft Corporation, Jun. 8, 2000, available at <http://www.upnp.org./download/UPnPDA10_20000613.htm>, 52 pages.

"Understanding Universal Plug and Play," Jun. 2000, Microsoft Corporation, available at <http://www.upnp.org/download/UPNP_UnderstandingUPNP.doc>, 39 pages.

"MediaServer:1 Device Template Version 1.01," Microsoft Corporation, Jun. 25, 2002, available at <http://www.upnp.org/download/MediaServer%201.0.pdf>, 12 pages.

"MediaRenderer:1 Device Template Version 1.01," Microsoft Corporation, Jun. 25, 2002, available at <http://www.upnp.org/download/MediaRenderer%201.0.pdf>, 11 pages.

"UPnP AV Architecture:083," Microsoft Corporation, Jun. 12, 2002, available at <http://www.upnp.org/download/UPnPAvArchitecture%200.83.prtad.pdf>, 22 pages.

"ConnectionManager:1 Service Template Version 1.01," Microsoft Corporation, Jun. 25, 2002, available at <http://www.upnp.org/download/ConnectionManager%201.0.pdf>, 25 pages.

ContentDirectory:1 Service Template Version 1.01, Microsoft Corporation, Jun. 25, 2002, available at <http://www.upnp.org/download/ContentDirectory%201.0.prtad.pdf>, 89 pages.

MSDN Library introductory page entitled "UPnP Framework," Microsoft Corporation, accessed on Oct. 19, 2003, available at <http://msdn.microsoft.com/library/default.asp?url=/library/en-us/wceupnps/html/_wcecomm_win32_UPnP_Framework.asp>, 1 page.

MSDN Library entry entitled "Fast User Switching," Microsoft Corporation, accessed on Oct. 30, 2003, available at <http://msdn.microsoft.com/library/default.asp?url=/library/en-us/directx9_c/directx/play/understand/voice/userswitching.asp>, 1 page.

MSDN Library entry entitled "The LocalSystem Account," Microsoft Corporation, accessed on Feb. 6, 2004, available at <http://msdn.microsoft.com/library/default.asp?url=/library/en-us/ad/the_localsystem_account.asp>, 1 page.

MSDN Library entry entitled "The LocalService Account," Microsoft Corporation, accessed on Oct. 30, 2003, available at <http://msdn.microsoft.com/library/default.asp?url=/library/en-us/dllproc/base/localservice_account.asp>, 2 pages.

"DeviceSecurity:1 Service Template, For UPNP Device Architecture 1.0" Retrieved from the internet <<http://www.upnp.org/standardizeddcps/documents/DeviceSecurity_1.0cc_001.pdf>> on Nov. 17, 2003.

* cited by examiner

| Control 208 | Eventing 210 | Presentation 212 |
|---|---|---|
| Description 206 ||||
| Discovery 204 ||||
| Addressing 202 ||||

Fig. 2 (Prior Art)

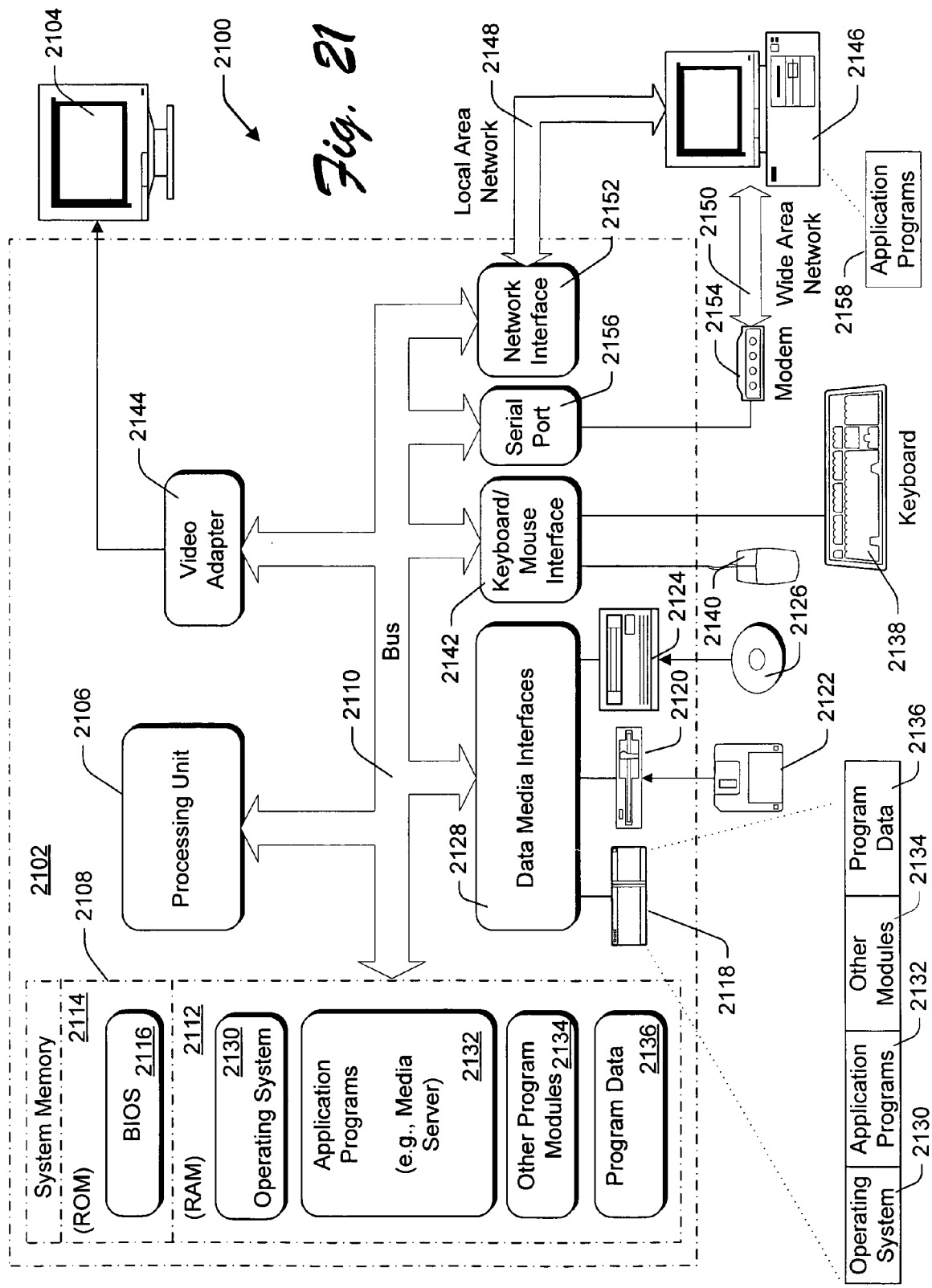

SERVER ARCHITECTURE FOR NETWORK RESOURCE INFORMATION ROUTING

CROSS-REFERENCE TO RELATED APPLICATION

The present application is related to co-pending U.S. patent application Ser. No. 10/742,588, entitled "Routing of Resource Information in a Network," U.S. patent application Ser. No. 10/742,635, entitled "Using Parameterized URLs for Retrieving Resource Content Items," and U.S. patent application Ser. No. 10/741,706 entitled "Techniques for Limiting Network Access." All of these applications were filed on the same date as the instant application, and all name the same inventors as the instant application.

TECHNICAL FIELD

This subject matter relates to an architecture and associated techniques for routing resource information to recipients via a network, and, in a more particular implementation, to a media server architecture and associated techniques for selectively routing resource metadata and resource content to recipients via a local network, such as a home network.

BACKGROUND

Universal Plug and Play (UPnP) provides a network architecture that facilitates adding and removing devices from a network. For instance, the UPnP architecture allows a user to simply "plug" a new device into a network coupling; thereafter, the network will automatically determine the new device's characteristics and subsequently coordinate interaction between this new device and others in the network based on the determined characteristics. The UPnP architecture is particularly well suited for networks associated with a local setting, such as a home, a business, a school, etc. (Note that the term "Universal Plug and Play" derives from functionality provided in the earlier developed device Plug and Play (PnP); device PnP provides a flexible technique for automatically adding and removing peripherals to a standalone computer device, such as a PC).

FIG. 1 presents high level information regarding an exemplary UPnP architecture 100. By way of overview, the UPnP architecture 100 includes a plurality of devices (e.g., devices 102, 104, and 106) and control points (e.g., control points 108 and 110) coupled together via a network 112.

The UPnP devices (102, 104, and 106) can include a variety of electronic devices. Exemplary devices include computers of all types, CD/DVD players/jukeboxes, TVs, VCRs, MP3 players, stereo systems, electronic picture frames (EPFs), various types of still and video cameras, and so on. More specifically, a so-called UPnP device conceptually defines a container that can include actual devices, services, etc. A service, in turn, defines various functions performed by a UPnP device that are made available to other UPnP devices. For instance, one exemplary service might pertain to a chronological function provided by a clock. In general, a service models its functionality using state variables and exposes various actions associated with the model to other UPnP devices. In the exemplary case of FIG. 1, the UPnP device 102 includes an actual device 114 that provides a service 116. UPnP device 104 includes an actual device 118 that provides services 120 and 122. UPnP device 106 includes an actual root device 124 that provides services 126 and 128. The root device 124, in turn, includes an embedded device 130 that provides a service 132.

The network 112 can couple the devices (102, 104, 106) together using the Transmission Control Protocol and the Internet Protocol (TCP/IP). The network 112 can also freely draw from a number of other standard protocols, such as Hypertext Transfer Protocol (HTTP), Simple Object Access Protocol (SOAP), General Event Notification Architecture (GENA), and so on. The network 112 can be physically implemented using a variety of hardwired and/or wireless communication mechanisms, such as phone lines, power lines, Infrared Data Association (IrDa), Ethernet, Radio Frequency (RF) coupling, and so on.

Finally, the control points (108, 110) define agents that can discover and control other UPnP devices. A UPnP device may itself include one or more control points integrated therewith.

FIG. 2 illustrates conventional functions performed by the UPnP architecture 100 arranged in hierarchical layers. An addressing function 202 pertains to procedures whereby devices and control points receive addresses to interact with the network 112. More specifically, a device or control point can receive an address from a Dynamic Host Configuration Protocol (DHCP) server or using an Auto IP assignment procedure (e.g., if no DHCP server is available). The Auto IP procedure provides a technique for intelligently selecting an IP address from a set of private reserved addresses.

A discovery function 204 pertains to procedures whereby devices advertise their services to control points. Devices can perform this advertisement by sending out a multicast variant of HTTP (i.e., HTTP-MU). A control point subsequently responds using HTTPU (i.e., a unicast variant of HTTP). The discovery function 204 makes use of General Event Notification Architecture (GENA) and Simple Device Discovery Protocol (SSDP) to carry out the above-noted exchange between UPnP devices and control points. Further, a newly added control point can also search for UPnP devices and services coupled to the network.

A description function 206 pertains to a procedure whereby a control point that has discovered a UPnP device can determine more information regarding the UPnP device. The UPnP device responds by sending information to the control point, where such information is presented, using the extensible markup language (XML). Such information defines details regarding the type of UPnP device (e.g., manufacturer, model name and number, serial number, etc.), the services it offers, uniform resource locators (URLs) for interacting with the device, and so on.

A control function 208 involves transmitting a control message from the control point to the UPnP device. The UPnP architecture 100 uses SOAP to transmit this message. SOAP messages contain action requests. The UPnP device executes the action specified in the SOAP message and then responds to the control point. The response contains action-specific values or fault codes.

An eventing function 210 pertains to a procedure whereby a control point monitors events associated with services provided by the UPnP architecture 100. More specifically, a service can send an event when its model changes state. The process of "publishing" these state changes is referred to as eventing. The control point can subscribe to receive various events by sending a subscription message to a service of interest.

Finally, a presentation function 212 entails retrieving a page of information from a UPnP device using a presentation URL associated with this UPnP device. The control point can initiate the presentation process by issuing an HTTP GET request to the UPnP device. The presentation function 212 allows a user to view the status of the device and/or control the device.

The UPnP Forum's web site (i.e., http://upnp.org/) provides more detailed information regarding the UPnP architecture and related topics.

As mentioned above, UPnP devices are commonly used in relatively localized network environments, such as in a home or business. In the home environment, for instance, a network including UPnP devices may interconnect a collection of media source devices and a collection of media rendering devices. An exemplary media source device might comprise a personal computer that stores a collection of music, video, pictures, etc., or may comprise various types of jukebox devices. An exemplary media rendering device might comprise a TV, stereo, personal computer, and so on. A control point (such as a personal computer) can then be used to route resource information from one of the media source devices to a selected media rendering device.

However, existing networks that include UPnP devices do not perform the above-described transfer of resource information in a well-controlled, secure, and responsible fashion. For instance, suppose that a design engineer opts to implement the media server using a personal home computer (PC). In this case, the design engineer may configure the media server such that all of its functionality can be accessed based on a single PC-wide security paradigm. However, as appreciated by the present inventors, a UPnP media server provides a myriad of different functions, and different security levels may apply to these different functions. Therefore, the tactic of applying a single security paradigm to the entire UPnP media server may necessitate selecting a sufficiently low security level for all of the functions provided by the media server so as to ensure access to all of the functions. This has the drawback of potentially jeopardizing the security of critical resources and functions (associated with the media server, the computer system that implements the media server, the that network that the media server is coupled to, and so on), and thus potentially allowing unauthorized entities to gain access to the UPnP media server's private media files. Alternatively, the design engineer may choose to omit certain functions in order to accommodate the use of a single security paradigm. This has the obvious disadvantage of reducing the utility of the media server.

Known UPnP media server solutions also suffer from additional deficiencies and drawbacks. For instance, known UPnP media servers do not provide functionality for accommodating modem computing techniques, such as fast user switching (FUS). The FUS technique provides a convenient technique for switching between different sessions associated with different respective users. For example, the technique allows a first user to connect to a computer and run an application, followed by a second user who runs another application. When the second user connects to the computer, the computer will save an application instance associated with the first user's session. When the first user connects to the computer again, the computer will restore the settings and applications associated with the first user's computer session at the time he or she disconnected. Accordingly, FUS provides functionality that can record multiple application instances associated with any number of respective users. Known UPnP media servers do not provide a mechanism for integrating the FUS technique with their UPnP functionality.

Accordingly, there is an exemplary need in the art to provide a more secure and/or versatile media server for use in networks that include UPnP devices, or analogous computing environments.

SUMMARY

According to one exemplary implementation, a server for disseminating resource information over a network is described. The server includes a media service module operating in a first user context and configured to share resource information over the network. The serve also includes a supplemental module operating in a second user context and configured to assist the media service module in sharing resource information over the network.

According to one exemplary feature, the server can further include a configuration and control panel module operating in a third user context and configured to interact with a user.

According to another exemplary feature, the first user context is a clamped down user context that provides an associated first level of access to resources provided by the server. The second user context is a local system user context that provides an associated second level of access to resources provided by the server, wherein the second level of access is greater than the first level of access. And the third user context is a logged on user's user context that provides a level of access associated with a user who has logged onto the server.

Additional exemplary implementations are described in the following.

BRIEF DESCRIPTION OF THE DRAWINGS

FIG. 2 shows a conventional series of functions provided by the UPnP architecture shown in FIG. 1.

FIG. 21 shows an exemplary computer environment for implementing the media server of FIG. 5.

Figure 1:
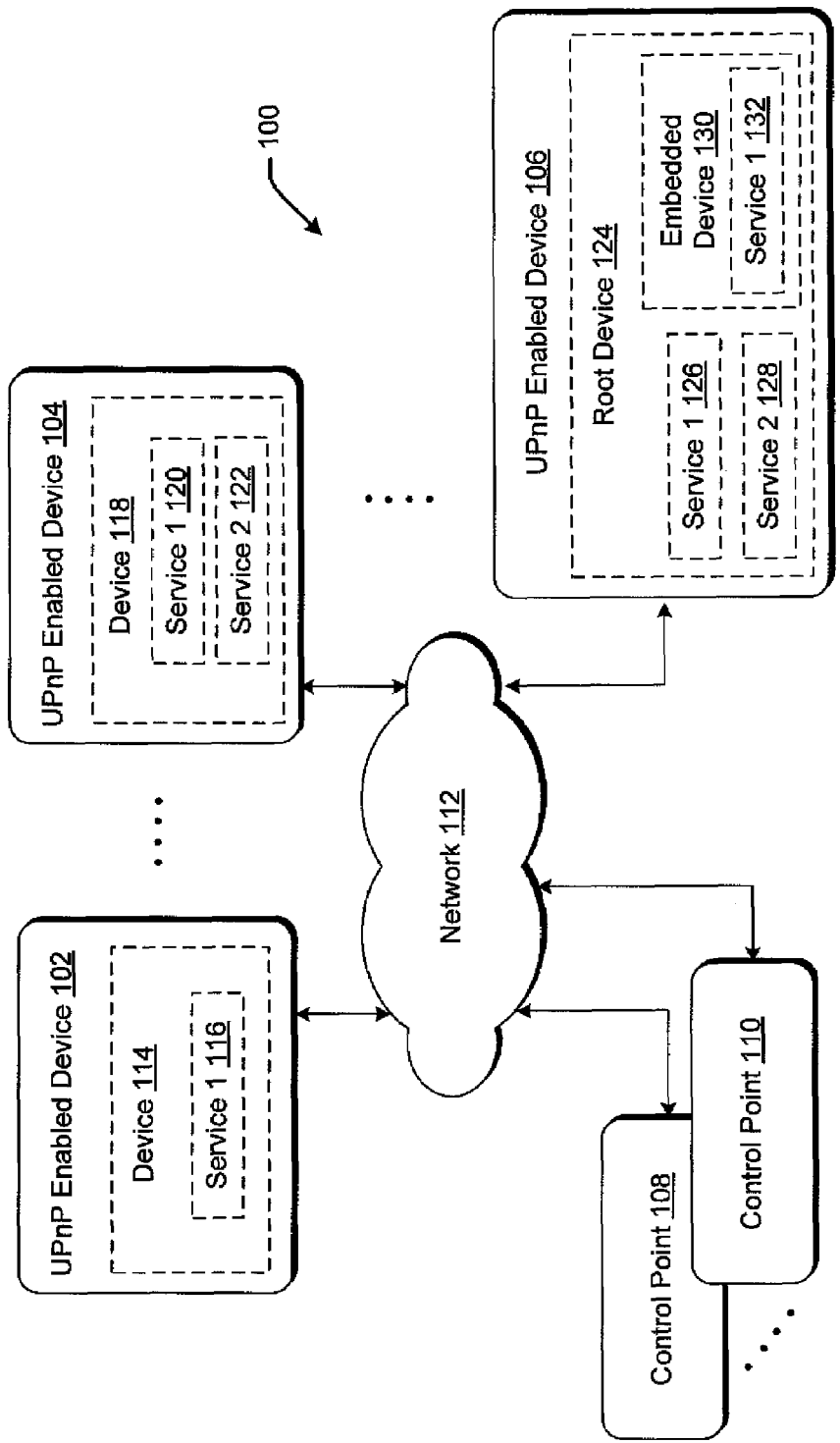
FIG. 1 shows a conventional UPnP architecture including a plurality of devices and control points.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

To facilitate explanation, the following discussion will describe resource information distribution functionality in terms of the Universal Plug and Play (UPnP) architecture. As used herein, the term "UPnP network" describes a network (such as the exemplary UPnP network 314 shown in FIG. 3) that has one or more entities (e.g., devices) that are built in accordance with the UPnP architecture, where the UPnP protocol is used for announcement, discovery, description, eventing and control of these entities. In the present architecture, other entities besides entities that are built in accordance with the UPnP architecture can be coupled to the UPnP network 314. However, this specific network framework is merely exemplary. The resource information distribution functionality can be implemented using other kinds of architectures and networks (that is, the functionality is not limited to networks that include UPnP entities).

More specifically, as will be described shortly, the UPnP network 314 can include one or more source entities which supply information to one or more recipient entities. The UPnP network 314 can optionally include one or more control point entities for coordinating the transfer of information from the source entity(ies) to the recipient entity(ies), and for performing other functions. For example, a source entity can comprise a media server, or some other kind of device. A recipient entity can comprise a control point device, a media rendering device, or some other kind of device. Generally, the terms "entity" and "device" should be construed broadly herein; these terms can refer to discrete standalone units for performing ascribing tasks, or can comprise systems composed of multiple units, or can comprise hardware and/or software components contained within units, and so on. To simplify the discussion, the term "device" is used in this section to describe any kind of module coupled to the UPnP network 314. (Further, the media server devices are also referred to as "media servers" to simplify the discussion.)

Further, to provide a concrete example, the following discussion will describe the resource information distribution functionality in the home context, where a person in the home uses the UPnP network 314 to interconnect multiple media server and media rendering devices within the home However, the resource distribution functionality can be applied to any environment, including a business environment (e.g., within a corporation), an academic environment (e.g., within a school or university), and so on.

Further, a UPnP network 314 typically couples devices together in a relatively small and well-defined geographic area (e.g., within a building). However, the resource information distribution functionality can be applied to more regionally encompassing environments.

Figure 3:
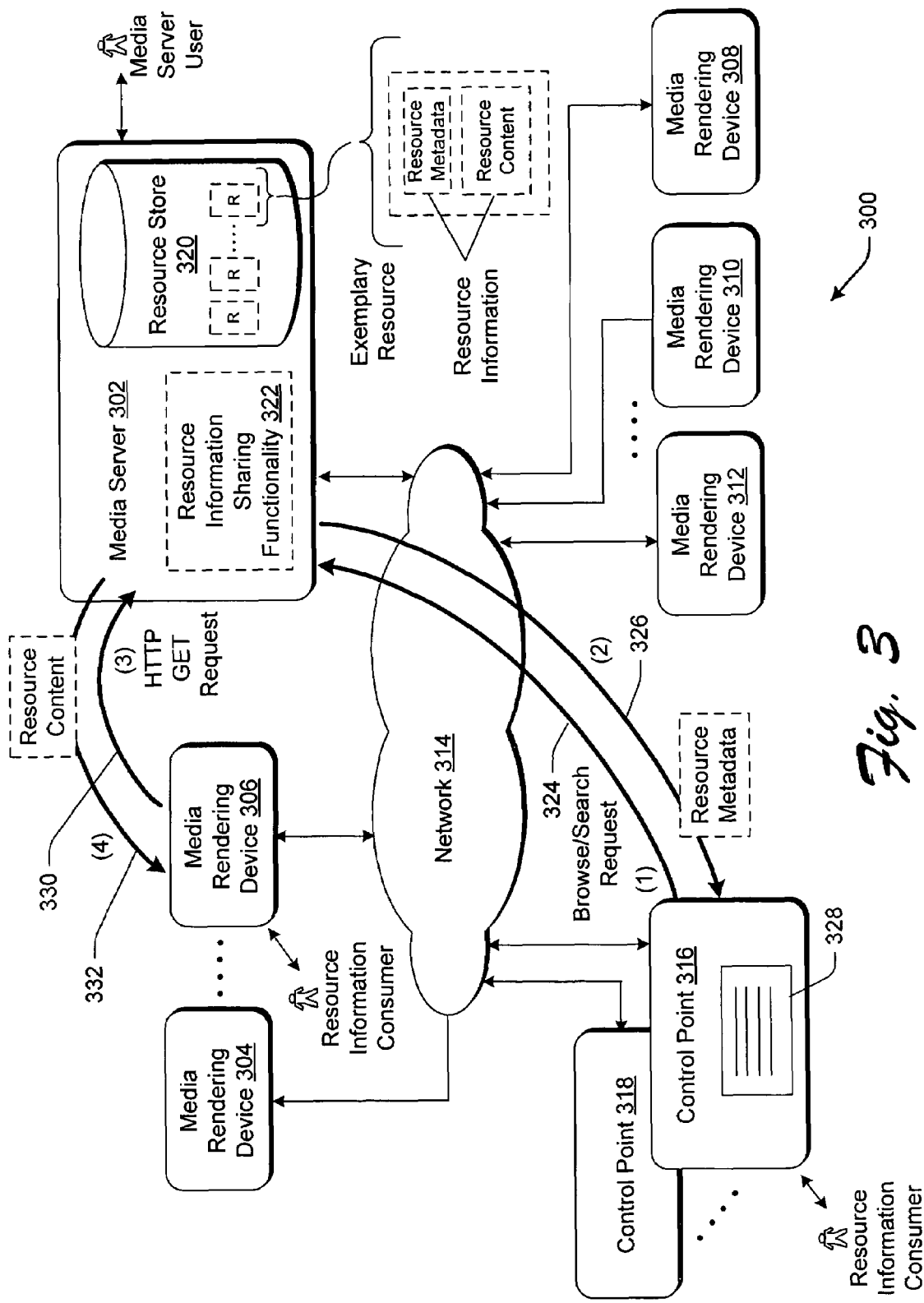
FIG. 3 shows an exemplary network architecture including resource sharing.

Further, in the following discussion, a "resource" refers to any unit of information. For instance, a resource may correspond to a single file, or may correspond to just part of a file, or may correspond to a collection of multiple files. For example, suppose that a resource corresponds to a song. That song can be stored in a single file, stored in only part of a single file, or stored in several files (where these several files may also combine streams from other songs). More specifically, as illustrated in FIG. 3 (note the far right portion of the drawing), an exemplary resource (R) stored in a resource store (to be described below) can include various information components, referred to generally herein as "resource information." One such component of the resource information is "resource metadata." Resource metadata contains high level information regarding the resource, such as title of the resource, artist associated with the resource, date the resource was created, and so on. Another component of the resource information is "resource content." Resource content contains the data which the resource metadata describes. For instance, the resource content of an audio resource would correspond to the audio data for playback to a consumer. (In portions of this disclosure, the term "resource content item" is used to refer to the resource content associated with a particular resource; the use of the term "item" here reflects simply a matter of grammatical convenience to clarify the usage of the term "resource content" in certain contexts.) Finally, the following description will frequently make reference to the transfer of "resource content" to a rendering device for presentation at that rendering device. This transfer does not exclude the transfer of additional information regarding the resource besides the resource content; the transfer of resource content can also include, for instance, resource metadata, which accompanies the resource content.

Moreover, a resource can itself be a collection of individual member resources. For example, a resource can constitute a so-called resource container or a resource folder, or other kind of collection of resources. As will be discussed, a resource container refers to a grouping of one or more member resources that a media server uses to internally manage these member resources. A resource folder refers to a grouping of one or more member resources that the media server makes "visible" to a user. For instance, the media server can include a user interface display (or other presentation mechanism) that can present multiple resource folders, each of which can include one or more member resources. However, the media server can internally manage these member resources in the context of resource containers. The allocation of information in resource folders generally differs from the allocation of information in the resource containers, but, in an alternative implementation, the allocation can be the same. (Further, the media server can optionally allow a user to view information regarding the resource containers and their respective member resources and to perform various actions on a per-container basis rather than, or in addition to, a per-folder basis.) Any collection (either a resource container or a resource folder) can itself include member "child" collections (that is, respective child resource containers or child resource folders).

A particular kind of resource collection is a resource playlist. This resource can be implemented as a file that refers to a list of audio, video and/or photo resources (or other kinds of resources).

The above examples describe merely a few of the manifestations that a resource can assume; generally, the term resource abstractly denotes any aggregation of information based on any considerations.

In one implementation, resources can correspond to media resources, such as audio resources (e.g., music, audio books, etc.), video resources, picture resources (e.g., digital photos), and so on. However, the principles described herein can be used to distribute any kind of information for any purpose.

The term "processing" referred to herein can pertain to a wide variety of actions. In one case, the term "processing" refers to actions used to modify the information being processed. In another case, the term "processing" refers to actions used to simply handle information being processed, or to make decisions regarding information being processed. These are merely a few examples of a wide variety of types of actions that this term can encompass.

Further still, any entity that interacts with the media server described herein for the purpose of performing various administrative tasks (such as defining shared resources) is referred to herein as a "media server user." A media server user can pertain to a human operator that interacts with the media server, or can represent some other entity, including logic functionality configured to interact with the media server. In an exemplary implementation, a media server user is presumed to be logged onto the media server. In one implementation, a user logs onto the media server by providing identity information to the media server, upon which, the media server, if so configured, authenticates the user (for example, by requiring the user to supply a password or some other form of authentication). Other implementations of the media server may not require the user to furnish their identity for the purpose of interacting with the media server. As will be described below, the status of a logged on media server user session can be active or inactive.

Any entity that requests resource information from the media server is referred to as a resource information consumer (referred to, for brevity, as simply a "consumer" below). A consumer can request resource metadata and/or resource content from the media server. A consumer may represent a human operator who wishes to interact with the media server from a control point or a rendering device, or can represent some other entity, including logic functionality configured to interact with the media server. In the case of a human operator, the same person can function as both a media server user and a consumer; alternatively, different individuals can assume these two respective roles.

Finally, a number of examples will be presented in this disclosure in the alternative (e.g., A or B). In addition, this disclosure encompasses those cases which combine alternatives in a single implementation (e.g., A and B), even though this disclosure may not expressly mention these cases each time.

This disclosure includes the following sections:
A. Exemplary System for Implementing Resource Sharing
   A.1. Overview of the System
   A.2. Exemplary Application of the System
   A.3. Media Server Architecture Overview
      a. Media Service Module
      b. Content Directory Device Monitor (CDDM) Module
      c. User Interface Module
   A.4. Fast User Switching Provisions
   A.5. Additional Security Provisions
      a. IP Address Limiting
      b. MAC Address Authentication
      c. Subnet Limiting
      d. TTL limiting
      e. Device and Session Limiting
      f. Limiting Candidate Devices for Authentication to UPnP Actions
      g. Resource Locator Retirement
      h. Various Server Security Measures
   A.6. URL Parameterization Provisions
B. Exemplary User Interface (UI) Presentations
   B.1. Exemplary UI for Authorizing New Devices
   B.2. Exemplary UI for Sharing Resources
C. Exemplary Processes
   C.1. Device Authorization Processes
   C.2. Resource Sharing Processes
      a. Defining Shared Resources
      b. Distributing Shared Resources Based on a Request
      c. Processing of Parameterized URLs
D. Exemplary Computer Environment A. Exemplary System for Implementing Resource Sharing A.1. Overview of the System FIG. 3 describes an exemplary network architecture 300 including resource information sharing. The network architecture 300 includes a plurality of UPnP devices (302-312) (referred to as simply "devices" below for brevity) coupled together via a UPnP network 314. The devices (302-312) include the above-mentioned media server 302 and a plurality of media rendering devices (304-312). Exemplary media servers can include various types of computers, various kinds of jukeboxes, and so on. Exemplary rendering devices can include various types of computers, stereo system, speakers, TVs, hand-held audio players, and so on. (Although only one media server 302 is shown, the network 314 can include any number of media servers. Further, although plural media rendering devices 304-312 are shown, the network 314 can include only one media rendering device, or possibly no media rendering devices.)

The UPnP network 314 also optionally includes one or more control points (e.g., control points 316, 318). The control points (316, 318) can be integrated with one of the UPnP devices (302-312). That is, for instance, a rendering device can also include control point functionality for interacting with the media server 302. Alternatively, one or more control points can be implemented separate from the UPnP devices (302-312). An exemplary control point may be implemented using various types of computers, Personal Digital Assistants (PDAs), application specific logic modules, and so on. Collectively, the media rendering devices (304-312) and control points (316, 318) can serve as resource information recipient entities, among other roles, meaning, as will be described below, that they can receive resource information provided by the media server 302.

The UPnP network 314 can use any combination of protocols to transfer information between the UPnP devices (302-312, 316, 318), such as TCP/IP, SOAP, GENA, HTTP, and so on. It can further include any combination of gateways, routers, hardwired links, wireless links (e.g., radio frequency links), and so on (not shown).

By way of overview, when a new UPnP media rendering device joins the UPnP network 314, it announces its presence to the media server 302. Say, for example, this new media rendering device corresponds to exemplary device 306 shown in FIG. 3. The media server 302, in turn, alerts the user of the media server 302 (i.e., the "media server user") to the presence of the new media rendering device 306. As will be discussed in greater detail below, the media server 302 can determine the identity of the new media rendering device 306 by translating a received IP address corresponding to the new device 306 into its media access control (MAC) address, or by using some other identification/approval mechanism. The media server 302 then gives a media server user the option of enabling this new device 306. If enabled, this new device 306 becomes an accepted member of the suite of devices that the media server 302 is permitted to transfer resources to.

In the media transfer operation itself, the media server 302 routes resource information corresponding to resources provided in a resource store 320 to a resource information recipient entity coupled to the network 314. Broadly stated, to perform this operation, a consumer can first use a control point (such as control point 316) or other device to investigate the resource information corresponding to resources provided in the resource store 320 of the media server 302. For instance, this operation may entail investigating the resource metadata of the resources, such as the titles of available resources, and other high level information regarding the resources. After such investigation, the consumer can select resource content associated with a resource for presentation at a selected rendering device, such as the media rendering device 306. The control point 316 can thereafter provide a role in setting up the transfer of the resource content from the media server 302 to the selected rendering device 306. In one implementation, the UPnP architecture 300 uses a non-UPnP protocol to actually execute the transfer of resource content from the media server 302 to the rendering device 306, such as, but not limited to, the HTTP protocol.

To perform the above-summarized functions, the media server 302 includes resource information sharing functionality 322. The following discussion describes high level features of the resource information sharing functionality 322. Section A.3 describes the operation of the resource information sharing functionality 322 in greater detail.

To begin with, the routing procedure can involve the task of defining resources to be shared over the network 314. In one exemplary implementation, the media server 302 is configured to designate shareable resources in units of collections, such as resource folders. That is, the resource information sharing functionality 322 can "earmark" a resource folder as shareable, allowing at least some of the resources contained therein to be shared out over the network 314 (based on the considerations discussed below). The resource information sharing functionality 322 can perform this function via one or more UI pages that allow the media server user to define the shareable status of shared folders. Section B describes these UI pages in greater detail. Generally, inheritance applies to the shareable status of resources within a hierarchical organization of resources. That is, a resource folder can be viewed as a parent resource that contains one or more individual member resources that constitute child resources. The resource folder may also include subfolders, each of which can include member child resources. Designating a parent resource as shareable will generally have the effect of also designating its child resources as shareable, including all of its member resources and subfolders. However, the resource information sharing functionality 322 can also be configured to operate according to different inheritance paradigms. For instance, in one alternative case, the shareable status of a parent resource may not automatically apply to its subfolders.

Also, the resource information sharing functionality 322 can be configured to allow the user to remove the shareable status of resources (e.g., to "unshare" the resources). For example, in one case, unsharing a parent resource will have the effect of unsharing its child resources. In one case, the resource information sharing functionality 322 can prohibit the media server user from unsharing a child resource when its parent is designated as shareable. In another case, the resource information sharing functionality 322 will allow the media server user to selectively designate a shared child resource as unshared, therefore overriding the inheritance scheme described above.

Many other strategies can be employed to share resources, the above listing being merely a representative sampling of possibilities. For instance, the resource information sharing functionality 322 can be configured to allow the media server user to designate resources as shareable on an individual resource level (instead of, or in addition to, on a resource collection level). Further, the resource information sharing functionality 322 can be configured to allow the media server user to designate other kinds of collections as shareable.

According to another exemplary feature, and as described in greater detail in Section C, the media server 302 can place other constraints on the kinds of resource information that it shares out. For example, the media server 302 can share resource information obtained from only certain kinds of known media files. Also, the media server 302 can refuse to share resource information obtained from a file stored on a removable drive, a network share, and so on. By confining the sharing to resource information obtained from a known "universe" of expected resources, the likelihood of unauthorized access to the UPnP network 314 is reduced.

The resource information sharing functionality 322 also allows the media server user to define distribution criteria that can be optionally used to control the routing of the resource information (including both resource metadata and resource content). For instance, as a first distribution criterion, the resource information sharing functionality 322 allows a media server user to restrict the transfer of resource information to certain resource information recipient entities. As a second distribution criterion, the resource information sharing functionality 322 allows a media server user to make the transfer of resource information conditional on whether a specified individual needs to consent to the transfer. For instance, the media server 302 can be configured such that this criterion is implicitly satisfied if the specified individual is logged onto the computer which implements the media server 302 (and the individual's terminal session is active). This feature can be set up to consider the media server user logged on only when the user directly interacts with the console that implements the media server 302, rather than remotely interacts with the console (e.g., via a network connection); in another implementation, however, the media server user can be considered to be logged on even when they are only logged on via a remote connection. In another case, the media server 302 can be configured such that this criterion is satisfied only when the specified individual expressly confirms that the transfer is acceptable (such as when the specified individual responds affirmatively to a UI query regarding the propriety of the transfer). In one exemplary implementation, the above-described "individual" corresponds to a media server user who has designated a resource associated with the distribution criterion as shareable over the network. These two criteria are merely illustrative; the resource information sharing functionality 322 can impose additional criteria for governing the transfer of resource information. For instance, an additional criterion may include a time of day restriction that limits access privileges to resource information to certain times of the day. The resource information sharing functionality 322 can provide one or more UI pages for use in defining the distribution criteria that govern the distribution of resource information, as will be described in Section B (below).

In one implementation, a first set of distribution criteria may apply to the transfer of resource metadata, and another set of distribution criteria may apply to the transfer of resource content. The first set may differ from the second set. This means, for example, that different restrictions apply to merely looking at the titles of resources compared to actually retrieving the resource content itself. Alternatively, the first set of distribution criteria may be the same as the second set of distribution criteria. However, even if the distribution criteria are the same, this may still have the effect of allowing a consumer to view the resource metadata but not the resource content; this is because, for example, the consumer may receive the resource metadata at a control point that is authorized by the distribution criteria to receive the resource metadata, but the consumer seeks to play the resource content on a rendering device that is prohibited by the distribution criteria from receiving the resource content. Additional variations on this strategy are envisioned. For instance, the resource information sharing functionality 322 can provide a single set of distribution criteria. This single set can exclusively govern the dissemination of resource metadata or resource content, or both.

According to one exemplary implementation, the resource information sharing functionality 322 specifies distribution criteria in the context of collections of resources, rather than individual resources. For instance, as explained above, the media server user can use the above-described UI pages to group a collection of resources into a resource folder, and then designate that the resource information (metadata, content, or both) associated with the resources in this resource folder is to be shared to other devices coupled to the UPnP network 314 provided that certain criteria are met. That shared resource folder may also include one or more subfolders, each including one or more resources. The same kind of parent-child inheritance schemes described above can be used to govern the application of distribution criteria to hierarchies of resources. For instance, the distribution criteria established for the resource folder could apply to each subfolder and resource (e.g., file) in the resource folder. Alternatively, the resource information functionality 322 can be configured such that the distribution criteria associated with a resource folder apply to only a subset of resources in the resource folder; for instance, the resource information functionality 322 can be configured such that the distribution criteria only apply to individual resources in the resource folder, but not to resources in any subfolders that the resource folder may contain. More generally, the resource information sharing functionality 322 can be configured to override the above-described parent-child inheritance scheme in various circumstances.

Again, the above-described schemes are merely exemplary and representative. Many other permutations exist. For instance, the resource information functionality 322 can allow the media server user to "attach" distribution criteria to individual resources in a resource folder, or to remove the distribution criteria from individual resources. Alternatively, or in addition, the media server 302 can designate distribution criteria for resource containers instead of resource folders. As will be described in greater detail in the context of FIG. 6, resource containers refer to collections that are internally used by the media server 302 to manage its resources, whereas resource folders refer to the collections that the media server user directly interacts with. The media server 302 can reorganize resources grouped into folders to create the containers.

According to another exemplary feature, the resource information sharing functionality 322 can allow media server users to define different sets of distribution criteria. For instance, different users can define different respective sets of distribution criteria. The resource information sharing functionality 322 can automatically invoke one of these sets of distribution criteria when its associated user logs onto the computer system that implements the media server 302. Alternatively, a single media server user can define different sets of distribution criteria. The media server user can invoke one of these sets to best suit a particular prevailing operating environment. For instance, a media server user can activate a first set of distribution criteria that apply on weekends when the media server user is expected to be home during the day, and another set on week days, when the media server user is not expected to be home during the day. Alternatively, one set of distribution criteria can be merged with another set, such that the both sets apply at any given time. Rules can be configured to work out potential conflicts between the sets. Again, these are merely representative and exemplary scenarios; many other permutations of this design strategy can be implemented.

Other implementations can place additional restrictions on the above-described scenarios. In one exemplary implementation, the resource information sharing functionality 322 can allow a media server user to add or modify distribution criteria only for those resources that this particular media server user has designated as shareable.

According to another feature, the resource information sharing functionality 322 can "hard code" one or more distribution criteria, such that these distribution criteria automatically apply without the user having to define them via a UI page (or through other mechanisms). In addition, a number of factors were described above for initially determining whether a resource is shareable or not, such as the factor that determines whether the resource is forbidden to be shared out because it is stored on a removable drive, and so on. These factors can be conceptually regarded as distribution criteria that are hard coded. "Hard coded" here means that a media server user might not be able to modifying these factors through the UI pages used to define other distribution criteria (such as recipient entity-related criteria, etc.). However, in one implementation, the resource information sharing functionality 322 can include various provisions for allowing the media server user to change even these factors in various circumstances.

According to another feature, various mechanisms can be used to prevent media server users from inspecting and/or changing other media server users' distribution criteria. For instance, in one implementation, the resource information sharing functionality 322 only allows a media server user to define or modify distribution criteria for resources provided that the media server user has designated those resources as shareable. Still other permutations of this design strategy are possible.

In the routing operation itself, the resource information sharing functionality 322 first allows the consumer to search for information associated with shared resources. For instance, as indicated in the overview above, the consumer can use the control point 316 (or other device) to enter a request to view resource metadata associated with resources provided in the resource storage 320. More specifically, the request can be a browse request, a search request, or some kind of other request. A browse request is a UPnP action that can result in the retrieval of a collection of information items, e.g., in a certain specified category, whereas a search request is a UPnP action that can result in the retrieval of one or more targeted information items, e.g., in response to specified key terms, etc. In any event, the transmission of this request is represented by path 324 in FIG. 3.

The resource information sharing functionality 322 responds to the request 324 by scanning a collection of resource metadata describing the shared resources to locate any resources that simultaneously satisfy the consumer's request and also satisfy any relevant distribution criteria, if any, defined by one or more media server users. For instance, a consumer may request the media server 302 to provide resource metadata corresponding to all available video resources in the comedy genre. The resource information sharing functionality 322 responds to this request by scanning the resource metadata to locate any associated resources that match the specified search terms and which satisfy any relevant distribution criteria (such as a criterion restricting the display of these resources to a subset of resource information recipient entities, such as a criterion that prevents the display of R-rated resources to a particular media rendering device normally used by a child). Note that the resource information sharing functionality 322 can be configured to optionally, that is, not necessarily, apply the distribution criteria. Thus, if no relevant distribution criteria exist, or if the media server 302 is currently not configured to apply the distribution criteria, then the distribution criteria do not play a role in restricting the dissemination of resource information.

In the event that the resource information sharing functionality 322 finds resource metadata corresponding to one or more resources that satisfy the above-described constraints, then the resource information sharing functionality 322 sends this resource metadata to the consumer. The response generated by the resource information sharing functionality 322 can specifically be formulated using the extensible markup language (XML). The XML response can provide resource metadata that identifies high level data regarding the available resources, such as name, artist, date created, size, etc. pertaining to the available resources. The resource metadata also provides resource locators, such as uniform resource locators (URLs), that identify the network locations from which resource content can be retrieved. FIG. 3 illustrates this transfer of XML information by path 326. If suitably equipped, the control point 316 translates the received XML information into a presentation format, and then displays the information on a monitor or other presentation device (generally represented in FIG. 3 by the display presentation 328 provided by control point 316). On the other hand, in one implementation, the control point 316 will receive no information from the media server 302 if no resource information was determined to be available that satisfies the parameters of the search and, if applicable, the constraints of the distribution criteria. In this case, the consumer might be unaware of the existence and characteristics of any non-matching resource information stored in the resource store 320. (As used here, the term "non-matching resource information" refers to resource information pertaining to resources that satisfy the parameters of the consumer's search but not the constraints of the distribution criteria.)

Limiting the availability of non-matching resource metadata is desirable for a number of reasons. This feature is generally advantageous because it eliminates the display of resource metadata that the consumer might find objectionable (or the consumer's guardian might find objectionable). Also, limiting the availability of non-matching resource metadata is beneficial to eliminate extraneous information that might not interest a consumer. In another implementation, the resource information sharing functionality 322 can also allow the media server user to provide distribution criteria that will simply filter out some (but not all) of the resource metadata in the event that otherwise matching resource metadata for a particular resource does not satisfy the pertinent distribution criteria. This might be appropriate in the case where a guardian simply wants to prevent a child from viewing the titles of certain resources at a rendering device, but otherwise has no objection to the child receiving some information that indicates that these resources exist in the media server 302. The distribution criteria in this case would therefore have the effect of only blocking the title when it is applied. In one implementation, the resource metadata itself can include display recommendations that can be used to govern the manner in which the resource metadata is displayed by a control point or other resource information recipient entity.

As a final note, recall that a resource (as defined above) can refer to an individual resource that provides, for example, a particular resource item. In addition, the resource can refer to a resource collection (e.g., a resource container, resource folder, etc.) that itself can include one or more member resources (and possibly one or more other resource collections). The resource information sharing functionality 322 can thus be configured to provide resource metadata that describes one or more individual resources or a resource collection. In the former case, the resource metadata can include high level information pertaining to the individual resources, such as the titles, authors, etc. of the individual resources. In the latter case, the resource metadata can include high level information pertaining to the resource collection. Such high level information can include any kind of global information describing the overall collection per se, as well as information pertaining to individual member resources and sub-collections (if present) in the resource collection, such as the titles, authors, etc. of the individual member resources.

To facilitate discussion, the following description will generally assume that the resource metadata for each resource includes a resource locator that describes where that resource content can be found (so that it can be subsequently retrieved). However, in one implementation, if the resource is a resource collection, its resource metadata may or may not include a resource locator associated therewith. For example, a so-called playlist resource container can have a resource locator associated therewith. This resource locator can be used to retrieve either the playlist (e.g., a list of songs) or each of the songs in the playlist (e.g., the set of songs "concatenated"). The playlist can identify how each of the songs can be retrieved, e.g., by providing individual resource locators associated with the songs. However, other resource collections may not have resource locators associated therewith. In general, any given application can include collections having resource locators, collections without resource locators, or a combination of collections with and without resource locators. To facilitate discussion, the following explanation will generally imply a one to one correspondence between resource metadata items and resource locators; however, the above qualification for resource collections potentially applies, although it is not always expressly stated.

After viewing the available resources (via the provided resource metadata), the consumer may decide to play resource content corresponding to one of the available individual resources on a selected media rendering device, for example rendering device 306. This can be performed in a variety of ways. According to one technique, the control point 316 (or other agent) can supply a resource locator corresponding to a selected resource content item, such as a Uniform Resource Locator (URL), to the rendering device 306. (Again, recall that this resource locator was provided as part of the resource metadata to the control point 316 by the media server 302 in response to the consumer's initial query.) The rendering device 306 can then submit this resource locator to the media server 302. The media server 302 uses the resource locator it has received from the rendering device 306 to locate the selected resource content and then to present this resource content to the selected rendering device 306. These series of actions can be performed outside the UPnP protocol, using, for example, an HTTP GET operation, or other type of operation. In this operation, the rendering device 306 supplies an HTTP GET command to the media server 302. The command includes the resource locator. FIG. 3 illustrates this action by path 330. The media server 302 responds by providing the requested resource content. FIG. 3 illustrates this action by path 332. Other protocols that can be used besides the HTTP GET protocol are IEEE 1394, RTSP/RTP, etc. Various media streaming techniques can also be used to transfer resource content from the media server 302 to the media rendering device 306. Further, multiple resource locators can be forwarded to the rendering device 306, and then transferred to the media server 302 to perform transfer of multiple resource content items en bloc, rather than sending each resource locator for the items separately, one after the other.

As mentioned above, the retrieval of actual resource content using the HTTP GET protocol (or other protocol) can also optionally be made conditional on distribution criteria. That is, as described above, a first set of distribution criteria can govern the dissemination of resource metadata and a second set of distribution criteria can govern the distribution of resource content. The first set can be the same as the second set, or the first set can differ from the second set. Using the second set of criteria, the media server 302 can prohibit the distribution of resource content if a relevant distribution criterion indicates that that the requesting rendering device is not authorized to receive the content. This provision prevents an unauthorized rendering device from attempting to receive resource content using a resource locator that it received (either with or without permission) from an authorized device. This provision may also prevent devices that were once authorized, but are no longer authorized, to receive resource content by using "stale" (e.g., old) resource locators to attempt to access resource content.

In one case, the media server 302 can prevent the distribution of resource content to a device, even though that same device was permitted to receive resource metadata. Alternatively, the media server 302 can prohibit the distribution of resource metadata to a device even though that very device can access the resource content itself. Generally, the terms "first set" and "second set" of distribution criteria are abstract concepts that simply denote that different collections of criteria can apply to the distribution of resource metadata and resource content. In one case, these two sets can be literally implemented by two separate stores of parameters. In another case, these two sets can be implemented by attaching fields or attributes to each criterion which indicate whether each criterion applies to the distribution of resource metadata and/or resource content. In another case, a single store of criteria can be provided with the presumption that it implicitly applies to both the distribution of resource metadata and resource content, or to either the resource metadata or the resource content. Many other variations are possible to implement this dissemination strategy.

Other kinds of distribution criteria can apply to the dissemination of resource content besides device-related criteria. For instance, as in the above-described case of the dissemination of resource metadata, the media server 302 can prohibit the distribution of resource content if a relevant distribution criterion indicates that a specified individual has not given required consent to this transfer; this criterion can be satisfied, in one case, by requiring this individual to be currently and actively logged onto the computer system that implements the media server 302. Still other criteria may govern the distribution of resource content.

In another implementation, the media server 302 may not make the distribution of resource content dependent on the distribution criteria. The premise in this implementation may be that if the consumer has a valid resource locator corresponding to resource content provided by the media server 302, then the consumer is presumed to have proper authority to access the resource content itself. This is because the consumer would have had to meet the conditions set forth in the distribution criteria that govern the distribution of resource metadata in order to obtain the resource metadata in the first place.

A.2. Exemplary Application of the System

Figure 4:
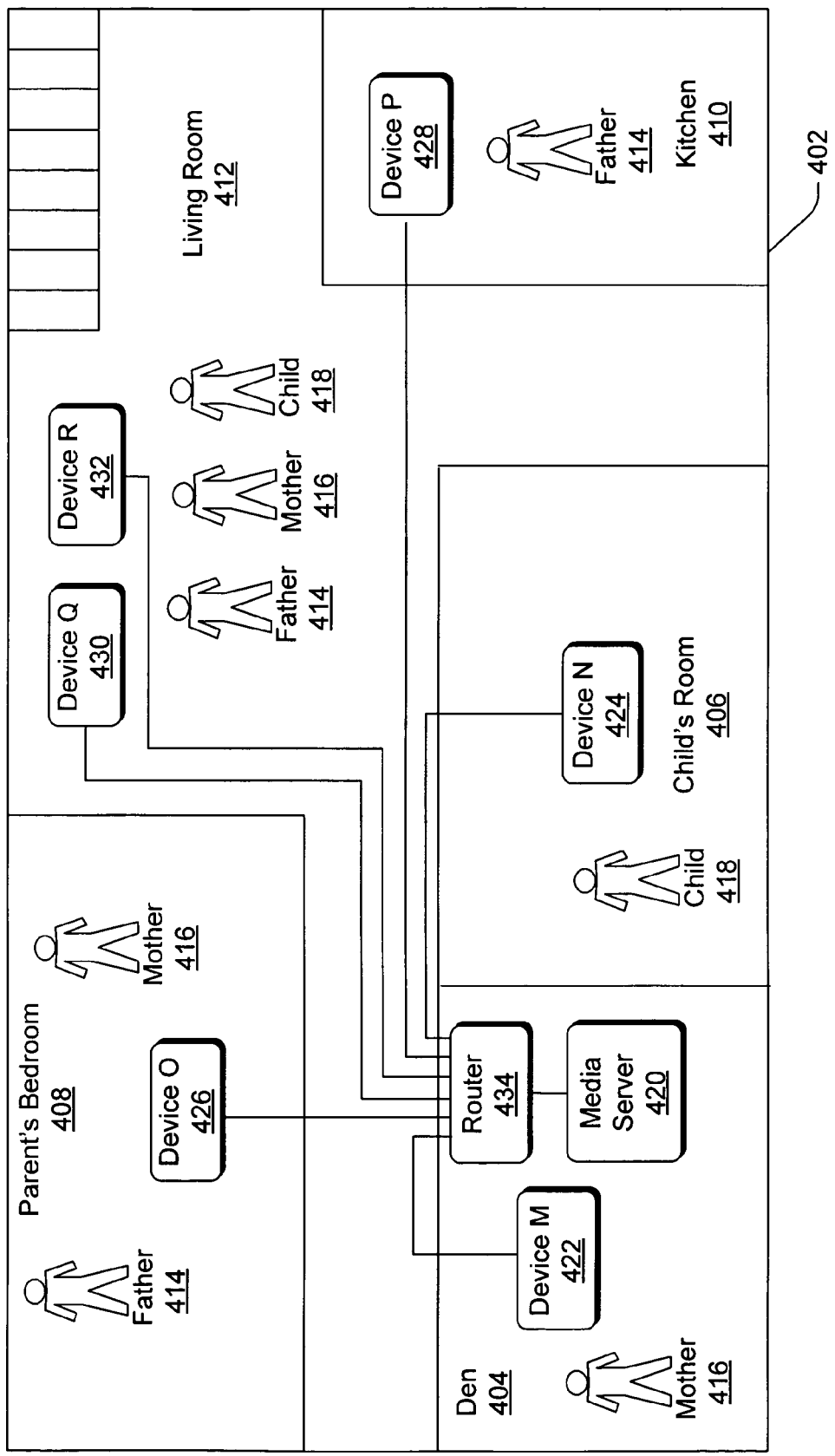
FIG. 4 shows an exemplary application of the network architecture shown in FIG. 3.

FIG. 4 shows an exemplary application of the above-described resource sharing strategy in a home environment. However, as noted above, the principles described herein can be applied to any environment, such as a business, academic organization, etc.

In FIG. 4, a schematic of a home 402 includes a plurality of rooms, such as den 404, child's bedroom 406, parent's bedroom 408, kitchen 410, and living room 412. FIG. 4 also shows three individuals that reside in the home 402, including a father 414, a mother 416, and a child 418.

The den 404 includes a media server 420 and associated resources, as well as a rendering device M 422. The child's bedroom 406 includes a rendering device N 424. The parent's bedroom 408 includes a rendering device O 426. The kitchen 410 includes a rendering device P 428. And the living room 412 includes rendering devices 430 and 432 (Q and R). Although not shown, various control points can be scattered throughout the home 402. For instance, the device M 422 in the den 404 can also function as a control point from which a consumer can interact with the media server 420. Because the media server 420 is located in the den 404, the den 404 can function as a control center for setting up distribution criteria that will govern the distribution of resources throughout the home. The mother 416 is acting as the media server user in this example by setting up these criteria. Finally, the den 404 also includes a router 434 for coupling all of the devices together. The router 434 functions in a conventional manner, that is, by routing resource information and other information to various devices depending on addressing information associated with the information.

The resource information sharing functionality 322 can provide a great variety of different resource sharing scenarios to suit different environments and objectives. A few resource sharing possibilities are outlined in the following discussion to provide concrete examples of how the resource information sharing functionality 322 can be employed.

In a first scenario, the media server user (that is using the media server 420) may want to cull a first specific group of resources into a resource folder, and then earmark the resource information associated with resources in that resource folder for distribution to only device N 424 in the child's room 406. Thus, the child 418 can access appropriate children's resource information (e.g., resource metadata and/or resource content) in his or her own room. At the same time, the parents (414 and 416) will not see this resource metadata when they browse or search through the resource metadata; this has the beneficial effect of not inundating the parents (414 and 416) with resource metadata that they are not interested in.

In a second scenario, the parents (414 and 416) may wish to limit the distribution of action genre resource information to only themselves for viewing in their own bedroom 408. The parents (414, 416) may be concerned, for example, that the violence in this resource information is inappropriate for viewing by their child 418. The media server user can implement this restriction by specifying that a collection of R-rated resource information in the action genre should only be played on the device O 426 in the parent's room 408. The child 418 therefore cannot access this objectionable resource information from his or her room 406; nor is the child 418 even aware that this objectionable resource information exists (because the resource information sharing functionality 322 can shield even the resource metadata regarding these resources from the child).

In a third scenario, the media server user may earmark resource information associated with certain other collections of resources as appropriate for display on any rendering device. This can be implemented by specifying "All devices" when defining the distribution criteria for these collections of resources.

In addition to the above-described device-related restrictions, the media server user can make the access to resource information conditional on whether selected individuals operating the media server 420 have given their implicit or explicit consent to the transfer of this resource information. For instance, in a fourth scenario, this criterion is satisfied when the mother 416 is logged onto the media server 420 (and her terminal session is active). In this case, the mother 416's consent to the transfer of resource information is inferred from her mere contemporaneous interaction with the media server 420. In another case, this criterion is satisfied only when the mother 416 gives her express consent to the transfer. This can be accomplished by presenting a pop up message when her child attempts to access particular resource metadata or resource content. Transfer proceeds only when the mother 416 responds to this query in the affirmative.

On the other hand, a user criterion which specifies "All users" does not place any constraints on the presentation of resource information. In other words, if this criterion is set, then the resource information can be presented on any authorized device without reference to the consent of any individual operating the media server 420. However, the device-related criterion may place independent restrictions on where the resource information can be presented, thus effectively preventing certain devices from receiving these resources.

Once again, the resource information sharing functionality 322 can provide other kinds of criteria besides device-related criteria and user consent-related criteria, such as various criteria pertaining to the time of day when resources are consumed, etc. Also, once again, the features described above are equally applicable to other environments besides the home context, such as a business environment.

Finally, as described more fully in Section A.5 below, various entities outside the home 402 may attempt to interact with the home network in an unauthorized manner. For instance, parts of the network provided in the home 402 may be implemented as wireless links; in this case, an unauthorized entity may be operating close enough to the home 402 to present itself as a valid control point or rendering device. In another case, an unauthorized entity may represent an individual using a wide area network (such as the Internet) to intentionally or inadvertently tap into the resource information provided by the media server 420. In either case, the resource sharing strategy described above can be used to restrict the dissemination of resource information to a known and limited set of rendering devices. This will have the effect of preventing the unauthorized entities from accessing the resource information, since these entities are not on the list of pre-approved devices that may receive resource information. The distribution is further conditional on the consent of specified individuals operating the media server 420. This places another hurdle in the path of unauthorized access (as this criterion requires the explicit or implicit approval of a media server user to dole out the resource information). Section A.5 below describes several other provisions designed to thwart unauthorized access to resource information.

A.3. Media Server Architecture Overview

Figure 5:
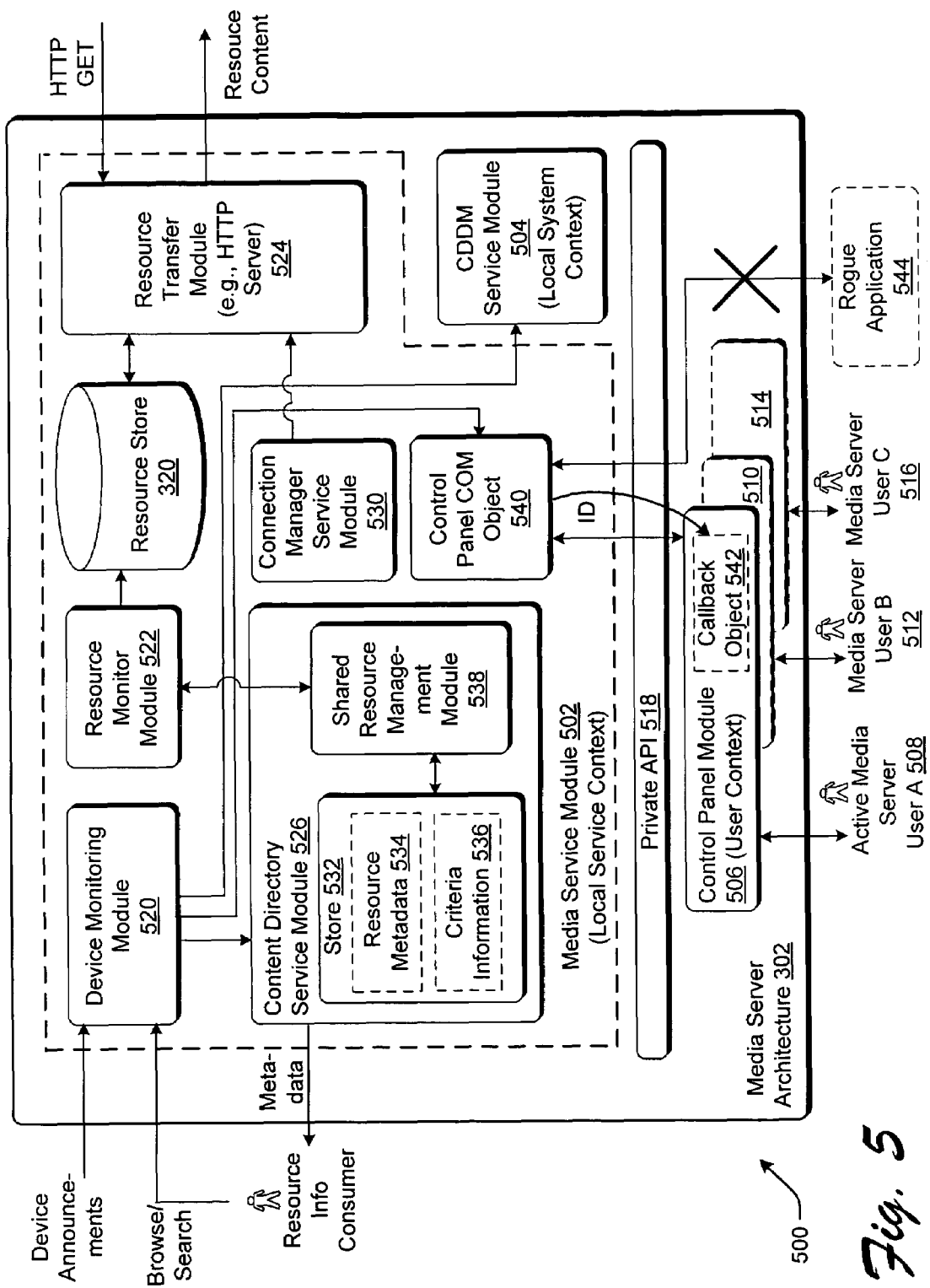
FIG. 5 shows an exemplary media server for use in the network architecture shown in FIG. 3.

FIG. 5 is a more detailed depiction of the exemplary media server 302 shown in FIG. 3. The media server 302 can implement the various blocks shown in FIG. 5 using software, firmware (e.g., fixed logic circuitry), or a combination of software and firmware. The term "logic" as used herein generally represents software, firmware, or a combination of software and firmware. In the case of a software implementation, the illustrated blocks can represent collections of program code (and/or declarative statements) that perform specified tasks when executed on a processing device (e.g., CPU). The program code can be stored in one or more computer readable memory devices.

By way of overview, the media server 302 architecture includes three main components. The first main component is a media service module 502. The media service module 502 hosts the resource information sharing code, the code that monitors the UPnP network 314 for new devices, and the server for sharing out resource content. The media service module 502 also maintains the configuration data used to govern the distribution of resource metadata and resource content over the network 314 (for example, including a list of shared resource folders, a list of approved devices, a list of media server users that are required to provide consent for resource information transfer, and so on).

A second main component is a Content Directory Device Monitor (CDDM) service module 504. As will be explained in detail below, the CDDM service module 504 has higher access privileges to interact with the media server 302's system resources compared to the media service module 502. As such, the media server 302 uses the CDDM service module 504 to run a few privileged operations that the media service module 502 cannot perform due to its lower access privileges. The operations provided by the CDDM service module 504 will be enumerated and described in detail below.

A third main component is the configuration and control panel module 506 (referred to as the control panel module 506 for brevity). The control panel module 506 allows a logged on user to approve or deny authorization for new devices joining the network 314, and also to manage a list of shared resource folders and to define associated distribution criteria. The control panel module 506 also alerts the media server user when critical system errors are encountered by the media server 302.

As will be described in subsection A.4 (below), the media server 302 implements fast user switching (FUS). The FUS technique permits more than one media server user to be logged onto the computer system hosting the media server 302 at any one time. In this case, the media server 302 provides multiple instances of the control panel module 506 that can run at the same time. FIG. 5 specifically shows the exemplary case where module instance 506 is used to interact with user 508, module instance 510 is used to interact with user 512, and module instance 514 is used to interact with user 516. However, each user is able to start up at most one instance of the control panel module 506 at any time. A private application programming interface (API) 518 couples the control panel module 506 to other components in the media server 302.

Each of the above-described three modules operates in a different so-called "user context." The media service module 502 runs in any so-called "clamped-down" user context, such as a so-called local service user context or a network service context (to be described below). The CDDM service module 504 runs in the so-called local system user context. And the control panel module 506 runs in a so-called logged on user's user context. Basically, a clamped-down user context provides access privileges related to a collection of UPnP functions, such as monitoring the UPnP network 314 for new devices, sharing out resource information, and so on. However, the clamped-down user context might not allow for the accessing of certain resources provided by the computer system needed to implement the media server 302, such as actually reading, deleting, and writing to resources stored on disk. The local system user context (used by the CDDM service module 504) does provide access to these core computer resources, and, moreover, can modify the access permissions on these computer resources to permit the clamped-down user context to access these computer resources. Accordingly, the clamped-down user context (used by the media service module 502) and the local system user context (used by the CDDM service) complement each other to provide the necessary functionality for implementing the UPnP sharing functionality. The logged on user's user context (used by the control panel module 506) provides access privileges specifically associated with a logged on user (e.g., user 508).

It is desirable to allocate different functionality to different security user contexts in order to protect the resources of the media server 302, and, more broadly, the resources of the computer system hosting the media server 302. For instance, the media sever 302 can execute certain operations in a background mode without any media server users logged onto the media server 302. One such background operation entails notifying the media server user when there are critical system errors or when a new media rendering device or a control point has been detected on the network 314 (in either case, this is performed by starting up the control panel module 506). It is desirable to prevent the functionality associated with these background tasks from directly interacting with all of the system resources provided by the media server 302. To this end, the media sever 302 uses the CDDM service module 504, which runs in the local system user context, to supplement the media service module 502 (which runs in the clamped-down user context). As mentioned above, the CDDM service module 504 has the necessary access privileges to access core system resources that are off limits to the clamped-down user context.

In the following discussion, to facilitate explanation, the clamped-down user context is described in the context of a specific implementation that uses the local service user context. The local service user context refers to a special account created by Microsoft Windows® operating system that typically does not allow for the interactive log on to the computer system as do other conventional user accounts. As mentioned above, however, it is also possible to implement the clamped-down user context using the network service context (which also refers to a predefined user context in the Microsoft Windows® operating system), or some other user context. Both local service user context and network service user context have a similar set of privileges associated therewith, but the advantages offered by these user contexts are not identical. For instance, the network service user context provides credentials that are recognized by other machines coupled to the network running the Windows® operating system. In contrast, the local service user context credentials are recognized only on the user's local machine; further, the local service user of one machine cannot be authenticated on other machines.

The resource information sharing functionality 322 introduced in the context of FIG. 3 collectively represents the above-identified three components (502, 504, 506). Each of these above-described components will be described below in turn.

a. Media Service Module

To begin with, a device monitoring module 520 receives notifications from devices coupled to the UPnP network 314. For instance, this module 520 detects announcements generated by new rendering devices that have been added to the UPnP network 314. This module 520 then notifies other modules in the media server 302 of this event, which triggers other actions (which will be described in detail below, e.g., with reference to FIGS. 16 and 17). The device monitoring module 520 also detects requests made by control points coupled to the UPnP network 314. As indicated in FIG. 5, a resource information consumer (e.g., a "consumer" for brevity) may initiate such a request in order to browse or search through the resource metadata provided by the media server 302. The device monitoring module 520 then notifies a content directory service module of this request, which triggers other actions (which will be described in detail below).

A resource monitor module 522 monitors the resource storage 320 (introduced in FIG. 3) for newly added, deleted or modified resources. Upon detecting changes, the resource monitor module 522 notifies the content directory service module 526 of the changes to the resources. The content directory service module 526 maintains a directory of resources provided in the resource store 320. As indicated in FIG. 5, the content directory service module 526 also interacts with a consumer who enters a request to browse or search through the resources provided by the resource store 320. The content directory service module 526 responds to this request by retrieving and transferring resource metadata to the consumer that describes the available resources that meet the consumer's request and which satisfy any distribution criteria that may pertain to the request.

The resource store 320 itself can represent a single repository of resources or multiple repositories. The resource store 320 can be implemented using magnetic storage devices, optical storage devices, EEPROM storage devices, and/or any other kind of storage devices. Exemplary shareable resources that can be stored in the resource store 320 include .bmp image files, .gif image files, .jpeg image files, .png image files, .tiff image file, .avi video files, .mp3 audio mpeg files, . mpeg video mpeg files, .wav audio files, .wma audio files, . wmv video files, and so on. This is merely an illustrative exemplary list. The resource store 320 can be co-located with other parts of the media server 302, or can be located, in whole or in part, at one or more separate locations. In the latter case, the media server 302 can remotely manage the resources provided in the resource shore 320.

The resource transfer module 524 coordinates the transfer of resource content to a media rendering device (such as media rendering device 306 shown in FIG. 3). In one implementation, the resource transfer module 524 is an HTTP server. The transfer of resource content is initiated by the receipt of a resource content request (such as an HTTP GET request in the case an HTTP server is used). The resource transfer module 524 responds by transmitting the resource content providing that the relevant distribution criteria are met (if applicable). In one implementation, the resource transfer module 524 performs this task with the assistance of a connection manager service module 530. The connection manager service module 530 manages the coupling between the media server 302 and a rendering device that is to receive the resource content. The control point (e.g., control point 314 or 316) can invoke this module 530 to prepare the media server 302 for an eminent transfer of resource information. This preparation can entail matching the capabilities of the media server 302 and a rendering device, discovering information about transfers of resource information ongoing in the UPnP network 314, and setting up and tearing down the connection between the media server 302 and the rendering device. (Note that the featured exemplary implementation that performs resource content transfer using an HTTP technique can simplify the processing by dispensing with one or more of the above-identified functions.)

In one exemplary and illustrative HTTP implementation, the connection manager service module 530 can support a GetProtocolInfo method. This method returns a comma separated list of the protocol information types that the media server 302 can source and sink. A control point uses this information to set up a media connection between the media server 302 and a selected rendering device (e.g., media rendering device 306). Each ProtocolInfo entry is a combination of the transport protocol, network, multipurpose Internet mail extensions (mime) type, and additional information, collectively specified by the format: Protocol:Network:Content_Format:Additional Info.

The media service module 502 can also include an optional audio-visual (AV) transport service module (not shown). If supported, the AV transport service module can be used to control the playback of resource content to the rendering device. This module can specifically permit a control point to stop the flow of resource content, pause the flow of resource content, search for a specific location within the resource content (using a seek function), and so on.

In the specific example of FIG. 5, the media service module 502 can use an HTTP server 524 to coordinate the transfer of resource content (such as an HTTP 1.1 server). This server 524 serves out resource content in response to the receipt of an HTTP GET request. The HTTP GET request specifies a URL of a desired resource, which, in turn, was provided to a media rendering device in response to a prior transfer of resource metadata to a recipient entity (e.g., a control point), which, in turn, may have been prompted by a consumer's prior search or browse request. The server 524 responds by retrieving the resource content from the resource store 320 corresponding to the specified URL, transforming the resource content to a requested media format (if need be), and providing this resource content to the consumer, provided that relevant distribution criteria are satisfied, if applicable. The URL for a resource can be of the exemplary form:

http://machine ip:port/ResourceId where "ResourceId" refers to an identifier assigned to the resource content by the content directory service module 526. Other protocols for transferring resource content that can be used instead of the HTTP-GET protocol include IEEE-1394, RTSP/RTP, etc.

The content directory service module 526 provides the core of the functionality that allows the media server 302 to share out resource information (notably resource metadata) to media rendering devices. It includes a shared resource store 532. In one implementation, the shared resource store 532 includes a directory and associated resource metadata describing resources provided in the resource store 320 that are to be shared.

Figure 6:
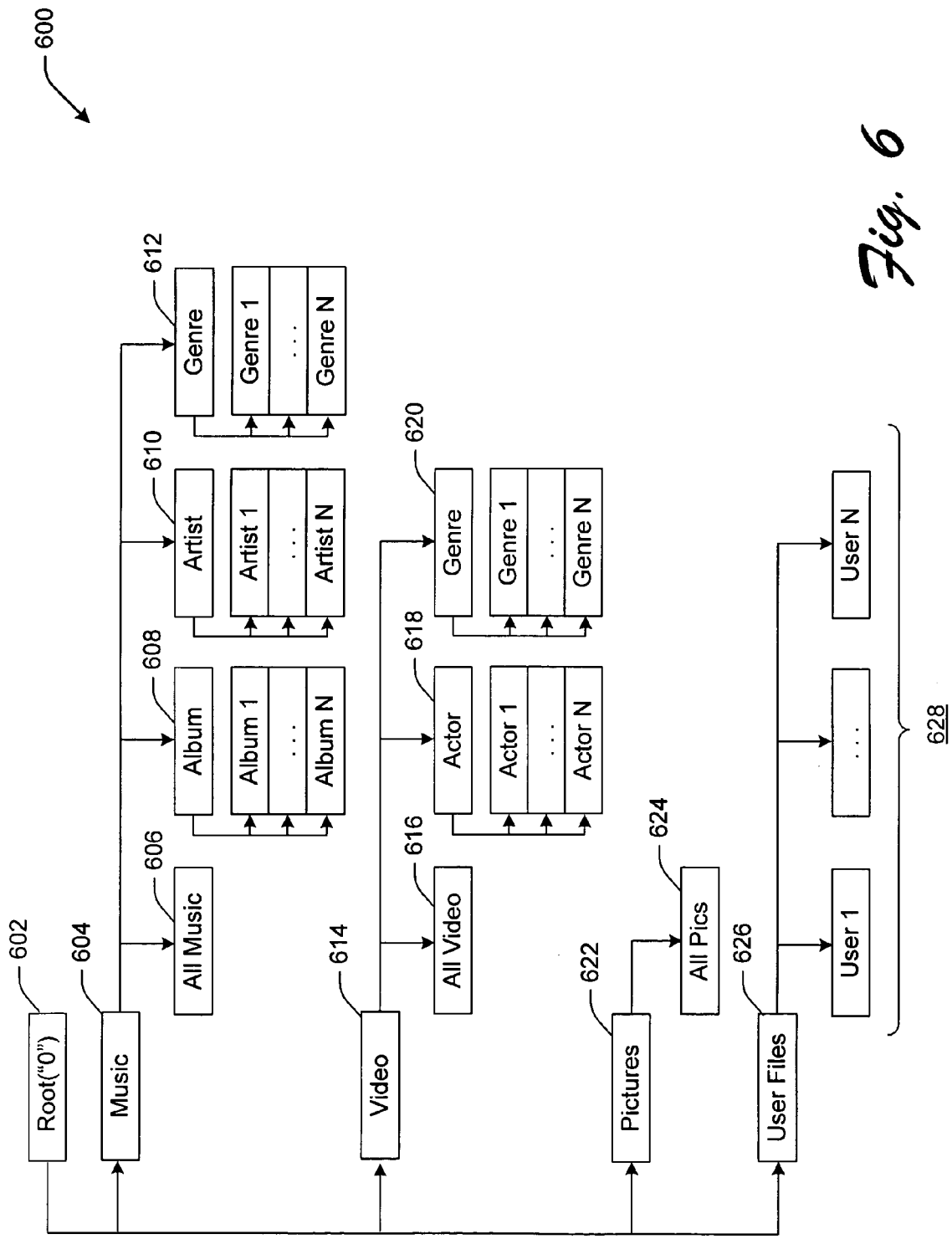
FIG. 6 shows an exemplary directory used by the media server of FIG. 5.

More specifically, jumping ahead briefly in the series of figures, FIG. 6 shows an exemplary hierarchical structure, e.g., a directory 600, that can be used to organize information in the shared resource store 532 into virtual resource containers. In this figure, a "root" resource container 602 encompasses all the other resource containers in the directory 600. A "music" resource container 604 includes resource containers categorizing music. A "music/all music" resource container 606 includes all music resources being shared within the content directory. A "music/album" resource container 608 includes resource containers for each album, where each such resource container includes music resources belonging to that album. A "music/artist" resource container 610 includes a resource container for each artist, where each such resource container includes resources for all the music pieces created by that artist. A "music/genre" resource container 612 includes a resource container for each genre, where each such resource container includes resources for music pieces belonging to that genre.

A "video" resource container 614 includes resource containers categorizing video. A "video/all video" resource container 616 includes all video resources being shared within the content directory. A "video/actor" resource container 618 includes a resource container for each actor, where each such resource container includes video resources featuring that actor. A "video/genre" resource container 620 includes a resource container for each genre, where each such resource container includes video resources belonging to that genre.

A "pictures" resource container 622 includes resource containers categorizing pictures. A "pictures/all pictures" resource container 624 includes all image resources being shared within the content directory. (Although not shown, a "pictures/album" resource container can be included, which includes a resource container for each picture album based on folder names. Further, although not shown, a "pictures/datetaken" resource container can be included, which includes a resource container for each group of pictures taken on a given date).

Finally, a "user files" resource container 626 includes resource containers holding resources belonging to individual users. FIG. 6 shows a collection of resource containers 628 associated with an exemplary N users.

Each of the resource containers in the directory 600 can have an object ID associated therewith. For instance, the Video/Actor resource container can have an object ID of "container: VideoActor." Generally, the directory 600 shown in FIG. 6 is exemplary; other directories can use different organizations and selections of resources.

In one implementation, each of the individual resources in the containers shown in the directory 600 can correspond to a separate respective resource file stored in the resource store 320. But, as mentioned previously, a "resource" is to be understood as an abstract aggregation of information. A single resource can be stored using only part of a file (where such a file may also store information pertaining to other resources). Alternatively, a single resource can be stored over a collection of different files. Also note that the resource collections (such as the resource containers of FIG. 6) themselves constitute resources.

Returning to FIG. 5, the shared resource store 532 includes resource metadata 534 associated with the shared resources in the directory 600. As previously discussed, resource metadata generally includes high level information that describes the contents of the resources, such as name, artist, date created, size of the resource, the resource locator such as the URL associated with the resource content, and so on. The shared resource store 532 can also store criteria information 536 that describes criteria associated with resource collections (e.g., resource folders or resource containers) used to restrict the dissemination of the resource information (including resource metadata and resource content) to appropriate consumers at respective control points and rendering devices. As discussed above, one exemplary criterion may govern which devices are authorized to receive resource information. Another criterion may govern which specified individuals (if any) operating the media server 302 are required to provide consent in order for the transfer of resource information to take place.

More specifically, as described in Section A.1, the criteria information 536 can include two sets of criteria: one set that governs the dissemination of resource metadata and another set that governs the dissemination of resource content. These sets can be implemented as two separate stores, as fields or attributes associated with a common store, or using some other technique. The first set of criteria can differ from the second set of criteria, indicating that different constraints govern the display of resource metadata compared to the rendering of resource content, or these two sets can be the same. Or a single set can be used that will govern the dissemination of resource metadata, resource content, or both resource metadata and resource content. To facilitate the discussion below, it will be assumed that the criteria information 536 holds a single set of criteria, and that single set applies to the doling out of resource metadata as well as resource content.

In one implementation, the resource metadata 534 is associated with individual shared resources, where the shared resources can correspond to files stored on the resource store 320. In this case, the resource metadata 534 can be extracted by "crawling" through the shared files at service initialization. Depending on the number of shared files, this operation can take an appreciable amount of time. In another implementation, the resource metadata 534 can be persisted in a relational database in the shared resource store 532. In still another example, the resource metadata 534 can be extracted from all the shared files in the resource store 320 and stored in one or more separate files. (For instance, the media server 302 can use a separate file for every file system volume used in the resource store 320, where each file system volume may correspond to a separate drive letter. This provision facilitates the collection of resource metadata, especially in the case where removable volumes, such as USB hard drives, are employed; the media server 302 will attempt to read resource metadata from a volume only if its corresponding drive is currently mounted.) The use of a relational database and/or a separate file will reduce the amount of time associated with initializing the media server 302. For instance, when the separate file(s) strategy is used, the separate file(s) can be quickly loaded into memory to provide the resource metadata 534, as opposed to laboriously crawling through the entire resource store 320 to extract this information.

Similarly, in one implementation, the criteria information 536 can be associated with individual shareable resource folders provided by the resource store 320. In this case, the criteria information 536 pertaining to shared files (which belong to respective shared resource folders provided by the resource store 320) can be extracted by "crawling" through the shared resource folders at service initialization in much the same manner as described above. This can take an appreciable amount of time. So, to expedite the process, the media server 302 can resort to a relational database strategy and/or a separate file(s) strategy (similar to the case described above for the storage and management of the resource metadata 534). In one implementation, a criteria-specific relational database and/or separate file(s) are used to provide the criteria information 536 that is distinct from a metadata-specific relational database and/or separate file(s) used to provide the resource metadata 534. In another implementation, a single relational database and/or separate file(s) can be used to store both the resource metadata 534 and the criteria information 536. In another implementation, the resource metadata 534 and/or the criteria information 536 can be persisted and read back from a Windows® operating system registry.

As noted above, in one implementation, the criteria information 536 can be applied to resource folders. The media server user can create this association via one or more user interface pages that display information regarding the resource folders. In another implementation, criteria information can be associated with resource containers in the directory 600 (shown in FIG. 6) or with individual resources included in the directory 600. The media server 302 can again create this association via one or more user interface pages that display information regarding resource containers. While the following discussion describes functionality for implementing the former case (of associating resource folders with criteria), similar functionality can be provided for implementing the latter case (of associating resource containers with criteria). In both case, distribution criteria can be used to govern the dissemination of resource metadata and resource content. The organization of resource containers (which refers to the internal organization of resources in the media server 302) generally cannot be expected to match the hierarchy of resource folders (which refers to the organization of resources with which the media server user interacts), although there may be a relationship between these two organizations (e.g., resource containers and resource folders).

Whatever method is used to construct the resource metadata 534, the media server 302 can place various constraints on what metadata is permitted to be stored in a store used to hold the resource metadata 534. In one example, the following exemplary constraints apply: (a) the media server user sharing resource information must have read permissions for the file(s) storing the resource information being shared; (b) the file(s) storing the resource information being shared must have a known media type; (c) if the file(s) storing the resource information being shared is a hard link or a browser shortcut, the media server user trying to share the resource information must have read permissions on the underlying resource; (d) the file(s) storing the resource information being shared cannot be hidden; (e) the file(s) storing the resource information being shared cannot be a hidden subfolder; (f) the file(s) storing the resource information being shared cannot be stored on a removable drive; and (g) the file(s) storing the resource information being shared cannot be on a network share. Again, these constraints are merely exemplary; other applications can relax or remove one or more of these constraints depending on the requirements of the particular applications.

Continuing with the discussion of FIG. 5, the content directory service module 526 also includes a shared resource management storage module 538. This module 538 generally serves the role of managing the information stored in the shared resource store 532. For instance, the shared resource management module 538 updates the shared resource store 532 when the resource monitor module 522 notifies it that resources have been added, modified, or deleted from the resource store 320.

In one implementation, the shared resource management module 538 keeps track of the media server users who initially shared out each of the shared resource folders. The shared resource management module 538 can be configured to only allow media server users who have established a shared resource folder to modify the distribution criteria information 536 associated with that shared resource folder or to "unshare" that resource folder (that is, remove the shareable status of that resource folder). For example, in one implementation, suppose that a media server user has established access privileges to share files A, B and C. In this case, the shared resource management module 538 can be configured to only allow this user to apply distribution criteria for these files. Or suppose that files A, B and C have been grouped into a folder that includes other resources that this media server user does not have permission to share. If the shared resource management module 538 is configured to allow the media server user to apply distribution criteria to the folder, then these criteria will nonetheless only be effective for files A, B and C. Other implementations can relax these constraints in various manners.

In the event that the resource metadata 516 is provided in a separate file or files, the shared resource management module 538 can also include functionality for maintaining these separate file(s). This functionality may include background processes for "crawling" through the shared files on the resource store 320 looking for changes in the shared files identified in the directory 600 on service initialization. This functionality can also include mechanisms for interacting with the resource monitor module 522 to provide notifications in the case changes are detected in the resource folders. The shared resource management 538 can throw out the separate file(s) if these file(s) are determined to be corrupted; the shared resource management module 538 can subsequently reconstruct the separate file(s) by crawling through the shared resource folders to extract metadata therefrom. Generally, the shared resource management module 538 can employ a variety of other coherency techniques to ensure that the separate file(s) accurately reflect the metadata of the shared resources.

In operation, the content directory service module 526 generally allows the consumer to investigate the resource metadata corresponding to shared resources. More specifically, in a typical interaction, the consumer sends a request via a control point to browse or search through the resource metadata associated with the shared resources provided in the directory 600. The device monitoring module 520 detects this request in a manner to be described in further detail below, and, in response, notifies the content directory service module 526. The content directory service module 526 responds by scanning the resource metadata 534 to locate any resources that meet the consumer's request. For instance, the consumer may have requested the content directory service module 526 to show all of the resource metadata in a certain genre; or the consumer may have requested the content directory service module 526 to provide resource metadata regarding a targeted resource (e.g., by specifying specific keywords for use in searching for the targeted resource). This process may yield one or more matching resource metadata items. The content directory service module 526 can then, if applicable, also examine any matching resource metadata against the criteria information 536 stored in the shared resource store 532 and cull out any matching resource metadata items that do not meet the relevant criteria. (It is possible to deactivate this provision so that the criteria information does not play a part in the dissemination of resource information.) Then, the content directory service module 526 will format a list of the surviving matching resource metadata into an XML message, and then transmit this XML message to the consumer. This resource metadata can describe individual matching resources as well as, if applicable, resource collections (such as resource containers) that include individual member resources.

The receiving control point device can translate the XML message into a presentation format (e.g., HTML), and then display this information for the consumer's review. This display can provide a media list that identifies the matching resource metadata. The consumer can then command the media rendering device 306 to play resource content associated with one or more items in the media list. This can be performed by passing the resource locators (such as URLs) associated with the selected items in the media list to a selected rendering device, such as rendering device 306. These resource locators were specified in the XML message sent to the consumer by the media server 302. (However, again note that the result of a browse operation can return resource containers, e.g., a list of containers; resource containers may or may not have resource locators associated therewith, and, if they do not, cannot themselves be presented at a rendering device for playing back, although the individual resources identified in the containers can be.)

One other component of the media service module 502 is a control panel COM object 540. Generally, this object 540 allows the control panel module 506 to retrieve and set configuration data in the media service module 502. In an exemplary implementation, the object 540 is a component object model (COM) object. Generally, COM objects perform one or more tasks. That is, a COM object exposes functions via an interface that an application can invoke to perform its ascribed tasks.

In the context of the media service 502, the control panel module 506 interacts with the media service module 502 via the control panel COM object 540. To serve this role, the control panel COM object 540 executes the following exemplary tasks. First, the control panel COM object 540 allows the control panel module 506 to enumerate the devices that have been discovered, retrieve their current state (e.g., whether they have been approved, denied, or neither approved nor denied), get device information that is used to populate the UI (such as the device's manufacturer, icon, model number, etc.), and approve or deny devices. Second, the control panel COM object 540 allows the control panel module 506 to manage the list of shared resource folders that contain the shareable resources stored on the resource store 320 and any associated distribution criteria information 536 associated with these resource folders (such as the list of devices that are permitted to receive resource information associated with these shared resource folders). For this purpose, the control panel COM object 540 allows the control panel module 506 to retrieve the list of currently shared resource folders and their associated distribution criteria information 536, to unshare these resource folders, to create new shared resource folders and/or distribution criteria, to modify the distribution criteria associated with a shared resource folder, and so on. Finally, when the media service module 502 discovers new control points or media rendering devices on the UPnP network 314, it notifies the control panel module 506 using the control panel COM object 540 and a control panel hosted callback object 542 (to be discussed in greater detail below).

To accommodate fast user switching (FUS), the media server 302 allows multiple control panel modules 506 to be concurrently active. However, in one implementation, the media server 502 permits each terminal service session to have only one active control panel module 506.

b. The CDDM Service Module

As described above, the media service module 502 runs in the local service user context (or more generally, a clamped-down user context), while the CDDM service module 504 runs in the local system user context. The local service user context generally has more restrictive access privileges compared to the local system user context. Accordingly, the media service module 502 relies on the CDDM service module 504 to perform a series of functions which it does not have access rights to perform on its own. The privileged functions delegated to the CDDM service module 504, according to one exemplary implementation, are described below.

First, the CDDM service module 504 performs the role of starting the control panel module 506 when a new media rendering device 306 or control point 316 has been detected on the network 314 by the device monitoring module 520. This allows the media server user to approve or deny the device. An approved device is subsequently allowed to access resource information (resource metadata and resource content) corresponding to the media server 302's shared resources. The CDDM service module 504 also starts the control panel module 506 if: (a) a media server user logs on to the media server 302 computer (or, as described below, reconnects to a previously established terminal server session on this computer); and (b) the media server 302 has previously detected devices that have neither been approved nor denied by any media server user.

Moreover, the CDDM module 504 starts the control panel module 506 to warn the media server user of various errors or conditions. For instance, the CDDM service module 504 can warn the media server user when no network interface has been found to have an IP address in the permissible previously configured IP address ranges (e.g., in the private IP address range or the Auto IP address range). Or the CDDM service module 504 can warn the media server user that a shared resource folder on the resource store 320 has been deleted or renamed when the resource information sharing functionality 322 service was not running. Generally, the CDDM service module 504 launches the control panel module 506 in the context of the currently active logged on user. The CDDM service module 504 starts the control panel module 506 by retrieving the logged on user's token and by calling a CreateProcessAsUser function. However, before doing so, it ensures that the control panel module 506 is not already running in the terminal server session of the currently active logged on user.

Second, the CDDM service module 504 adjusts the access privileges associated with a stored resource folder so that the media service module 502 can access the resource folder to perform its ascribed functions (such as constructing the resource metadata 534). This can be performed by changing the access control list (ACL) associated with shared resource folders to permit access by the local service user context. In an exemplary implementation, this gives the local service user context read, write and delete access to the resource folders' contents. (That is, a resource folder is ACL'ed to give the local service user context write and delete access in addition to read access; this is because some media types should be decoded before they can be made available over the UPnP network 314. Tools used to decode the files sometimes create temporary files in the directory containing the files. The temporary files then should be deleted.)

Third, the CDDM service module 504 monitors the media server 302 to detect when new media server users sign onto or log off the computer system used to implement the media server 302. It also ascertains the identity of media server users logged onto the media server 302. That is, as explained above, the media service module 502 can restrict the sharing of resource information depending on the identity of the logged on media server user who is currently active on the media server computing machine. Accordingly, the media service module 502 can use the user information extracted by the CDDM service module 504 to determine whether it has permission to share out resource information in view of the currently active logged on media server user. (The CDDM service module 504 can determine the identity of the media server user by using a WTSQueryUserToken function to retrieve the logged on media server user's token and by retrieving the media server user's SID from the token using a GetTokenInformation function).

c. The Control Panel Module

The control panel module 506 provides functionality that allows the media server user to approve or deny the authorization of new devices added to the UPnP network 314. The control panel module 506 also allows a media server user to define shared resource folders and associated distribution criteria. As described above, one criterion can restrict the dissemination of resource information (e.g., resource metadata and resource content) to only specified devices. Another criterion can make the dissemination of resources contingent on whether a specified individual using the media server 302 has given implicit or explicit approval to share the resource information. The specified individual is considered to have given implicit approval (in one implementation) if he or she is simply logged onto the media server 302, and the individual's session is currently active. The control panel module 506 can perform the above-identified tasks via a series of UI presentations (e.g., UI pages). These UI presentations will be described in greater detail in Section B below. The control panel module 506 can be implemented as an applet (an applet is a program that executes in the context of an application) and can run in the context of a logged on media server user.

The media server 302 can activate the control panel module 506 in two ways. First, a media server user can manually activate the control panel module 506. Second, the media service module 502 can start the control panel module 506 automatically, e.g., to notify a media server user when a new rendering device has joined the UPnP network 314.

In one implementation, the media server 302 provides a single instance of the control panel module 506 in each terminal server session. Accordingly, when the control panel module 506 starts up, it verifies that another instance of the control panel module 506 is not already running in that terminal server session. The control panel module 506 then determines whether the media service module 502 is running; if it is not, the control panel module 506 starts it up. The control panel module 506 then co-creates the control panel COM object 540 that the media service module 502 hosts (described above). Finally, the control panel module 506 creates the client callback COM object 542 that it hosts; it then calls an Initialize( ) method associated with the control panel COM object 540, passing it the client callback object 542. The media service module 502 uses the client callback object 542 to notify the control panel module 506 of certain events, such as service shutdown, background data changes, or on discovering a new control point or media rendering device on the UPnP network 314 while the control panel module 506 is running.

A.4. Fast User Switching (FUS) Provisions

The FUS technique provides a convenient technique for switching between different computing sessions associated with different respective media server users. For example, the technique allows a first media server user to connect to a computer and run an application, followed by a second media server user who runs another application. When the second media server user connects to the computer, the computer will save an application instance and desktop settings associated with the first media server user's session. When the first media server user connects to the computer again, the computer will restore the applications and settings associated with the first media server user's computer session at the time he or she disconnected. The FUS technique can toggle between any number of media server users in the above-described manner by recording multiple application instances and desktop settings associated with the different respective media server users who utilize the computer in succession. One exemplary commercial product that provides FUS is the Windows XP® operating system, provided by Microsoft® Corporation of Redmond, Wash. In contrast, in a traditional computing solution, a computer would require the first media server user to log out before allowing a second media server user to connect to it, thereby terminating the application of a first media server user upon connecting a second media server user to that same computer.

Application of the FUS technique to the media server 302 allows multiple instances of the control panel module 506 to exist at one time. For instance, as described above, a control panel module instance 506 is associated with media server user A 508, a control panel module instance 510 is associated with media server user B 512, and a control panel module instance 514 is associated with media server user C 516. However, application of the FUS technique to the above-described UPnP media server environment raises various challenges. This section describes an exemplary FUS solution which addresses these challenges in the context of the above-described UPnP media server 302.

First, while the media server 302 accommodates more than one instance of the control panel module 506 running at the same time, as described above, the media server 302 only permits each terminal server session to have one control panel module 506. To enforce this feature, the media server 302 requires that each control panel module 506 create the COM object 540 and initialize it (by calling the Initialize( ) method) before this object 540 is used. When calling the Initialize method, the caller should provide the client callback COM object 542.

More specifically, when a client calls the Initialize( ) method, the media service module 502 extracts the client's terminal server session ID from the client's impersonation token. The media service module 502 then determines whether this session ID is associated with another client. If it is, the media service module 502 calls into the callback object 542 of that client to determine if that client is still "alive." If the client is still active, then the new client is rejected. Otherwise, the media service module 502 accepts the new client and saves the client's callback object 542 for future use.

Second, since the media server 302 now accommodates multiple media server users, it can be configured to notify more than one logged on media server user upon the introduction of a new device to the network 314. The media server 302 also addresses the scenario in which no media server user is logged onto the media server 302 when a device is discovered (or a media server user is logged on but not active at the time the device is discovered). In these cases, the media server 302 defers notifying the media server user of the existence of the new device until a media server user logs on or resumes an existing session.

Third, the control panel module 506 recognizes that other instances of the module (e.g., instances 510 and 514) may be concurrently active and modifying global data such as the authorization status of a device or the list of shared resource folders. To address this situation, the media server 302 notifies the COM client callback objects 542 associated with all of the clients that are active when any client modifies global data.

Finally, the media server 302 also includes a mechanism for excluding so-called rogue applications that may be "masquerading" as the control panel module 506. FIG. 5 shows one exemplary such rogue application 544. More specifically, the media server 302 implements the API 518 between the media service module, 502 and control panel module 506 as a private API (because it couples together internal components in the media server 302). There exists a potential that an individual might attempt to reverse-engineer the API 518, allowing the rogue application 544 to call into the media service module 502 and tamper with its configuration data.

To address these concerns, the media service module 502 also assigns each client a unique client ID when the client successfully calls the Initialize( ) method associated with the control panel COM object 540. More specifically, the media service module 502 notifies the client of this ID by calling a method associated with the client's callback object 542. The media service module 502 also records the assigned ID. Then, when the client later again calls the service, the client is expected to provide its client ID. The media service module 502 detects the caller's currently supplied ID and compares this ID with the previously recorded client ID. That is, the media service module 502 can independently identify the client by retrieving the client's terminal server session ID from its impersonation token and, therefore, knows the client ID that should be supplied by the client. If these IDs match, then the media service module 502 permits the call; otherwise, the media service module 502 rejects the call.

It is possible that multiple users can be logged onto the media server 302 at the same time, as discussed above. The media server 302 can be configured to discriminate between the users based on terminal service session IDs extracted from respective client tokens associated with the users.

The client ID thereby prevents the rogue application 544 from "spoofing" the control panel module 506. The use of the client callback object 542 to notify the client of its ID provides extra assurance against rogue applications (compared to an alternative technique of returning the ID as an argument of the Initialize( ) method). This is because the rogue application 544 must meet the additional hurdle of providing a COM client callback object 542 when it calls the Initialize( ) method.

The media server 302 can provide an additional layer of security by requiring that the media service module 502 and the control panel module 506 exchange other secret information prior to establishing formal interaction between these two components.

A.5. Additional Security Provisions

The resource sharing feature described above (implemented using the criteria information 536) finds its most common use in preventing authorized users from accessing resource information that the media server user wishes to maintain private (for example, for any number of reasons set forth in the illustrative family-related application discussed with respect to FIG. 4). Similar privacy concerns exist with respect to dorm room applications (which generally refer to the application of the UPnP network 314 to any setting that may have a relatively large number of authorized users, but in which the media server user nevertheless desires to selectively dole out certain resource information to only a subset of authorized participants of this UPnP network 314).

The resource sharing feature described above also provides a mechanism for safeguarding the resources of a UPnP network 314 against access by unauthorized entities. That is, the resource sharing feature limits the dissemination of resources to a known universe of devices. A device outside this known universe is therefore prohibited from accessing the resources of the UPnP network 314. The resource sharing feature also provides additional assurances by making resource information transfer contingent on the implicit or explicit consent of a specified media server user.

However, the resource sharing feature may not address every known security threat facing the UPnP network 314, particularly in regard to the case of unauthorized (as opposed to authorized) users. Further, security threats posed by unauthorized users are dynamic and opportunistic in nature, and as such, a media server user may have concerns that the resource sharing feature may not stand up to unforeseen future challenges to the security of the UPnP network 314.

The above concerns warrant supplementing the resource sharing feature with additional security mechanisms designed to protect the resource information of the UPnP network 314 particularly against unauthorized users. Additional measures would also be desirable to further ensure that authorized users do not receive private resource information that is not intended for their consumption. More specifically, there are at least two security concerns facing the UPnP network 314. A first security concern is posed by the possibility of an unauthorized entity "tapping" into the resource information provided by the UPnP network 314. This entity may be operating external to the UPnP network 314 and attempting to tap into the UPnP network 314 via cable modem, DSL modem, dialup connectivity, wireless connectivity, or some other coupling strategy. A second concern is posed by the possibility of an authorized or unauthorized entity distributing resource information to a large audience outside the original scope of the UPnP network 314. This is referred to as a "superdistribution" scenario. Superdistribution may be intentional or unintentional.

This section describes multiple techniques for addressing the above two concerns. Any of these techniques can be applied individually, that is, without the other techniques. The media server 302 can also apply any combination of these techniques, including any two, three, four, etc. of these techniques to secure the UPnP network 314 to mitigate these concerns. Indeed, in one implementation, the media server 302 can apply all of the techniques. The media server 302 or other administrative interface can also optionally give the media server user the ability to individually enable and disable these techniques, e.g., through an appropriately configured user interface presentation.

Figure 7:
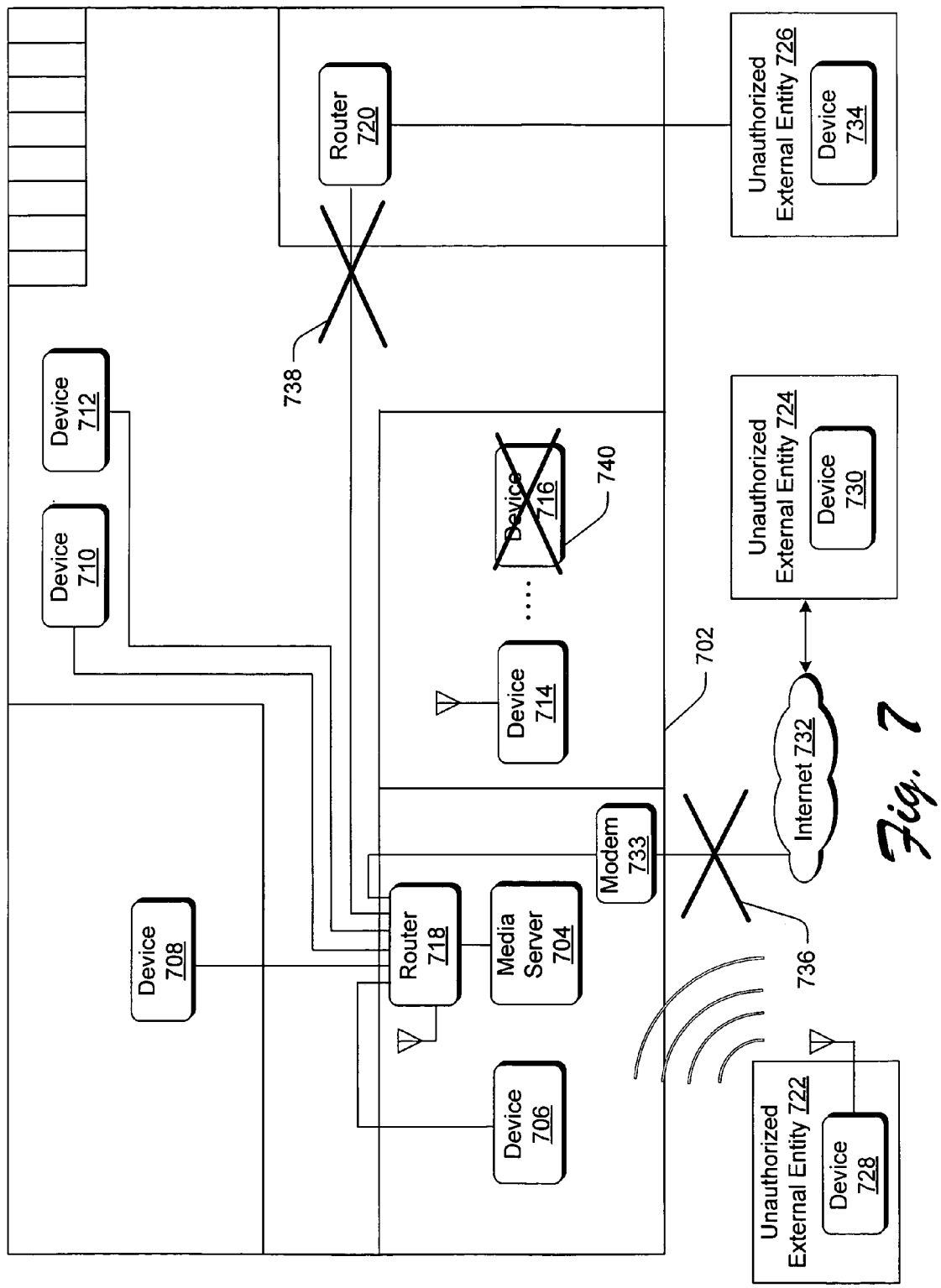
FIG. 7 shows exemplary mechanisms used to prevent unauthorized individuals from gaining access to resources in the context of the application shown in FIG. 4.

FIG. 7 shows a UPnP application that will serve as a vehicle for describing many of the security techniques provided by the media server 302. This application is generally modeled after the application presented in FIG. 4. The application is applied in a local setting, such as a home 702. The home 702 includes a plurality rooms. Each room may contain one or more UPnP devices. In the illustrative case of FIG. 7, the home 702 includes a media server 704 coupled to devices 706-716 via a router 718. The router 718 is also coupled to another router 720. The router 718 can include hardwired connectivity to couple the media server 704 to the devices 706-716 and/or wireless connectivity. For instance an exemplary one of the devices (e.g., device 714) communicates with the router 718 via wireless (e.g., RF, infrared, etc.) coupling.

FIG. 7 also shows a representative sampling of entities that are not authorized to interact with the UPnP network 314 in the home 702, including entities 722, 724, and 726. Entity 722 is using a device 728 to attempt to interact with the home UPnP network 314 via wireless communication. This device 728 might represent a media rendering device with wireless connectivity, or like apparatus. Entity 724 is using a device 730 to attempt to interact with the UPnP network 314 via a network, such as a wide area network. For instance, this device 730 might represent any kind of computer device (e.g., personal computer, server, etc.) coupled to the media server 704 via the Internet 732, modem 733, and router 718 (or, in another implementation, coupled directly to the media server 704 via the Internet 732 and modem 733, that is, without being routed through the router 718). The modem 733 can be a dialup modem, broadband modem, or other kind of modem. Finally, entity 726 is using a device 734 to attempt to interact with the UPnP network 314 via the router 720. These unauthorized entities and devices are merely illustrative of a wide range of different kinds of intruders that may attempt to gain access to the resources of the UPnP network 314.

To thwart the above-described entities, the UPnP network 314 can include one or more of the following mechanisms.

a. IP Address Limiting

The resource information sharing functionality 322 (of FIG. 3) can be limited to a predetermined non-public address range that will have the effect of excluding public broadband traffic. In one exemplary implementation, the predetermined address range is the 192.168 range (e.g., 192.168.0.0 through 192.168.255.255 according to one exemplary implementation) and the Auto IP range (e.g., 169.254.0.0 through 169.254.255.255 according to one exemplary implementation). Other exemplary non-public addresses ranges are 10.0.0.0 through 10.255.255.255 and 172.16.0.0 through 172.31.255.255 (according to one exemplary implementation). Any one of these ranges can be used, or a combination of these ranges can be used (or some other range(s) can be used). The ranges need not be contiguous (e.g., there can be "non-useable" gaps within any of these ranges). Generally, the above specified ranges can be varied in various respects (e.g., by varying the "endpoints" of the ranges).

Say, for purposes of illustration, that the 192.168 and Auto-IP range is used. This range is selected because many commonly available home network routers have built-in DHCP servers that dole out addresses in the 192.168 range. Further, most routers on broadband networks are designed to simply drop messages that specify destination IP addresses in the 192.168 range. Accordingly, the resource information sharing functionality 322 will not respond to any requests having addresses outside the 192.168 range, and any messages within the 192.168 range are generally unsuitable for propagation over the routers of a public broadband network. This has the effect of creating a security wall between the private UPnP network 314 and the public broadband network or dialup connections. FIG. 7 illustrates this concept by showing a blocked access symbol 736 between the media server 704 and the Internet 732. This blocked access prevents someone internal to the home 702 or external to the home 702 from using the media server 704 to superdistribute its resources over a broadband network. This provision also prevents someone internal to the home 702 or external to the home 702 from tapping into the UPnP network 314 in an unauthorized manner.

To implement this feature, the resource transfer module 524, the content directory service module 526 and the device monitoring module 520 (of FIG. 5) can all be configured to monitor interfaces only in the predetermined address range and/or to discard requests originating from other IP addresses. The resource information sharing functionality 322 can provide various mechanisms that prohibit a media server user (or anyone else, for that matter) from modifying this predetermined address range, such as by hard coding this address range rather than making it a parameter accessible to media server user configuration.

b. MAC Address Authentication

As described previously, the resource information sharing functionality 322 uses the media access protocol (MAC) address of a device or other device-specific information to authenticate it. In this technique, the resource information sharing functionality 322 first identifies the IP address of a new device added to the UPnP network 314. (The new device is first detected using the device monitoring module 520 of FIG. 5.) The resource information sharing functionality 322 then translates the IP address into the MAC address using, for example, the SendARP function provided by Microsoft® Corporation's Internet Protocol Helper, which uses address resolution protocol (ARP). As discussed previously, the resource information sharing functionality 322 can then notify the media server user of the existence of the new device using, for instance, the user interface presentations to be discussed in Section B (below). If the media server user authorizes the device, the resource information sharing functionality 322 uses the IP and MAC addresses to authenticate the device when it subsequently makes a UPnP request (such as a browse or a search request) or makes a content-related request (such as an HTTP GET request). Requests from unauthorized devices are ignored. Using the MAC address of the originating request to authenticate the device is advantageous, because the IP address alone is not reliable (since IP addresses can change depending on the availability of a DHCP server).

This MAC authentication technique is particularly attractive in preventing wireless devices, such as device 728, from gaining unauthorized access to the resource information of the UPnP network 314. For instance, if entity 722 was driving by the home 702 and was simultaneously using the wireless access device 728, the resource information sharing functionality 322 might displaying a pop up message which asks the media server user (of the media server 704) whether he or she wants to authorize this device. Unless the media server user opts to permit access, then the resource information sharing functionality 322 denies access to this device 728.

The MAC address authentication is most valuable when used in conjunction with other security measures, such as IP address limiting (as described in subsection (a) above). For instance, MAC authentication without IP address limiting may not provide adequate safeguards in network configurations in which the media server 704 is directly connected to a broadband network (or when the media server 704 is coupled to external functionality via a dialup connection). Without IP address limiting, the resource information sharing functionality 322 can detect "neighboring" devices outside the home and query the media server user whether these devices should be authenticated; this may not pose security risks, but it may present a nuisance due to the frequent display of pop up messages. Further, suppose that a broadband (or dialup) modem is connected to a proxy address resolution protocol (ARP) router on the Internet service provider's network. In this case, the resource information sharing functionality 322 will effectively authenticate all devices on the subnet that are routed through the proxy ARP router when it authenticates any one of these devices.

c. Subnet Limiting

In one exemplary implementation, the resource information sharing functionality 322 requires its network clients to operate on the same subnet that it operates on. By virtue of this restriction, the resource information sharing functionality 322 ignores UPnP action requests and resource content retrieval requests received from clients outside its local subnet. This has the effect of further reducing the possibility that devices operating outside the scope of the UPnP network 314 will be able to access its resources.

Note that the MAC address authentication procedure described above does not work across subnet boundaries because the ARP protocol does not transmit ARP packets across subnet boundaries; thus, if MAC address authentication is used, this technique will inherently also restrict operation to a single subnet. But using the resource information sharing functionality 322 to enforce subnet limiting differs from the implicit subnet limiting provided by SendARP(); for instance, the latter technique can be compromised by modifying a routing table used in the technique.

Also note that, by default, the SSDP service (e.g., provided by Microsoft® Corporation on Windows® operating system platforms) limits the broadcast SSDP announcements to the subnet. That is, UPnP devices use SSDP to announce their presence over the network, and so, for the default setting, the resource information sharing functionality 322 will not be detected by UPnP devices on other subnets. This SSDP feature, however, differs from the subnet limiting performed by the resource information sharing functionality 322 because the former technique is dependent on a registry configurable setting. Also, the SSDP announcements are not limited to the 192.168 and Auto IP address ranges.

d. TTL Limiting

The resource information sharing functionality 322 can limit a time to live (TTL) parameter to further reduce the possibility that unauthorized entities are permitted to interact with the resource information of the UPnP network 314. In one exemplary implementation, the TTL parameter is an Internet Protocol (IP) parameter that generally corresponds to the number of nodes (e.g., IP Level 3 nodes, such as routers, etc.) traversed by a message in the course of it being sent from a source node to a destination node. Each IP packet includes a TTL parameter. In the context of a UPnP network 314, the TTL parameter can restrict the routing of messages sent by the content discovery service module 526 containing resource metadata associated with the shared resources. Alternatively, or in addition, the TTL parameter can also restrict the routing of responses to resource content requests (such as HTTP GET messages). For instance, a TTL parameter set to the number 3 would be sufficient to prohibit dissemination of resource information over a public broadband network (because transmission to a destination over a public broadband network will typically expose the message to many more routers than three). In the exemplary case where the resource information sharing functionality 322 restricts the UPnP network 314 to a single network that may involve only one router, the TTL parameter can be set as low as 1. In one exemplary implementation, the resource information sharing functionality 322 can hard code the TTL parameter so that it cannot readily be changed by a media server user (or by any other entity).

Note, for example, the exemplary case of FIG. 7 in which the TTL parameter has been set to 1. This setting can prohibit the media server 704 from serving out resource metadata and resource content to entity 726, as this entity 726 is coupled to the media server 704 via more than one router. The TTL setting thus effectively blocks access to router 720, as indicated by blocked access symbol 738. Setting the TTL parameter to a low value will also prohibit dissemination of resource information over the Internet 732, because such a broadband transmission will be subject to many intermediate routers en route to its final destination.

e. Device and Session Limiting

The resource information sharing functionality 322 can limit the number of UPnP devices that can be authorized at any one time to a predetermined number (such as, in one example, 10 devices). In one implementation, the specified maximum number of UPnP devices can encompass all kinds of devices that can be coupled to the UPnP network, including media rendering devices, media servers, control points, etc. In another implementation, the specified maximum number of devices can only pertain to one or more categories of UPnP devices, such as only media rendering devices. The resource information sharing functionality 322 can also limit the number of concurrent resource content serving sessions (such as concurrent HTTP sessions) to a predetermined number (such as, in one example, 10 sessions). The resource information sharing functionality 322 can hard code both of these parameters (i.e., the maximum device number and the maximum session number) to prevent a media server user (or any other entity) from easily changing these parameters and thereby avoiding this restriction.

In the context of FIG. 7, the home UPnP network 314 may limit the number of devices to 5, which may have the effect of preventing device 716 from gaining access to the resource information (both resource metadata and resource content). This denied access is denoted in FIG. 7 by the block access symbol 740. This provision helps ensure that even an authorized media server user cannot use the UPnP network 314 to distribute resources to a large number of recipients (e.g., in a superdistribution scenario). This provision also will generally thwart attempts to distribute resource metadata and resource content over the Internet 732, insofar as public broadband transmission commonly involves a great number of participants attempting to access shared resources.

f. Limiting Candidate Devices for Authentication to UPnP Actions

The resource information sharing functionality 322 can also limit interaction to only those devices that have invoked a UPnP action or that have announced themselves on the UPnP network 314 using SSDP as a media rendering device. (The former restriction accommodates UPnP control points which do not have to announce themselves on the UPnP network 314, but which are otherwise permitted to interact with the UPnP network 314.) These restrictions help exclude unauthorized entities that are attempting to interact with the resource information sharing functionality 322. That is, a potential "hacker" will need to acquire and run appropriate UPnP software in order to interact with the resource information shared by the resource information sharing functionality 322; this requirement raises the bar on unauthorized access to the UPnP network 314. For example, by virtue of these restrictions, the hacker cannot gain access to the resource content shared by the resource information sharing functionality 322 merely by opening up a Web browser and sending the resource information sharing functionality 322 a previously published resource locator corresponding to a shared resource. Rather, a device must first prove that it is a proper UPnP authorized device, e.g., by sending an initial UPnP action request (for instance, corresponding to a browse or a search request); only then will that device be permitted to access resource content using a resource content retrieval request. (Note that, in one exemplary implementation, devices that attempt to retrieve resource content without having been previously approved are not even presented to the media server user for approval even though they are newly discovered devices; that is, these content retrieval requests are ignored.)

As a further safeguard, the resource information sharing functionality 322 can require that every device that announces itself as a media rendering device have a unique device number (UDN). In one implementation, the resource information sharing functionality 322 verifies that the rendering device's UDN is different from that of other media rendering devices currently or previously detected on the UPnP network 314. The resource information sharing functionality 322 can silently deny access to a media rendering device if its UDN matches an already detected UDN. Further, once a device has been detected to be a media rendering device, the resource information sharing functionality 322 can require that its UDN remain unaltered. If the resource information sharing functionality 322 detects a change, then it can silently deny access to the device. Further, if a media rendering device has a serial number, the resource information sharing functionality 322 can require that this number also remain unaltered. If the resource information sharing functionality 322 detects a change in the number, then it can silently deny access to the device.

g. Resource Locator Retirement

As noted above, the resource information sharing functionality 322 uses resource locators (such as, but not limited to, HTTP URLs) to define the location of its resources. A component of each resource locator is a resource ID (e.g., ResourceID) that identifies the associated resource content. The resource information sharing functionality 322 can provide yet another security safeguard by periodically changing the resource locators that identify its resource content items. (In the following discussion, the term "resource content item" refers to the resource content associated with a selected resource stored in the resource store 320; the term "item" is added simply for grammatical convenience and clarity.) This can be performed by periodically changing the resource IDs that identify the resource content items. This safeguard will have the effect of placing a time limit on the use of the resource locators. For instance, a consumer can perform a UPnP browse or a UPnP search action to retrieve one or more resource locators. However, since the resource information sharing functionality 322 periodically changes these resource locators, the consumer is forced to retrieve resource content items using a resource content retrieval request (using the retrieved resource locators) in a relatively timely manner. If the consumer waits too long, these resource locators will become stale and inoperative. Accordingly, if resource locators are leaked to unauthorized entities, these resource locators will not be effective for very long; this limits the damage caused by undesired disclosure of resource locators.

h. Various Resource Transfer Module 524 Security Measures

Several of the mechanisms identified above help protect the resource transfer module 524 (e.g., which may be implemented as an HTTP server) against various security threats. For instance, by virtue of the IP address limiting measure, the resource information sharing functionality 322 starts the resource transfer module 524 on only network interfaces in a private range (e.g., the 192.168 range) or in the Auto IP range. Further, by virtue of device and session limiting, the resource information sharing functionality 322 limits the number of resource content retrieval sessions to a predetermined number (e.g., 10 sessions) and limits the number of approved devices to a predetermined number (e.g., 10 devices). By virtue of the TTL limiting, the resource information sharing functionality 322 can limit the TTL parameter to a predetermined number (such as 3), and thereby restrict the number of routers involved when providing a resource content response. By virtue of the UPnP action limiting, the resource information sharing functionality 322 can serve resource content requests only if they originate from previously approved devices; it can ignore all other requests. (More specifically, the resource sharing functionality 322 does not have to present new devices that attempt to access resource content to the media server user for approval). Further, the resource information sharing functionality 322 shares out resource content only if the media server user sharing out the resource content has permissions to access the resource (e.g., the file) on the file system; this is so that media server users who are denied access to a resource on the media server 302 cannot play its content on a device on the UPnP network 314. The resource information sharing functionality 322 will further determine whether sharing is limited to certain devices, or preconditioned on a particular individual being logged onto the media server system.

The resource transfer module 524 can also include a variety of other security measures. For instance, the resource transfer module 524 can be configured to "time out" if a client opens a communication socket and only partially writes the resource content retrieval request or does not read the resource content response in a timely manner. In one exemplary implementation, the resource information sharing functionality 322 can set these timeouts to five minutes. These timeouts can be hard coded to prevent media server users (or anyone else) from easily changing their values.

According to another feature, the resource transfer module 524 can limit resource content retrieval requests to a predetermined size, such as about 4000 characters.

According to another feature, the resource transfer module 524 can validate resource locators. Validation can entail ensuring that the resource locator conforms to a predetermined format, such as: http://machine ip:port/ResourceID (that is, in the case that an HTTP URL is used). The resource transfer module 524 can also carefully parse and validate request headers.

A.6. URL Parameterization Provisions

Recall, with reference to FIG. 3, that the retrieval of resource information from the media server 302 can include four principal exchanges of information. In a first exchange (represented by path 324), a consumer can use control point 316 to send a UPnP query to the media server 302. This UPnP query can be structured as a browse request or a search request. In a browse request, the consumer's intent is to scan a collection of resource metadata associated with the resources provided by the media server 302. In a search request, the consumer's intent is more targeted, e.g., to find specific resource metadata provided by the media server 302 identified by various search terms, etc.

In either case, in a second exchange (represented by path 326), the media server 302 responds by presenting resource metadata associated with one or more resources (e.g., files in the resource store 320) that meet the consumer's request. This resource metadata can include various high level information pertaining to the matching resources, such as title, genre, artist, date created, and so on. This resource metadata can also include resource locators (such as URLs) that identify the respective network locations from which the resource content items can be retrieved from. To facilitate discussion, in this section, the specific use of URLs in conjunction with an HTTP server is assumed; however, the principles described here can be applied to other kinds of resource locators and associated resource content servers. (In the following discussion, the term "resource content item" refers to the resource content associated with a selected resource stored in the resource store 320; the term "item" is added simply for grammatical convenience and clarity.)

Presume that, after viewing the resource metadata, the consumer selects a corresponding resource content item to be played on a rendering device, such as rendering device 306. In this case, in a third exchange (represented by path 330), the consumer enables the rendering device 306 to transmit a request to the media server 302 that instructs the media server 302 to retrieve the selected resource content item. For instance, the consumer can transfer the URL associated with the selected resource content item to the rendering device 306. The rendering device 306 responds by transmitting an HTTP GET request to the media server 302 that specifies the selected resource content item. This HTTP GET request includes the URL (that was passed to it by the control point) corresponding to the selected resource content item.

Finally, the media server 302 responds to the HTTP GET request by retrieving the selected resource content item at the location specified by the URL. In a fourth exchange (represented by path 332), the media server 302 then provides the selected resource content item to the rendering device 306.

The remainder of this section describes a technique for improving the efficiency of the information exchanges described above.

To begin with, note that the resource store 320 will typically store files in a defined original media format. The term "media format" encompasses any characteristics regarding a resource that influence how it is stored and/or rendered. For example, the media format may specify a format type (e.g., various types of compressed and uncompressed formats), a format resolution, and so on. For example, the resource store 320 can store an image file having a format type of RGB and a format resolution of 640×480. Accordingly, a rendering device can display this image file if it is configured to process images of size 640×480 expressed in the RGB format type. In addition, the media server 302 can include functionality (not shown) for converting a resource from its original media format into another media format upon the request of the consumer. Or the resource store 320 can store plural versions of the resources expressed in different respective original media formats. In either of these two cases, different media formats associated with a single resource can be conceptualized as comprising plural individual resources. Thus, for each individual resource, the media server 302 can be conceptualized as offering plural resources for selective distribution corresponding to different media formats.

The technique described herein provides a mechanism for allowing a consumer to retrieve resource content that conforms to a specified media format. The media server 302 can accomplish this objective in different ways. For frame of reference, one way of accomplishing this objective is to have the media server 302 publish different URLs respectively associated with different media formats of a resource content item. For example, a first exemplary URL may specify a resource content item having a format type of RGB and a format resolution of 640×480. A second exemplary URL may specify the same resource content item, but this time having a format type of YUV and a format resolution of 1280×1024. Other exemplary media formats correspond to various icon and thumbnail sized versions, and a variety of standard display resolution formats. This approach, however, has various disadvantages. For instance, it requires the media server 302 to manage and publish a potentially large number of URLs associated with different media format permutations associated with a single "parent" resource content item. Providing this many URLs can complicate the UPnP network 314, thereby potentially increasing network traffic on the UPnP network 314, and creating other potential problems.

More specifically, in one implementation, the media server 302 can respond to a browse or a search UPnP request by providing a so-called "res" element for each matching resource. The "res" element includes the URL that identifies where the resource content item associated with the matching resource can be found. The above-described solution can specify the multiple media formats corresponding to a matching resource item in different ways. For instance, the media server 302 can provide multiple res elements each associated with a respective media format (each having its own URL). Alternatively, the media server 302 can create multiple matching items for each matching resource, with each matching item associated with a respective media format (having its own URL). Both of these solutions can introduce various complexities into the UPnP network 314, potentially negatively affecting its performance.

Also, in the above solution, the media server 302 only provides a limited set of URLs corresponding to an associated set of supported media formats. This limited set of provided media formats, however, may not meet the needs of the resource consumer. In the technique featured below, the media server 302 can publish a single URL for an available resource content item in response to the consumer's browse or search request, and that single URL can include variable parameters that specify respective characteristic attributes that can be modified to describe a range of different media formats. That is, the media server 302 can publish the URL with original default values filled in for its variable parameters that reflect the media format in which the associated resource content item is determined to be best presented. A determination of the default media format that is "best" can be based on one or more criteria. A control point (e.g., control point 316) can modify these default parameters to accommodate a native media format used by a media rendering device, or based on some other consideration. For example, the control point 316 can determine the media rendering device 306's rendering capabilities by calling a GetProtocolInfo UPnP action provided by its connection manager service module. The control point 316 can then select a media format (or more than one media format) that is compatible with the rendering device 306's presentation capabilities and that is compatible with the rendering formats that the resource itself can support (as gleaned from the resource metadata returned to the control point 316 by the media server 302). In the case where the resource content can be represented in more than one media format, the control point 316 can alert the consumer to this, and allow the consumer to select a media format. To facilitate to this task, the control point 316 can convert the supported media format information into information that is easy for the consumer to understand. Or the control point 316 can perform automated analysis to select among multiple possible formats (for example, based on a consideration of what the consumer has selected in the past, and so on).

In any case, modifying the parameters creates a modified URL, which can then be forwarded to the rendering device (e.g., rendering device 306) that will present the resource content. The rendering device 306 can then retrieve the resource content item corresponding to the modified URL by submitting this modified URL to the media server 302. Alternatively, the control point 316 can simply send the original URL, without modifying its parameters, to the rendering device 306, which then transfers it to the media server 302).

The media server 302 responds by reading the parameters from the URL sent to it by the media rendering device 306 and then providing the resource content item to the media rendering device 306 in the media format specified by the parameters in the URL. This operation may require the media server 302 to convert the selected resource content item from an original media format to the media format specified by the parameters of the URL. Or this operation may simply require the media server 302 to provide the stored resource content item without modifying it (in the case that the parameters indicate that no modification is necessary). Alternatively, the media server 302 may have stored the resource content item in multiple different media formats; in this case, the media server 302 can pick an appropriate stored media format if one is available without having to modify it.

In one implementation, the media rendering device 306 presents the received resource content item in the media format it receives from media server 302. In another implementation, the media rendering device 306 can also include conversion functionality (not shown) for converting the received resource content item to yet another media format before presenting it (or potentially, just storing it, etc.).

By virtue of the above-described technique, the media server 302 is not required to publish a large number of URLs associated with different permutations of possible media formats. This helps reduce traffic in the UPnP network 314 and simplifies the URL management requirements of the media server 302. This strategy also gives the control point 316 the flexibility to dynamically tailor the media format to best suit its needs for a rendering scenario it is currently addressing, without having to choose between a limited number of stock options. This strategy also provides a standard and uniform technique that allows control points to tailor the media format for different media servers with which they may interact with.

In one implementation, the media server 302 can select the original default values used in the URL based on one or more criteria. For instance, the media server 302 can select the original default values used in the URL by examining the resource associated with this URL. The resource may include information contained therein which identifies preferred original default values. Alternatively, the media server 302 can performs its own analysis on information extracted from a resource to make a judgment on the preferred original default values. Or the media server 302 can use other factors that are not derived from the resource itself, such as a consideration of what media formats are most popular, and so on. Still other techniques can be provided for selecting these preferred initial values.

Exemplary details of the above summarized technique are provided in the following. Consider the following exemplary parameterized URL that can be used to implement the above-described resource content retrieval strategy:

http://ServerName/Tulips.jpg?format=YUV,
    width=640,height=480

The URL includes a first field that identifies a protocol scheme. The protocol scheme defines the technique used to access the resource content item. In this case, the first field specifies "http," indicating that the resource content item is to be accessed using the hypertext transfer protocol technique. A second field identifies an authority. The authority defines the entity that will provide the resource content item, typically the server that will provide the resource content item. In this case, the second field specifies "ServerName" as the authority. A third field specifies a path used to access the resource content item. The path (which, in this case, is "Tulips.jpg") allows the authority (e.g., the ServerName server) to identify the location of the resource content item in its system. A fourth field identifies a query. The query includes information used to retrieve a media format of the resource content item. (The media server 302 can provide the above-described parameterized URL to the control point 316 with the package of an XML "res" element. The res element can also include other metadata associated with the matching resource besides the URL).

More specifically, in an exemplary implementation, the fourth field in the above-listed URL includes a number of parameters that collectively describe a media format used to render the resource. In the above example, a first parameter specifies the format type of the presentation format as YUV, a second parameter specifies the resolution width as 640, and a third parameter specifies the resolution height as 480. These parameters are merely exemplary. The URL can specify additional parameters, or fewer parameters. For instance, the URL can specify three additional parameters that describe a fill color used to render an image, e.g., R(red)=x, B(blue)=y, and G(green)=z. (That is, when an image is rendered, it may not cover the entire display surface of the rendering device; the fill color specifies the red, blue, and green components of the background color displayed in those display regions that do not include image content.)

Further, the parameterized URL can be expressed using other syntactical formats besides that specified above. In the above format, each parameter is specified as a name-value pair with the syntax of "name=value." However, another syntax can omit the name information; instead of explicitly identifying the name information, this information can be inferred from the position of the associated value in the URL. An exemplary URL that omits explicit identification of the name information is as follows:

http://ServerName/Tulips.jpg?YUV,640×480

It is also possible to provide a hybrid format that uses both name-value syntax for some parameters and a positional syntax (without expressly identifying the name) for other parameters.

Whatever format is used, the media server 302 can also publish information regarding the range of values that can be selected for each parameter. For example, in one illustrative implementation, the name parameter can accept values of YUV or RGB, the width parameter can accept values of 0 to 2048, and the height parameter can accept values from 0 to 2048. The media server 302 can publish this range information with the resource metadata itself when responding to a consumer's browse or a consumer's search requests. Alternatively, the media server 302 can disseminate the range information on a periodic basis, e.g., once a day, once a week, etc. Still alternatively, the range information can be pre-stored in the control points and/or rendering devices based on known permissible ranges, so it is not necessary for the media server 302 to communicate this information.

As mentioned in the summary above, when the control point 316 receives the parameterized URL, it can change the parameters to any values permitted within the specified ranges of values (with or without the assistance of the consumer). For instance, consider the first identified exemplary URL. If the consumer's rendering device 306 is capable of displaying a YUV image having a resolution of 640×480, then the control point 316 would not have to modify the URL before the rendering device 306 submits it to the media server 302. However, suppose that a media rendering device can display YUV images on a display having a resolution of 1280×1024. In this case, the control point can modify the above-described URL as follows:

http://ServerName/Tulips.jpg?format=YUV,
        width=1280,height=1024

The rendering device 306 could then submit this modified URL to the media server 302 (after it received it from the control point). The media server 302 would respond by retrieving the desired resource content item and converting it to the specified resolution of 1280×1024 before sending it to the rendering device 306.

Consider another example where the media rendering device 306 can only display RGB images. In this case, the control point can modify the URL (which originally specified the YUV format type) to the RGB format type as follows:

http://ServerName/Tulips.jpg?format=RGB,
        width=1280,height=1024.

Again, the media server 302 would convert the image in the resource content item to an RGB image before sending it to the media rendering device 306. The media server 302 would also scale this image to accommodate the resolution expectations of the rendering device 306 (i.e., 1280×1024).

In one implementation, when the media server 302 converts the resolution of the image to suit the specifications of the rendering device 306, it will attempt to preserve the aspect ratio of the original image. This prevents the image from appearing unnaturally distorted on the rendering device 306. This may leave regions of the display surface of the rendering device that do not contain image content. The fill color that can be specified in the URL can be used to display a background color in these empty regions.

The examples above emphasized the use of parameterized URLs to render images. However, this strategy is also applicable to other media and information types, such as audio information and video information. For instance, for PCM audio, the URL can includes parameters that specify the sampling rate, the number of channels (mono, stereo, 5.1 surround sound, etc.) and the number of bits per sample. For digital video, the URL can specify whether NTSC or PAL is to be used at the rendering device, and so on.

Further, the examples presented above emphasized the use of URL parameters that describe respective characteristic attributes that pertain to the format of the resource content (e.g., generally pertaining to how the resource content is stored and/or presented). However, other parameters can describe attributes that pertain to other features of the resource content. For instance, these other parameters can describe timing information related to the playback of resource content, such as a time interval from the start of the resource content at which resource content is to be played back, as well as the duration of the playback, and so on.

Further, the examples presented above described the case where a single URL was used to define all media format permutations associated with a resource content item. However, the media server can use two or more URLs to represent different aspects of the resource content item. For example, different URLs can be generated for different MIME types, and each URL can include one or more parameters within the context of a particular MIME type. For instance, a media server that can present a resource content item in WMA and MP3 formats can provide two URLs corresponding to these two formats. Each of these URLs may include one or more variable parameters for changing format characteristics within their particular MIME type. For example, the WMA URL can include a bit rate parameter that can be modified from a bit rate of 128 kbps to a bit rate of 90 kbps, etc. Converting from one MIME type (or other type of category) to another can be referred to as "inter-format" transcoding. Converting parameters within a MIME type (or other type of category) can be referred to as "intra-format" transcoding. However, this is merely one exemplary scenario. As mentioned, the implementations described above used a single URL to convert between all aspects of a resource content item, including format type.

Further, the examples presented above described a resource content retrieval procedure whereby a control point receives an original URL, modifies that URL, and then transfers that modified URL to the media rendering device (or, if no change is made, transfers the unmodified URL to the media rendering device). The media rendering device then transfers the modified (or unmodified) URL to the media server, prompting the media server to return the resource content item that is identified in the modified or unmodified URL. However, many other retrieval schemes are possible. For instance, the control point can retrieve the original URL and send it immediately to the media rendering device. The media rendering device can then modify the URL (or decide not to modify it), and transfer this URL to the media server. In this implementation, the control point would not have to investigate the rendering requirements/characteristics of the media rendering device, since the media rendering device is now itself handling any modifying of the URL that may be required or desired. Still other permutations are possible. For instance, a single recipient entity can perform all of the functions, or one or more other entities besides the control point and the media rendering device can be employed to serve a role in the retrieval of resource information.

Finally, the above discussion was based on one implementation in which the media server 302 served the role of receiving the modified URL, processing the resource content item based on the modified URL, and doling out the resource content to the rendering device (or other recipient entity). But, more generally, the media server 302 can be implemented having (or can be conceptualized as having) multiple agents or modules for performing each these tasks, or a different allocation of tasks, and the agents performing these tasks may or may not be co-located together, and/or with other parts of the media server 302. For instance, in one implementation, the media server 302 can be viewed as a loose aggregation of dispersed agents performing the tasks described above that together constitute the media server 302.

B. Exemplary User Interface Presentations

In one exemplary implementation, the control panel module 506 (of FIG. 5) provides a series of UI presentations (also referred to as pages) that allow media server users to interact with the media server 302. For instance, the control panel module 506 can provide a first series of UI pages for enabling and disabling devices coupled to the UPnP network 314. The control panel 506 module can provide another series of UI pages for allowing a media server user to select which resources should be shared, and under what conditions the resources should be shared. Sections B.1 and B.2 respectively describe these two categories of UI pages.

Generally, in one implementation, the control panel module 506 can provide the above-described UI pages through a control panel interface (such as the familiar control panel interface functionality provided by Microsoft® Corporation of Redmond, Wash.). As such, the UI presentations can be tailored to adopt the look and feel of control panel UI presentations (having, for instance, "tabbed" display pages). This choice in UI style is merely exemplary; other styles and UI layouts can be used to implement the UI pages.

B.1. Exemplary UI for Authorizing New Devices

Figure 8:
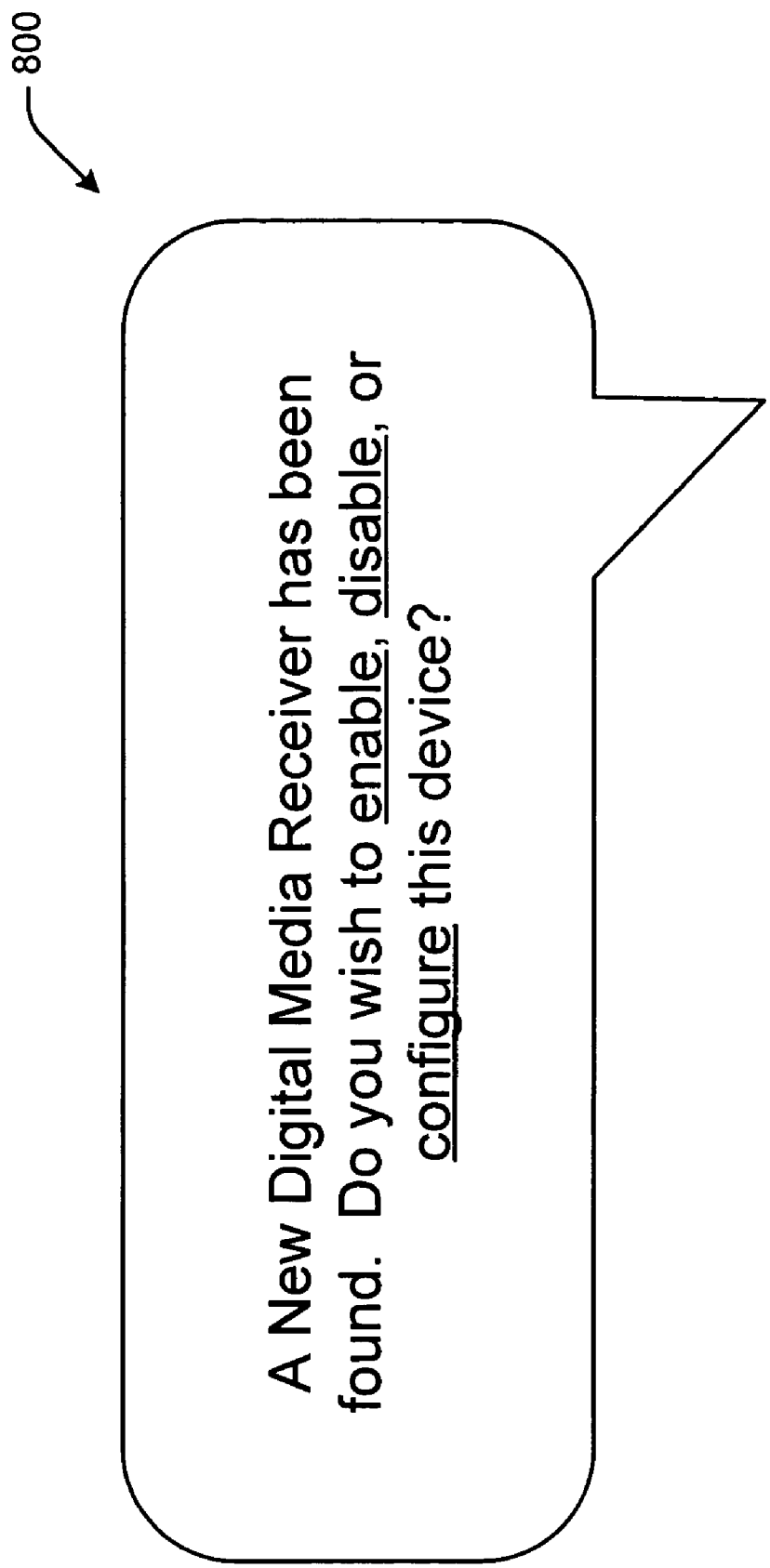
FIGS. 8-15 show different exemplary user interface (UI) pages for presentation by the media server of FIG. 5.
Figure 9:
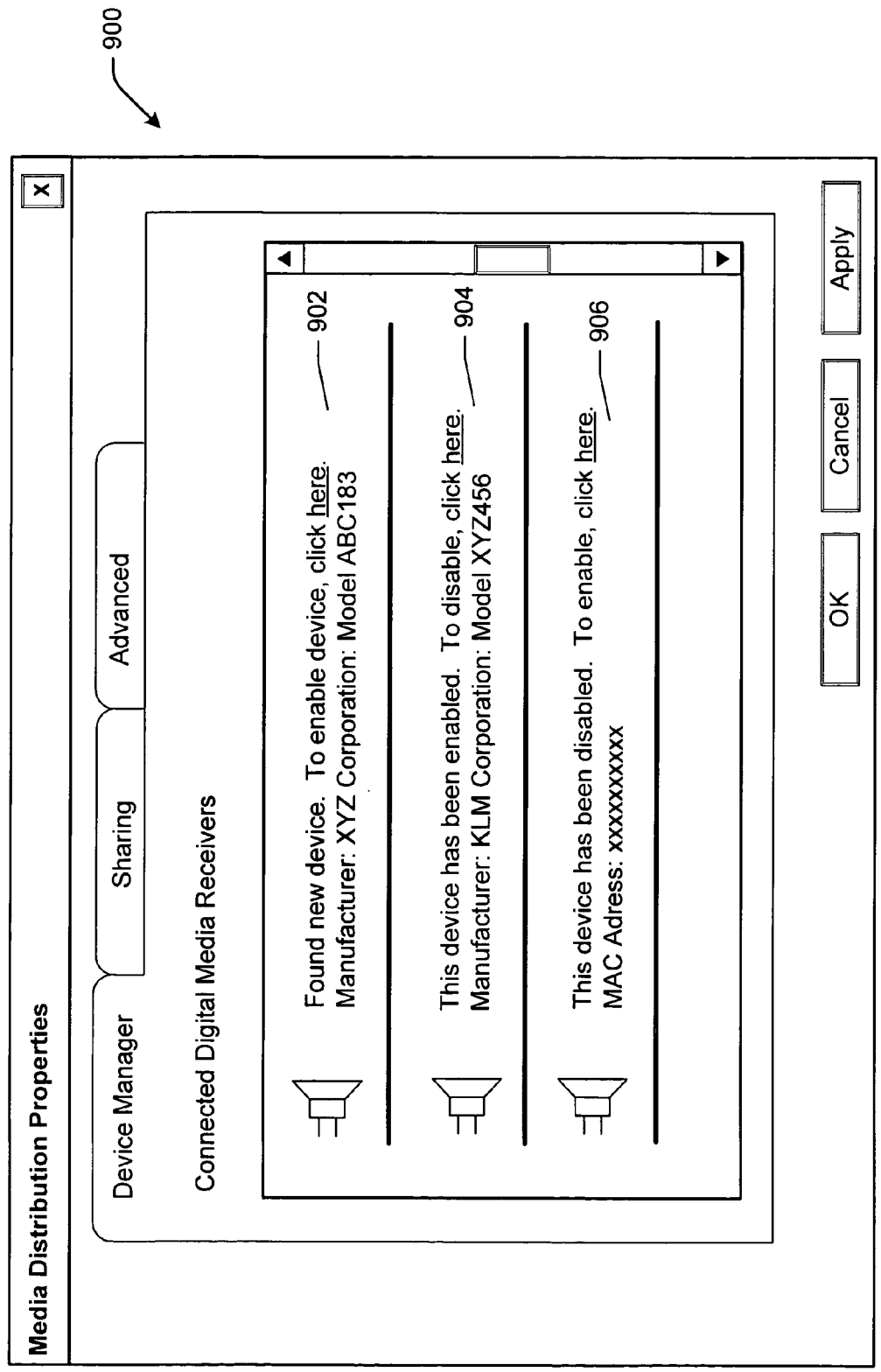
Figure 10:
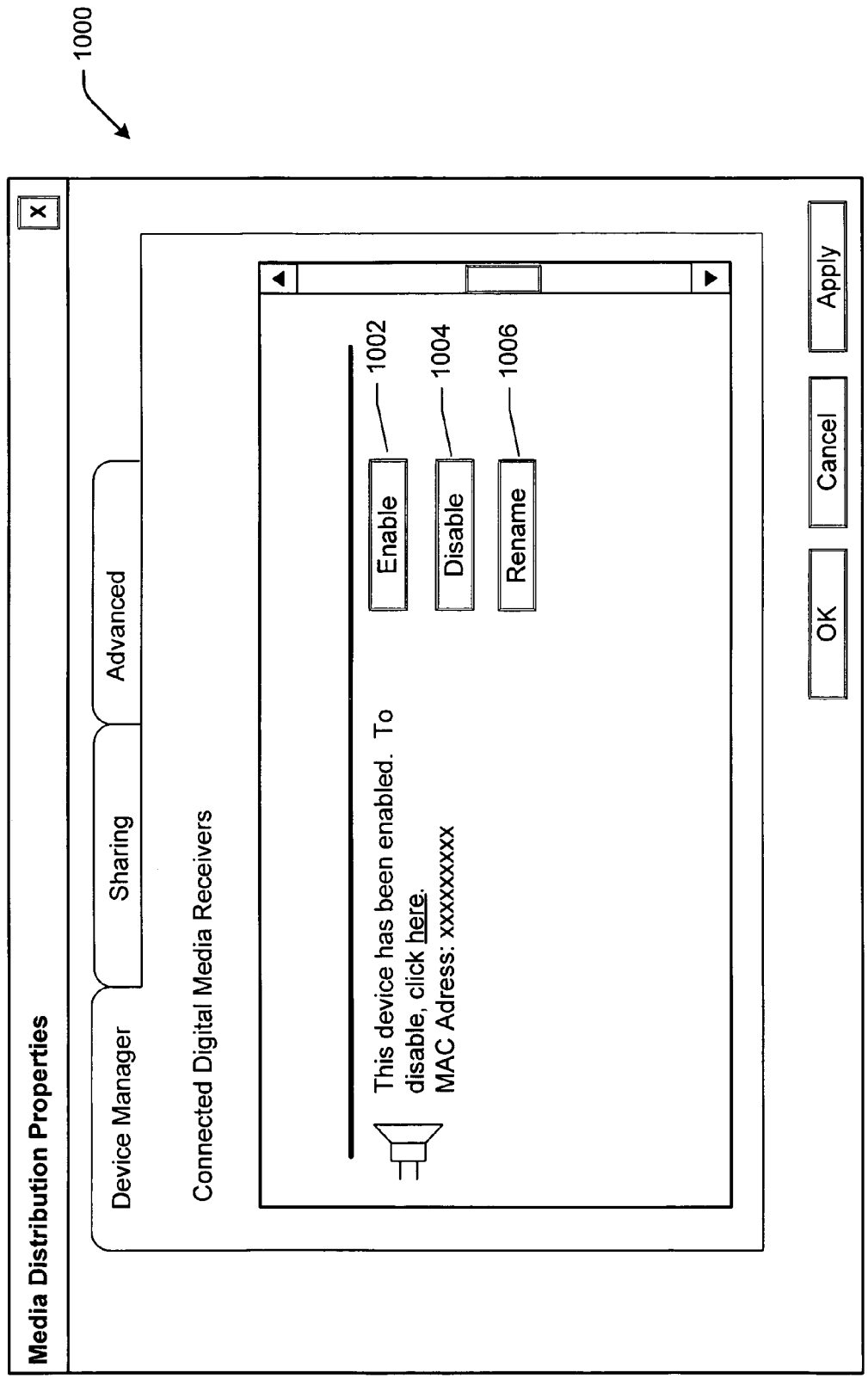

FIGS. 8-10 show different UI pages that the control panel module 506 can use to handle the introduction of devices to the network 314.

To begin with, when a new media rendering device is detected on the UPnP network 314, the media server 302 can be implemented to alert the media server user of its presence. According to one technique, the control panel module 506 can perform this alerting function by providing the balloon type message 800 shown in FIG. 8. This message 800 states that "A New Digital Media Receiver has been found. Do you wish to enable, disable, or configure this device?" This message 800 can include hypertext links that allow the media server user to select one of the enumerated options, that is, by clicking on the hypertext link associated with a selected option. Other message styles and selection formats can be used; the message 800 shown in FIG. 8 is merely one example.

The control panel object 506 activates the UI page 900 shown in FIG. 9 upon activation of a hypertext link in the message 800. This page 900 includes a plurality of sections (902, 904, 906). Each section provides information regarding a different device coupled to the UPnP network 314. For instance, section 902 indicates a new device has been found. This section 902 also identifies the manufacturer and model of the new device. This section 902 also gives the media server user the option of enabling the new device by activating a hypertext link within the section. Section 904 describes a device that has been previously enabled. Accordingly, this section 904 gives the media server user an opportunity to disable this device by activating a hypertext link associated with this section 904. Section 906 describes a device that has been previously disabled (but is not otherwise new to the UPnP network 314). Accordingly, this section 906 gives the media server user an opportunity to enable this device again.

The control panel object 506 activates UI page 1000 shown in FIG. 10 if the media server user activates a hypertext link associated with any of the sections in UI page 900. UI page 1000 provides overview information that describes the characteristics of the selected device. It also includes three command buttons (1002, 1004, 1006). Command button 1002 allows the media server user to enable the device. Command button 1004 allows the media server user to disable the device. Command button 1006 allows the media server user to change the name of the device as it will appear on the UI display pages. This last button 1006 may be useful to give the device a "user friendly" name that is easily recognized, such as "Kid's PC."

B.2. Exemplary UI for Sharing Resources

Figure 11:
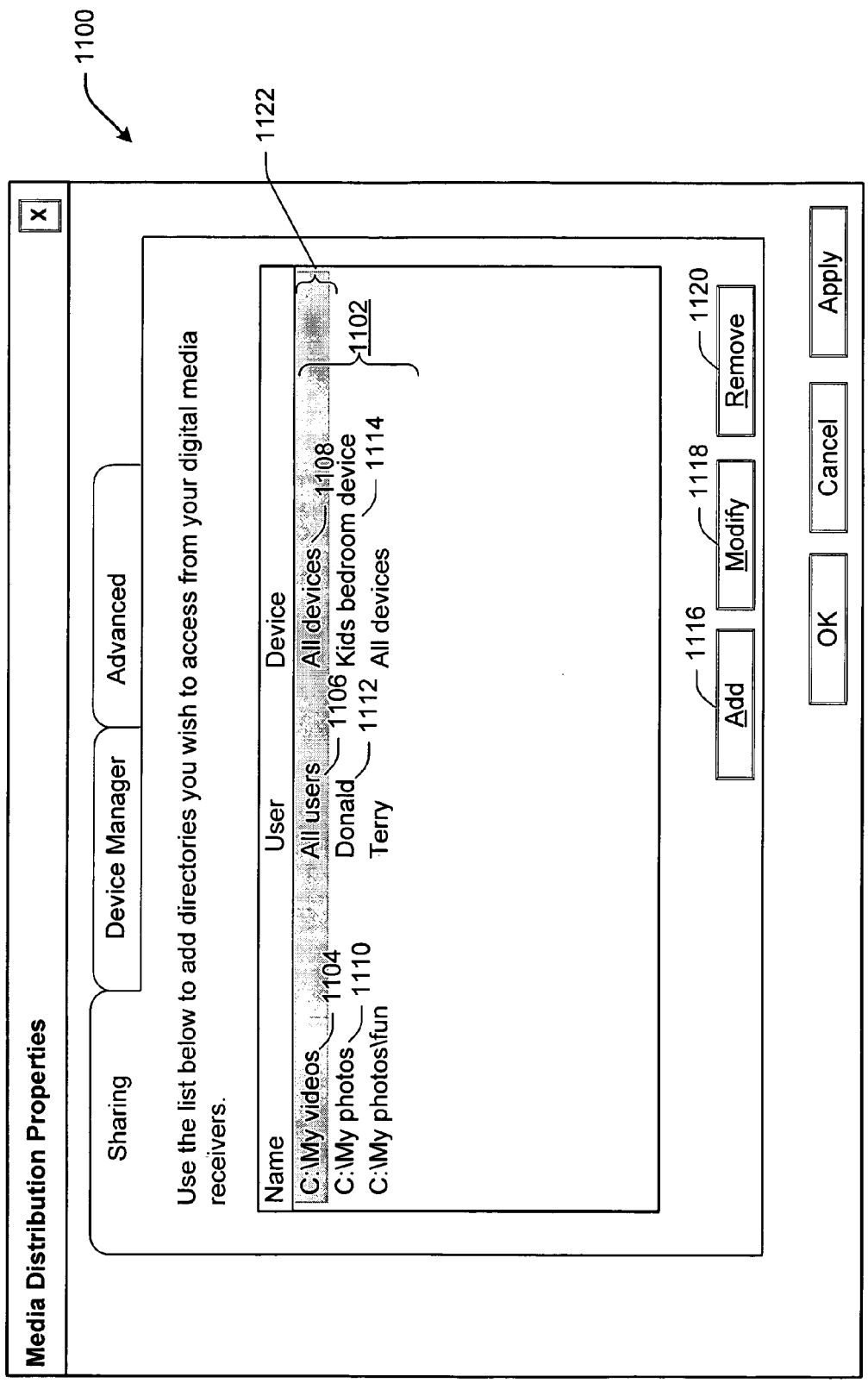

FIG. 11 shows a UI presentation page 1100 that illustrates the associations between various resource folders and different distribution criteria that govern the dissemination of the resource information in these resource folders (including resource metadata and resource content) over the UPnP network 314. The page 1100 shows three exemplary entries 1102. A first entry identifies the name of the shared resource folder (e.g., resource folder "C:\My videos" 1104) on the resource store 320, the consent-related criterion associated with this resource folder (e.g., "All users" 1106), and the device criterion associated with this resource folder (e.g., "All devices" 1108). The criterion "All users" 1106 indicates that the resources in the resource folder "C:\My videos" 1104 can be retrieved regardless of who is logged onto the computer implementing the media server 302. The criterion "All devices" 1108 indicates that the resources in the resource folder "C:\My videos" 1104 can be retrieved by any rendering device in the UPnP network 314.

A second entry, on the other hand, identifies a name of "C:\My photos" 1110, a user of "Donald 1112, and a device of "Kids bedroom device" 1114. By virtue of the user criterion "Donald" 1112, the resource information in the resource folder "C:\My photos" 1110 can only be retrieved when the user Donald is logged onto the currently active terminal server session on the computer implementing the media server 302 (or when Donald otherwise gives consent for the transfer of resource information, e.g., by responding affirmatively to a pop up message when a consumer in the UPnP network 314 attempts to access resource information). Still other variations on this design motif are possible. For instance, as stated above, the resource information sharing functionality 322 can be configured to provide more than two distribution criteria that govern distribution of resource information (or less than two criteria, or no criteria).

Only three resource folders 1102 are shown in FIG. 11. The media server user can select additional resource folders to share by actuating an add command button 1116. A modify command button 1118 permits the media server user to modify the existing list of shared resource folders 1102. A remove command button 1120 permits the media server user to remove resource folders from the existing collection of resource folders 1102.

As described in previous sections, a first set of criteria can govern the dissemination of resource metadata and a second set of criteria can govern the dissemination of resource content. To facilitate explanation, FIG. 11 is based on the assumption that the same set of criteria governs both the distribution of resource metadata and resource content. However, if the resource information sharing functionality 322 allows the media server user to distinguish between criteria for resource metadata and criteria for resource content, then the user interface pages can be suitably modified to display more fine-grained criteria information, and to allow the media server user to enter criteria information on a more fine-grained level. Criteria for resource metadata and criteria for resource content can be distinguished in the user interface pages in different ways, such as by allocating different user entry fields to these categories.

Figure 12:
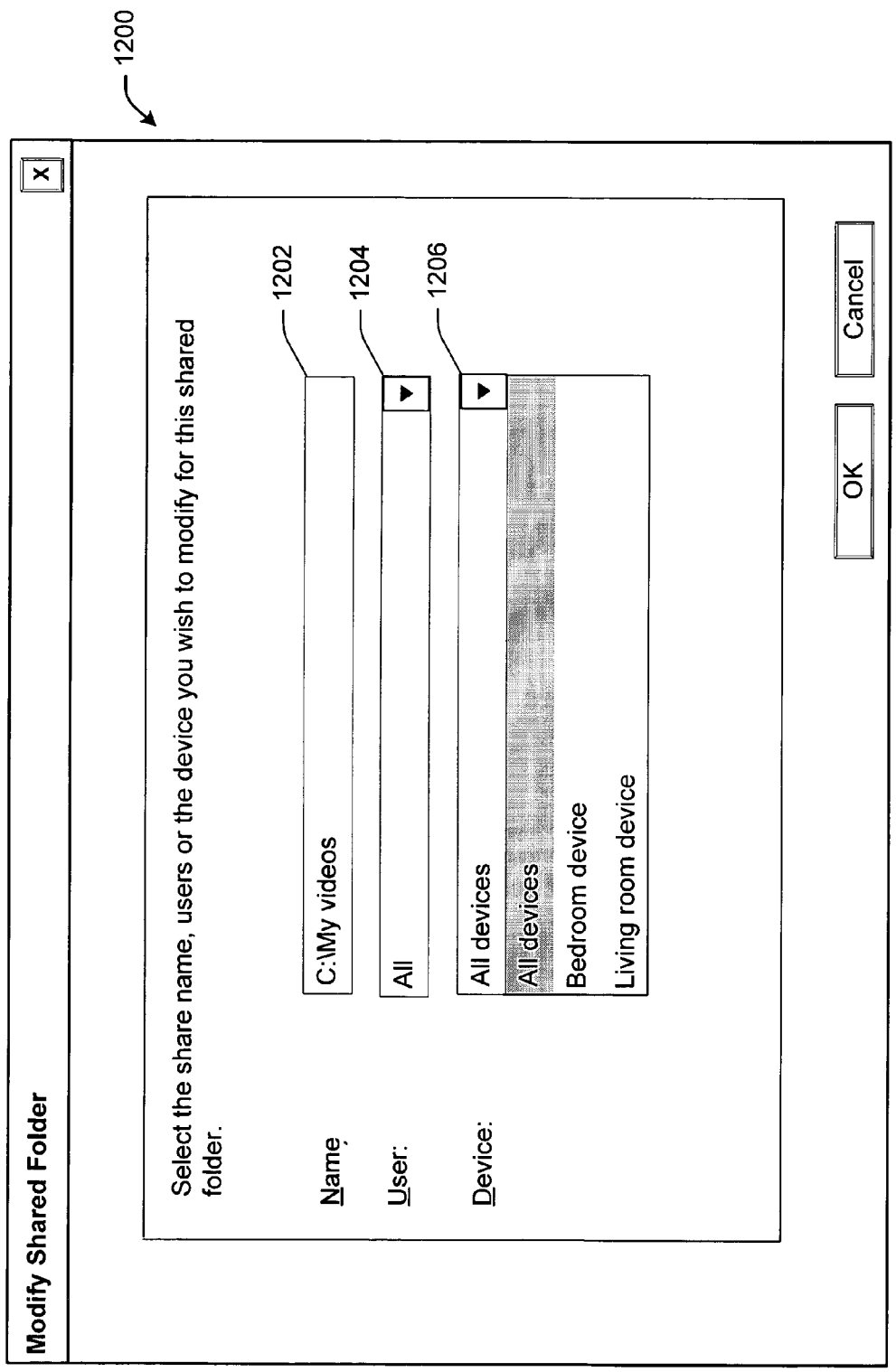

FIG. 12 shows a page 1200 that the control panel module 506 activates when the media server user presses the modify command button 1118 in FIG. 11. Assume, for instance, that the media server user highlighted the first entry 1122 in FIG. 11 (e.g., using a mouse device or other input mechanism), and then pressed the command button 1118. The resultant page 1200 depicted in FIG. 12 shows various existing properties of the first entry 1122 and gives the media server user an opportunity to change these properties.

For instance, the page 1200 identifies the share name of the resource as "My videos" 1202, the consent-related criterion as "All" 1204, and the device criterion as "All devices" 1206. The media server user can modify the first field 1202 by editing information in its associated text box (e.g., using a mouse and keyboard input devices to edit this field). The second and third field (1204, 1206) are set up as pull-down selection menus that provide predefined lists of users and devices, respectively. For instance, the pull-down selection field 1206 is expanded in FIG. 12 to show its predefined list. The media server user can select one or more entries from these pull-down lists to provide input for these two fields (1204, 1206). Other data entry techniques besides text entry boxes and pull-down menus can be used to enter the information solicited by page 1200. Once again, if the media server functionality 322 allows the media server user to discriminate between resource metadata criteria and resource content criteria, then this page 1200 can be expanded in a suitable manner to provide additional fields for data entry.

Figure 13:
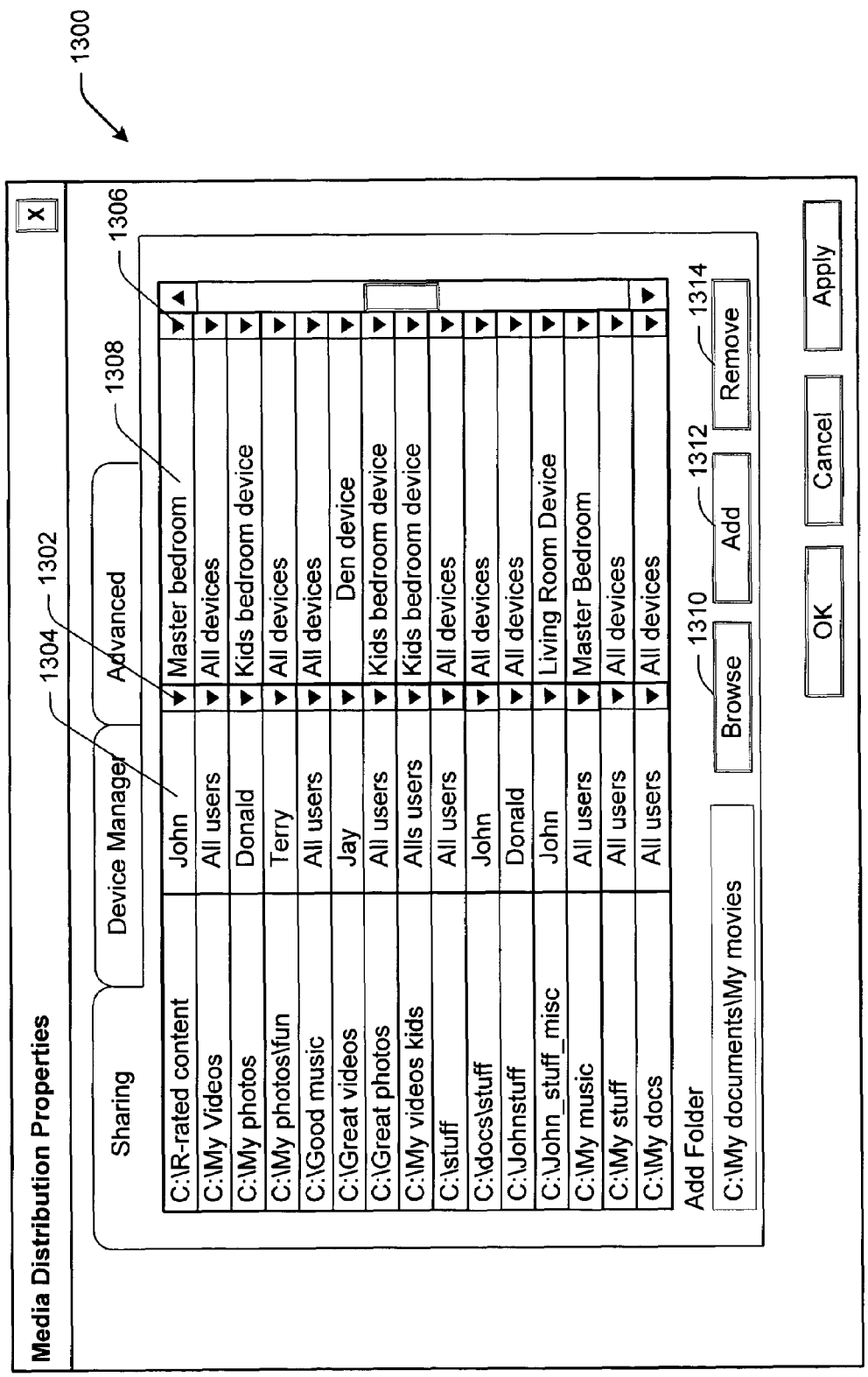

FIGS. 11 and 12 are not exhaustive of the UI strategies that can be used to select resource folders and to define dissemination criteria associated with the resource folders. FIG. 13, for instance, shows an exemplary page 1300 that provides a master display of all of the shared resource folders and their associated distribution criteria, and also allows the media server user to change any of the displayed information using this page 1300 itself (e.g., without having to call up another page). For instance, each user field and device field in this page 1300 includes respective drop-drown menus that permit the media server user to change the displayed selections for these fields. Consider, for example, the drop-down menu 1302 for exemplary user field 1304, and the drop-down menu 1306 for exemplary device field 1308. A browse command button 1310 permits the media server user to examine various directories before deciding what resource folders to add to the shared resources (e.g., by activating the add command button 1312). As before, the remove command button 1314 functions to remove a previously selected resource folder from the shared resources.

Figure 14:
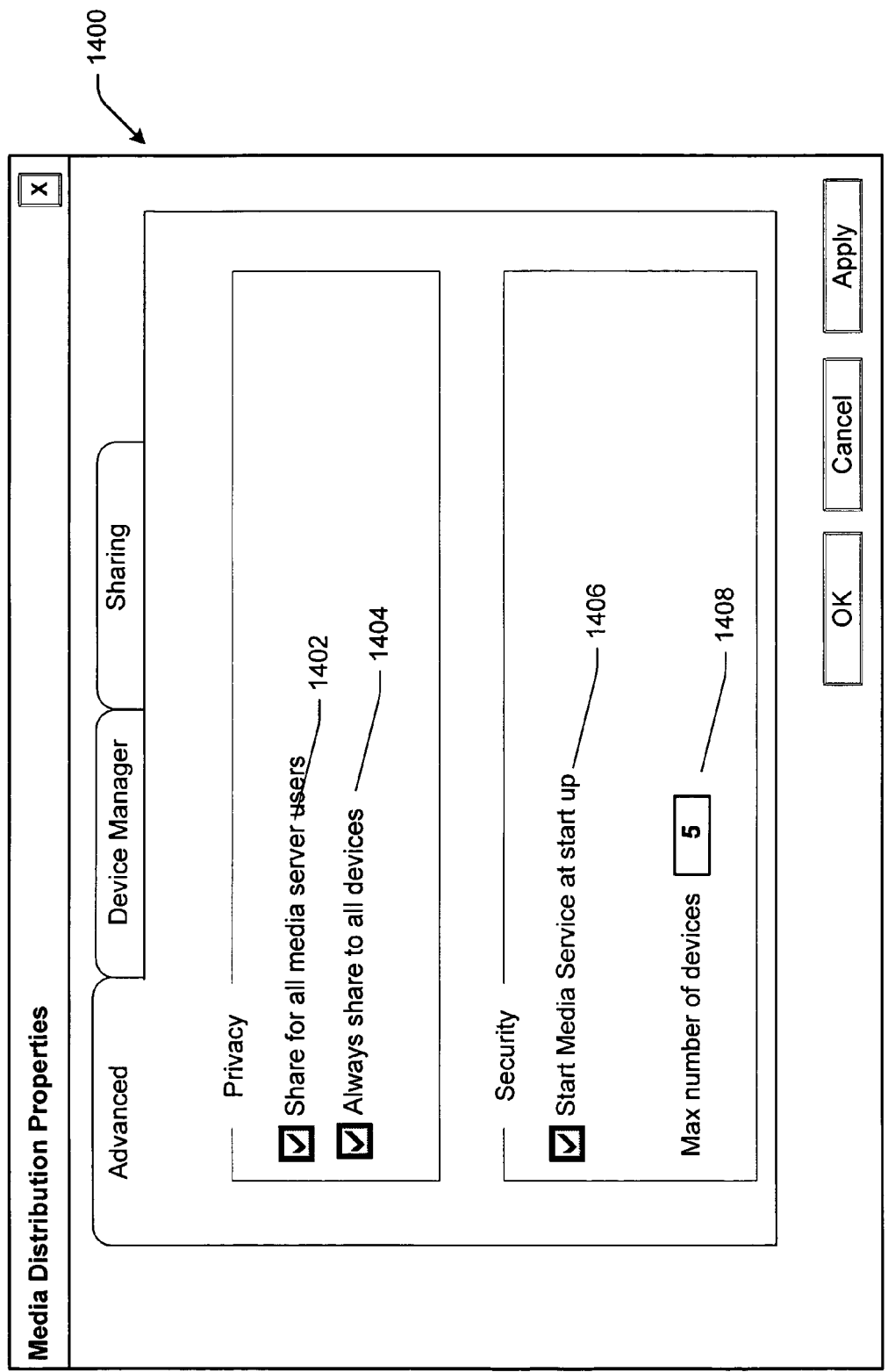

FIG. 14 shows another alternative technique for entering criteria information. The page 1400 depicted in this figure allows the media server user to specify global criteria information which affects all of the shared resource folders. That is, selection item 1402 allows the media server user to specify whether the media server 302 should share the resource information in all of the shared resource folders regardless of who is logged onto the media server 302. Selection item 1404 allows the media server user to specify whether the media server 302 should distribute all of the resource folders to all of the devices without discrimination. These selection items (1402, 1404) can receive a binary YES/NO selection from the media server user using a checkbox UI input feature, or some other kind of UI input feature.

Page 1400 also allows the media server user to make various selections that govern the security applied by the media server 302. For instance, selection item 1406 allows the media server user to specify whether the media service should be automatically started when the media server user starts up the computer implementing the media server 302. Selection item 1408 allows the media server user to specify the maximum number of devices on the network 314 that are permitted to interact with the media server 302. Similar user entry fields (not shown) can be used to allow the media server user to specify other security options pertaining to the security mechanisms discussed in Section A.5 above. For instance, if permitted, a suitable UI page can allow the media server user to selectively activate or deactivate any of the mechanisms described in Section A.5, as well as specify any relevant parameters used in these mechanisms.

Figure 15:
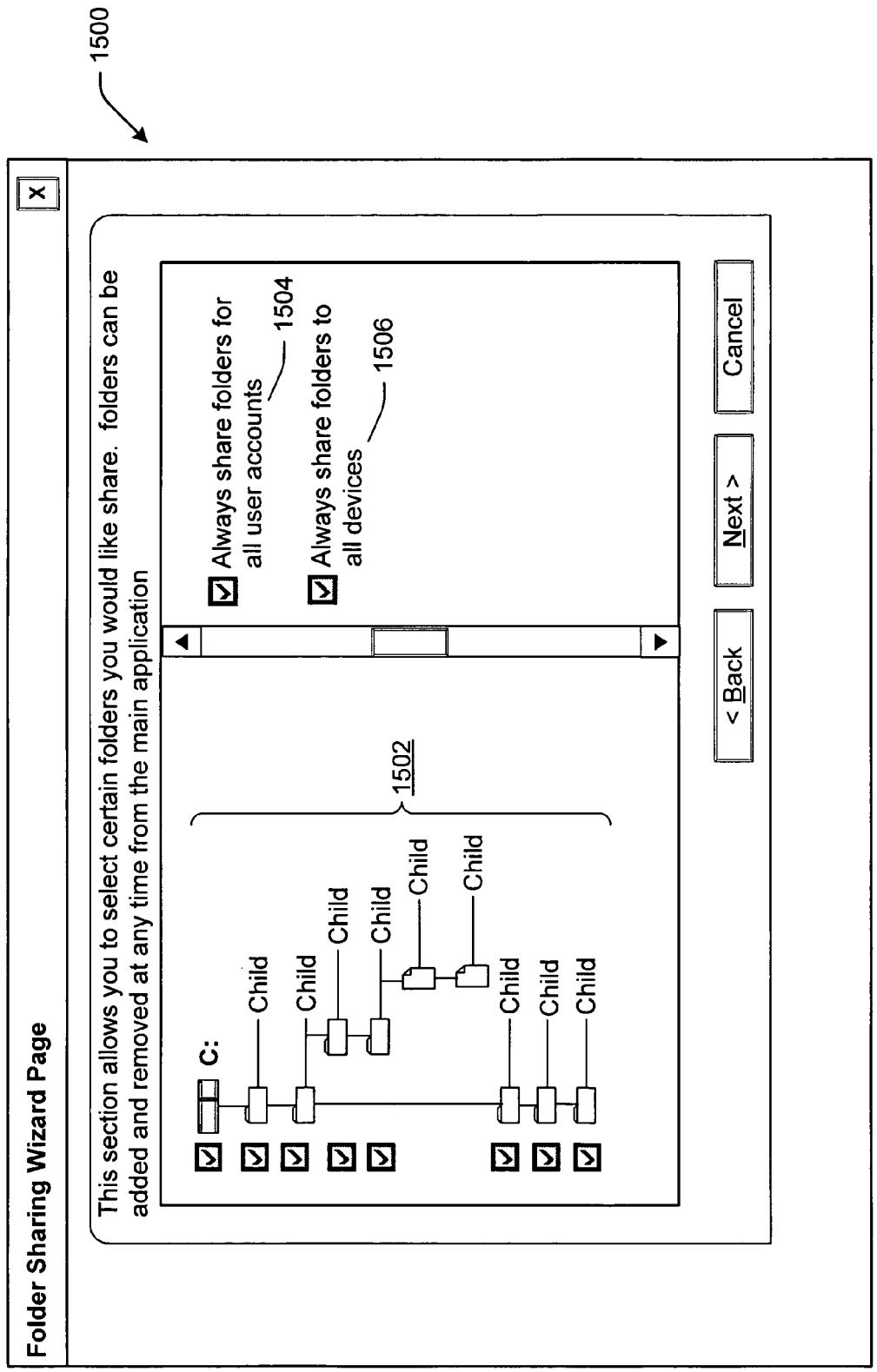

Finally, FIG. 15 shows a page 1500 that can be used as part of an automated setup procedure, commonly referred to as a "wizard." This page provides a hierarchical representation of a resource folder 1502 provided on the resource store 320 containing resources. The directory 1502 contains checkboxes positioned adjacent to each resource folder in the hierarchy. The media server user can indicate whether each of these resource folders should be shared by selectively clicking on the checkboxes next to the respective resource folders. A rightmost part of the page 1500 provides selection items (1504 and 1506) that allow the media server user to make the same global criteria selections discussed above in the context of FIG. 14.

In the above discussion, distribution criteria were assigned to resources on a per-folder basis. However, it is also possible to apply distribution criteria to resources on a per-container basis by displaying information on a per-container basis and allowing a media server user to enter information on a per-container basis.

Once again, the layout for the UI illustrated in the drawings is exemplary. Other UI strategies can allow the media server user to select from among the main topics of: Devices; Sharing; Settings; and Events. Within the Sharing category, the media server 302 can give the media server user the option of sharing resources within the resource categories of: My Music; My Pictures; My Videos, etc.

C. Exemplary Processes

Figure 16:
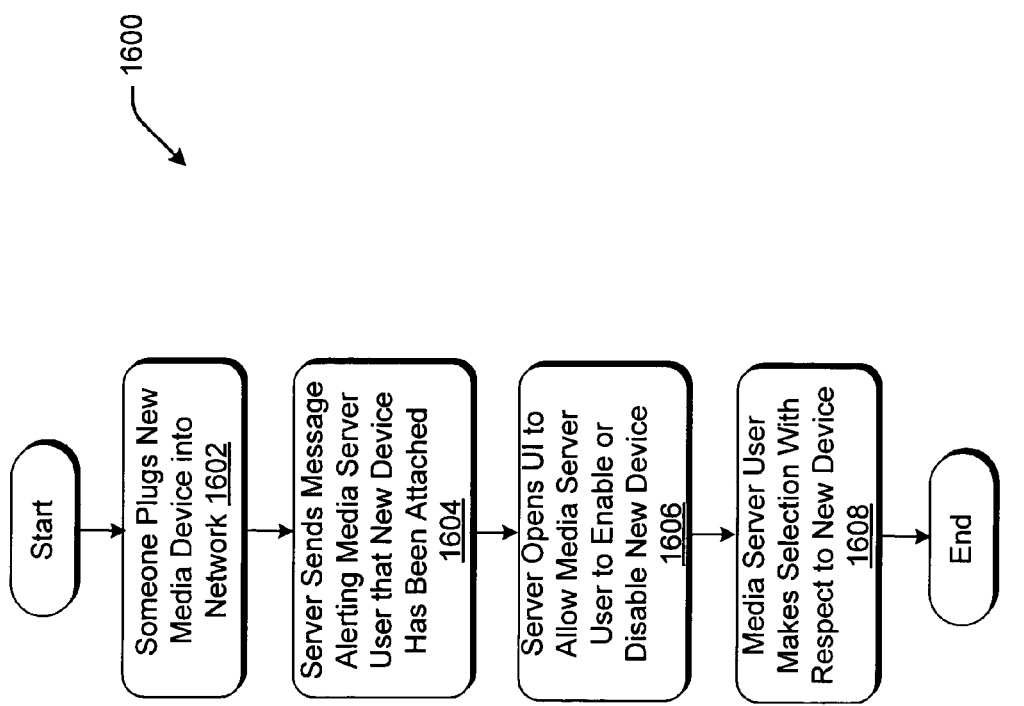
FIGS. 16-20 show exemplary procedures for enabling and disabling media devices, for defining criteria used to share resource information, and for sharing the resource information in the network architecture of FIG. 3.
Figure 17:
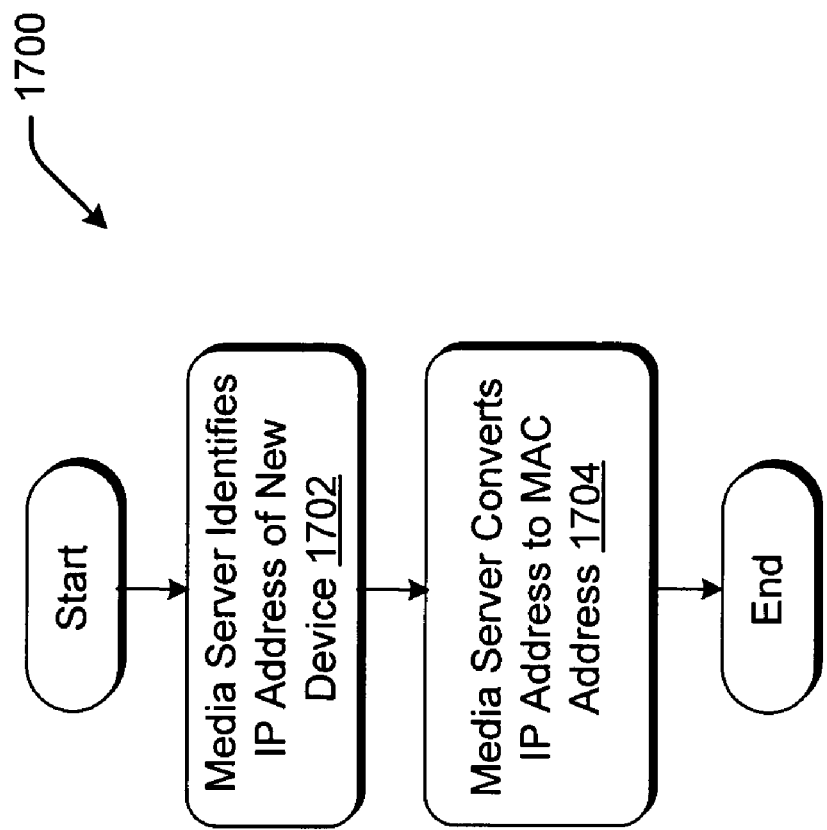
Figure 18:
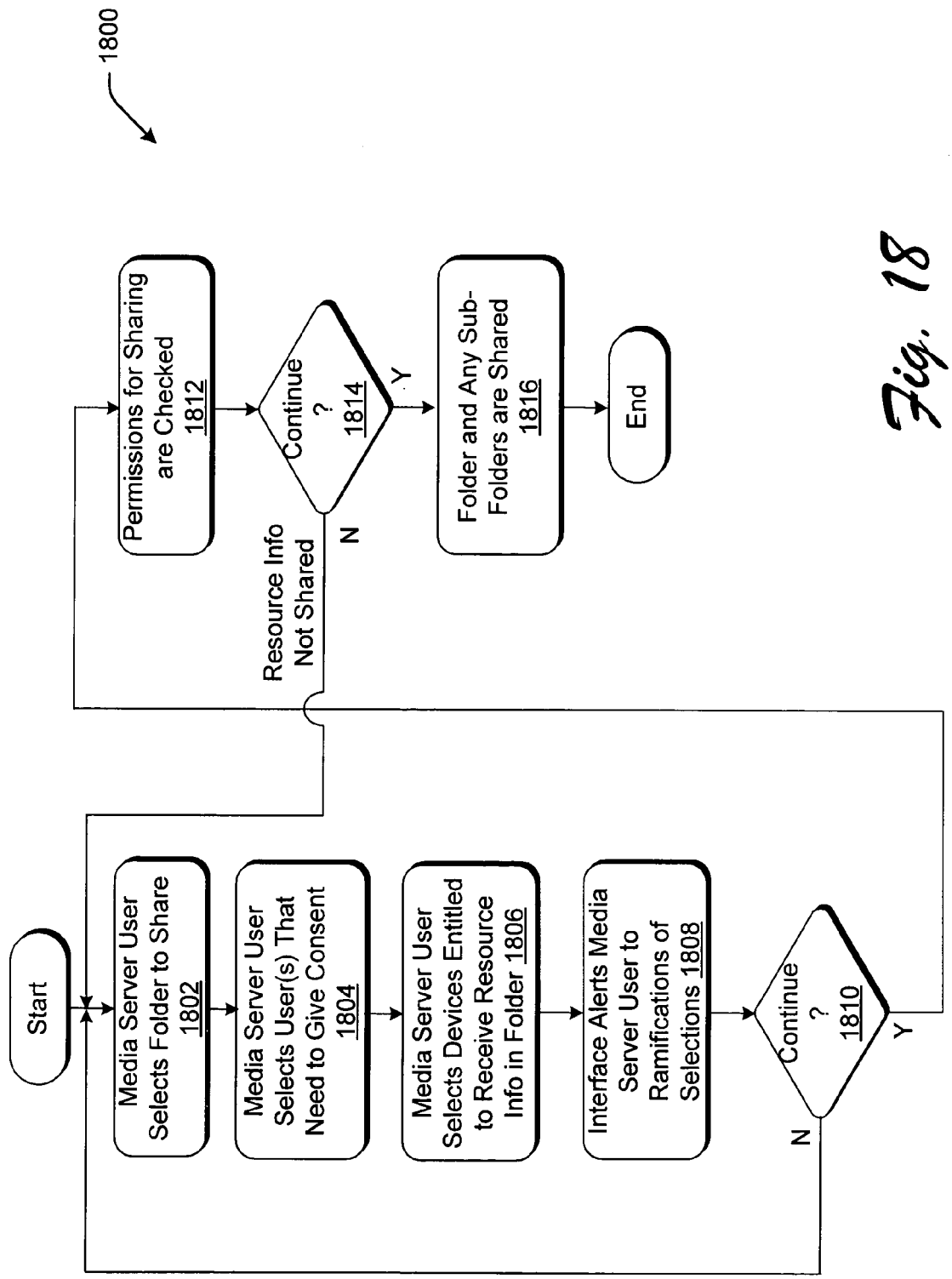
Figure 19:
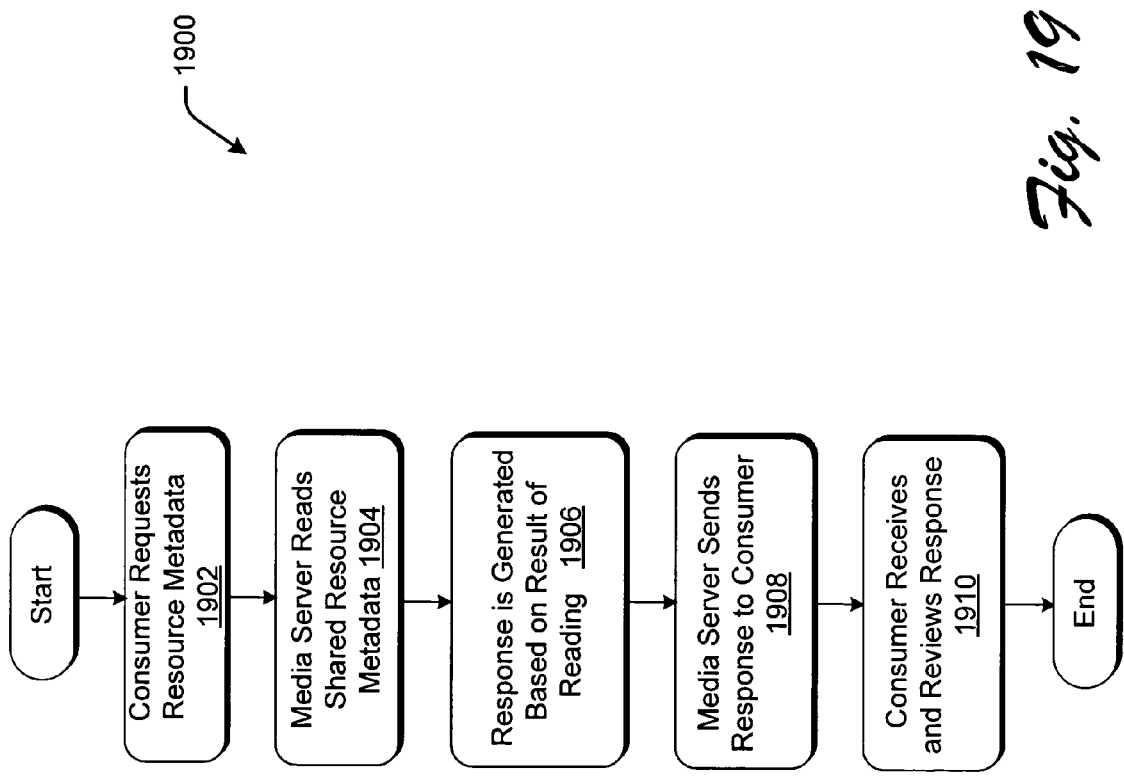
Figure 20:
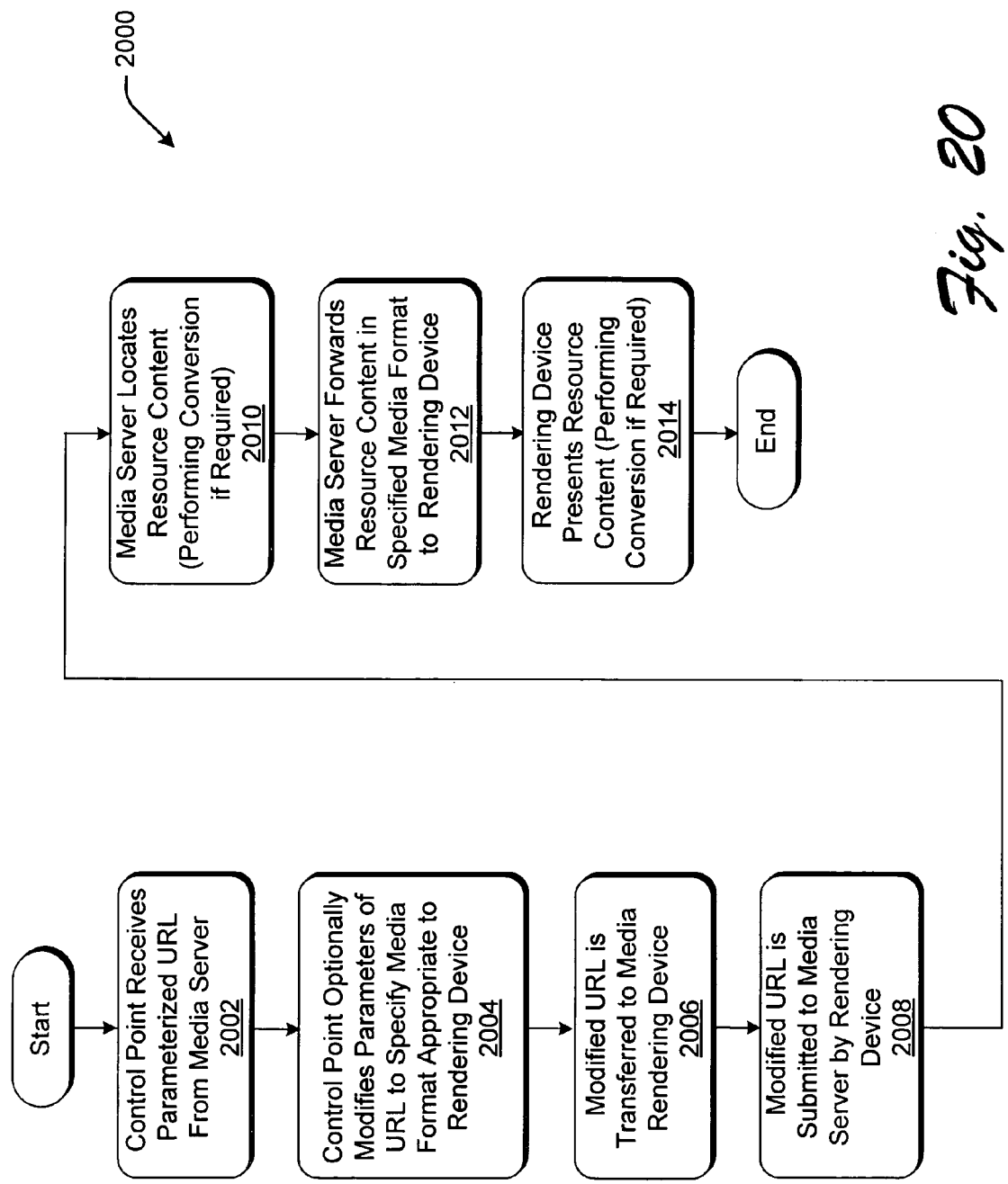

FIGS. 16 and 17 pertain to device authorization processes, and FIGS. 18-20 pertain to resource sharing processes. The individual blocks shown in these figures can be implemented in software, firmware, or a combination of firmware and software.

C.1. Device Authorization Processes

FIG. 16 shows a procedure 1600 used by the media server 302 to authorize a new device that is added to the UPnP network 314. In step 1602, someone plugs a new media device into the UPnP network 314. In step 1604, the media server 302 generates a message that alerts the media server user to the presence of the new device. FIG. 8 shows one display format that that can be used to provide this message. In step 1606, the media server 302 opens a UI page (or pages) that allow the media server user to enable the new device. FIGS. 9 and 10 provide two such exemplary UI pages for implementing this step. And in step 1608, the media server user makes a selection regarding the new device, e.g., by either enabling or disabling the new device. The media server user is also permitted to provide a user-friendly name to the new device.

FIG. 17 shows a procedure 1700 for determining the identity of a new device. In step 1702, the media server identifies the IP address of the new device. In step 1704, the media server converts the IP address to a media access control (MAC) address (or some other device-specific information). The IP address can be translated to the MAC address using, for example, the SendARP function provided by Microsoft® Corporation's Internet Protocol Helper, which uses Address Resolution Protocol. Once authorized, the device can be identified by its IP and MAC addresses in subsequent interactions with the network 314. Using the MAC address to authenticate the device is advantageous, because the IP address alone is not reliable (since IP addresses can change depending on the availability of a DHCP server).

A more in-depth explanation of operations illustrated in FIGS. 16 and 17 can be provided with reference to the architecture 500 shown in FIG. 5. When a new media rendering device is added it emits a UPnP announcement. The device monitoring module 520 detects this announcement. Similarly, the device monitoring module 520 also detects requests made by control points coupled to the UPnP network 314. In response, the device monitoring module 520 looks up the new device's IP address and gets the MAC address using SendARP( ). If the MAC address is new, the device monitoring module 520 notifies the control panel COM object 540, which, in turn notifies any callback objects 542 that already exist. The device monitoring module 520 also notifies the CDDM service module 504. The control panel callback object 542 will notify the media server user through the control panel module 506. The CDDM service module 504 will decide whether it needs to create a control panel module 506 for the currently active terminal server session, and if so, it does so.

C.2. Resource Sharing Processes

FIG. 18 shows a process 1800 that allows the media server user to select the resource folders that are to be shared, and to specify the distribution criteria used to govern the dissemination of resource information in these resource folders. FIG. 19 shows a process 1900 that allows a consumer to browse or search through shared resource metadata. FIG. 20 shows a process 2000 that allows the consumer to retrieve a selected resource content item using a parameterized URL approach.

a. Defining Shared Resources

Beginning first with FIG. 18, the procedure 1800 is merely illustrative of one of the many ways to specify shared resource folders and distribution criteria. As demonstrated in Section B above, there are many different UI strategies for collecting this information, and hence there are many associated processes for performing this task. To facilitate the discussion, it is assumed that only one set of criteria is being collected that will govern both the dissemination of the resource metadata and the resource content. In the case where the resource information sharing functionality 322 allows the media server user to discriminate between two different sets of criteria for resource metadata and resource content, then the operations shown in FIG. 18 can be suitably expanded to collect this information.

In step 1802, the media server user selects a shared resource folder. FIGS. 11-13 show just a few of the techniques that the media server user can use to perform this task.

In step 1804, the media server user selects an individual (if any) who should give their consent to the transfer of resource information. As described previously, this constraint can be construed liberally or narrowly depending on how the service is configured. In a liberal implementation, the identified individual is assumed to give their implicit consent if they are logged onto a currently active terminal server session on the computer system that implements the media server 302. In a more stringent implementation, the media server 302 specifically queries the identified individual when a consumer attempts to retrieve resource information to determine whether the identified individual approves this transfer. Transfer only occurs if the identified individual approves the transfer. If no identified individual is selected, by default, there is no consent-related constraint that affects the distribution of resources.

In step 1806, the media server user selects the devices that are authorized to receive the resource information in the selected resource folders. FIGS. 11-15 show just a few of the UI techniques that can be used to solicit the criteria collected in steps 1804 and 1806. Also, as previously noted, additional steps can be provided to collect additional criteria that affect the distribution of the resource information in the resource folders.

In step 1808, the control panel module 506 optionally alerts the media server user to the consequences of sharing resource information in the designated resource folders to the specified devices, governed by the specified consent-related user criteria. This can be performed by presenting a message explaining the constraints imposed (or the lack of constraints imposed) by the media server user's selections. After viewing such a message, the media server user may decide to revise one or more prior selections. Step 1810 indicates that the media server user can repeat one or more selections if the media server user is unhappy with the specified ramifications; else the process 1800 will continue.

In step 1812, the media server 302 determines whether the media server user has permission to share the resource information in the selected resource folder. Namely, the creator of the resource folder may have specified one or more individuals who have permission to modify, read and/or distribute the resource information in the resource folder. If the media server user is not one of these individuals, then step 1814 indicates that the resource folder cannot be shared. If the media server user is one of these individuals, then step 1814 indicates that the resource information in the resource folder can be shared, and the process 1800 thus continues.

Step 1816 entails changing the status of the selected resource folder to "shared." This step 1816 may involve registering the shared resource folder in the shared resource store 532, and storing relevant distribution criteria in the criteria information 536.

In the above discussion, distribution criteria were assigned to resources on a per-folder basis. However, it is also possible to apply distribution criteria to resources on a per-container basis in a manner analogous to that described above.

Additional general considerations relevant to the sharing of resources in resource folders are set forth below. In the discussion below, "resources" may correspond to files within resource folders stored in the resource store 320. The resource folders are indicated as having a shareable status or non-shareable status. Also recall that each resource has "resource information" that is actually disseminated, including resource metadata and resource content.

More specifically, in one exemplary implementation, the content directory service module 526 only permits media server users to designate resource folders as shareable, not individual resources in the resource folders. That is, the resources are designated as shareable by inclusion in a shareable resource folder, rather than on a resource by resource basis. Furthermore, the content directory service module 526 may permit media server users to only designate certain types of audio, video, and picture resources as shareable (such as an exemplary universe of files including: for audio files, the formats MP3, WMA, PCM, and WAV; for video files, the formats MPEG-1, 2, WMV, and AVI; and for picture formats, the formats JPEG, GIF, BMP, PNG, and TIFF). Further, the content directory service module 526 may place restrictions on designating hidden files, network shares, and removable media as shareable (that is, thereby preventing the media server user from designating these resources as shareable). These provisions may be beneficial to improve the security provided by the UPnP network 314, as unfamiliar resource information that does not fall into the above permissible categories will not be shared. In alternative implementations, however, it is possible to designate one or more of the above-identified "forbidden" resources as shareable.

In another exemplary implementation, a resource folder designated as shareable may have additional sub-collections (e.g., subfolders and files). When the media server user elects to designate any given resource folder as shareable, all resources in the shared resource folder and all its subresource folders can be automatically designated as shareable as well.

In another exemplary implementation, the media service module 502 also permits a media server user to designate a resource folder as "unshared" (e.g., to thereby remove the shareable status of a resource folder previously assigned to the resource folder). However, in one exemplary implementation, the media server user is not permitted to designate any of the sub-resources (e.g., subfolders and files) of shareable parent resources as unshareable. That is, for example, where a media server user designates "c:\doc\" as shareable, the media server user will not be permitted to designate "c:\doc\music\" as unshared, e.g., because the root resource folder "c:\doc\" has been designated as shared. However, in another implementation, the content directory service module 526 can be configured to permit selective designation of unshared resources.

In another exemplary implementation, a media server user may change the name of a resource directory designated as shared. The content directory service module 526 can track the changes of any change of name while the service is running and automatically transfer the share-related properties associated with the old name to the new name. Whenever a media server user makes a change to any of the resources that have been designated as shared, the content directory service module 526 can be configured to notify the devices coupled to the UPnP network 314 of this change. This can be performed by sending out a UPnP event.

b. Distributing Shared Resources Based on a Request

FIG. 19 shows a procedure 1900 that allows the consumer to interact with the content directory service module 526. In step 1902, the consumer requests the media server 302 to provide resource metadata regarding its resources that have been designated as shared. The consumer may make this request from a control point that is integrated or otherwise associated with a rendering device that is to eventually receive selected resource content. Alternatively, the consumer may make this request from a control point that is remote from the rendering device that will eventually receive the resource content. The consumer may specifically initiate a browse session with the media server 302, in which case the media server 302 will respond by providing resource metadata that shows a listing of available resources that have been designated as shared, perhaps within a certain category or categories. The consumer may alternatively initiate a search session with the media server 302, in which case the media server 302 will respond by performing a targeted search based on one or more search parameters specified by the consumer, and returning an indication of the search result to the consumer.

In step 1904, the media server 302 scans through the shared resource store 532 to locate any resource metadata items associated with the shared resource folders that meet the consumer's requirements. That is, this entails examining the resource metadata 534 to cull out specific resource metadata items that meet browse or searching parameters (e.g., pertaining to desired resource type, resource name, resource artist, and so on). The scanning may also entail examining the criteria information 536 to determine whether the resource metadata items that match the browse or the search terms otherwise do not satisfy specified relevant distribution criteria. For instance, the media server 302 may identify ten resource metadata items (corresponding to ten associated resources) that meet the consumer's requirements, but only three of these are permitted by the device-related criterion to be displayed at the device that the consumer is currently using (e.g., associated with the control point from which the consumer transmitted the browse or the search request).

In step 1906, the media server 302 generates an XML message that describes the results of the above-described processing. The XML message may be governed by an XML schema that specifies various fields of information that the message should contain, and in what format it should present these fields. Other formats besides XML can be used to convey this information. In step 1908, the media server 302 transmits the message from the media server 302 to the control point that the consumer is using.

In step 1910, the control point receives the XML message and translates it to a presentation format. The consumer is then permitted to view a list of resource metadata items corresponding to one or more shared resources identified by the media server 302. The consumer may select one or more resources from the list for presentation at a selected rendering device.

c. Processing of Parameterized URLs

FIG. 20 shows a process 2000 for retrieving a shared resource content item based on a URL provided in response to prior UPnP actions (e.g., browse or search actions). More specifically, the resource metadata transmitted by the media server 302 in response to a browse or a search action contains uniform resource locators (URLs) for shared resources that describe where to locate resource content items associated with the shared items. The URLs can be structured using the parameterized approach described above in Section A.6. The process 2000 shown in FIG. 20 explains a technique for processing these parameterized URLs.

In step 2002, the consumer receives resource metadata from the media server 302 at a control point, such as control point 316. This step corresponds generally to step 1910 in FIG. 19. For shared resources, the metadata typically includes at least one parameterized URL. As explained in Section A.6, the parameters in this URL specify a media format of the resource content item identified by the URL. For instance, one parameter might describe the format type in which the resource content item can be provided (such as RGB or YUV format types for an image resource). Another parameter might describe the format resolution of the resource content item (such as the height and width of a particular image resolution). These parameters are merely exemplary; additional or different parameters can be provided. In any event, when formulating a response to a browse or a search request, the media server 302 may select default values for these parameters which could, for example, reflect the media format in which the resource content item is currently being stored in the media server 302. Or the media server 302 may select default values which the media server 302 determines are best based on other considerations.

In step 2004, the control point 316 optionally changes one or more parameters in the returned parameterized URL. For instance, the URL may originally specify a certain image resolution. The control point can change the value of this parameter to accommodate the larger display resolution provided by a rendering device that will present the image.

In step 2006, the control point 316 transfers the modified (or unmodified) URL to the rendering device that will eventually render the resource content item, such as the rendering device 306.

In step 2008, the rendering device 306 can then submit the modified URL to the media server 302. This step can be performed via an HTTP GET command that includes the modified (or unmodified) URL.

In step 2010, the media server 302 receives the HTTP GET command that includes the modified (or unmodified) URL. It then retrieves the resource content item from the resource store 320. If the retrieved resource content item does not have the media format specified in the URL, then the media server 302 can convert it to the specified media format.

In step 2012, the media server 302 forwards the resource content item identified by the modified URL to the rendering device 306 for presentation at this device 306.

In step 2014, the media rendering device 306 receives and presents the resource content item sent to it by the media server 302. The rendering device 306 can also optionally convert the resource content item into another media format prior to its presentation at the rendering device 306.

Again, the procedure shown in FIG. 20 is merely one possible scenario. In another scenario, the control point 316 can transfer the original URL to the rendering device 306, and the rendering device 306 can modify it (or decide not to modify it). Thereafter, the rendering device 306 transmits this modified (or unmodified) URL to the media server 302 in the manner described above.

In FIG. 20, it was assumed that the one or more parameters in the URL contained information which specified the media format of the corresponding resource content item. However, other URLs can include parameters that specify other characteristics of the resource content items besides media format information (such as timing-related information).

Finally, the basic framework of FIG. 20 also applies where the resource metadata includes no parameterized URLs (that is, where the resource metadata includes URLs that do not have any variable parameters). In this case, the URL modifying operation shown in FIG. 20 would not be performed.

D. Exemplary Computer Environment

FIG. 21 provides information regarding a computer environment 2100 that can be used to implement any of the processing functions described in the proceeding sections, such as media server 302 functionality described in FIGS. 3 and 5. Similar computing functionality can be used to implement the control points (e.g., control points 316, 318) and any of media rendering devices (304-312), etc.

The computing environment 2100 includes the general purpose computer 2102 and the display device 2104 discussed in the context of FIG. 1. However, the computing environment 2100 can include other kinds of computer and network architectures. For example, although not shown, the computer environment 2100 can include hand-held or laptop devices, set top boxes, programmable consumer electronics, mainframe computers, gaming consoles, etc. Further, FIG. 21 shows elements of the computer environment 2100 grouped together to facilitate discussion. However, the computing environment 2100 can employ a distributed processing configuration. In a distributed computing environment, computing resources can be physically dispersed throughout the environment.

Exemplary computer 2102 includes one or more processors or processing units 2106, a system memory 2108, and a bus 2110. The bus 2110 connects various system components together. For instance, the bus 2110 connects the processor 2106 to the system memory 2108. The bus 2110 can be implemented using any kind of bus structure or combination of bus structures, including a memory bus or memory controller, a peripheral bus, an accelerated graphics port, and a processor or local bus using any of a variety of bus architectures. For example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 2102 can also include a variety of computer readable media, including a variety of types of volatile and non-volatile media, each of which can be removable or non-removable. For example, system memory 2108 includes computer readable media in the form of volatile memory, such as random access memory (RAM) 2112, and non-volatile memory, such as read only memory (ROM) 2114. ROM 2114 includes an input/output system (BIOS) 2116 that contains the basic routines that help to transfer information between elements within computer 2102, such as during start-up. RAM 2112 typically contains data and/or program modules in a form that can be quickly accessed by processing unit 2106.

Other kinds of computer storage media include a hard disk drive 2118 for reading from and writing to a non-removable, non-volatile magnetic media, a magnetic disk drive 2120 for reading from and writing to a removable, non-volatile magnetic disk 2122 (e.g., a "floppy disk"), and an optical disk drive 2124 for reading from and/or writing to a removable, non-volatile optical disk 2126 such as a CD-ROM, DVD-ROM, or other optical media. The hard disk drive 2118, magnetic disk drive 2120, and optical disk drive 2124 are each connected to the system bus 2110 by one or more data media interfaces 2128. Alternatively, the hard disk drive 2118, magnetic disk drive 2120, and optical disk drive 2124 can be connected to the system bus 2110 by a SCSI interface (not shown), or other coupling mechanism. Although not shown, the computer 2102 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 2102. For instance, the readable media can store the operating system 2130, one or more application programs 2132 (such as logic implementing the media server 302, control points (316, 318) or any of the media rendering devices (304-312) shown in FIG. 3), other program modules 2134, and program data 2136.

The computer environment 2100 can include a variety of input devices. For instance, the computer environment 2100 includes the keyboard 2138 and a pointing device 2140 (e.g., a "mouse") for entering commands and information into computer 2102. The computer environment 2100 can include other input devices (not illustrated), such as a microphone, joystick, game pad, satellite dish, serial port, scanner, card reading devices, digital or video camera, etc. Input/output interfaces 2142 couple the input devices to the processing unit 2106. More generally, input devices can be coupled to the computer 2102 through any kind of interface and bus structures, such as a parallel port, serial port, game port, universal serial bus (USB) port, etc.

The computer environment 2100 also includes the display device 2104. A video adapter 2144 couples the display device 2104 to the bus 2110. In addition to the display device 2104, the computer environment 2100 can include other output peripheral devices, such as speakers (not shown), a printer (not shown), etc.

Computer 2102 can operate in a networked environment using logical connections to one or more remote computers, such as a remote computing device 2146. The remote computing device 2146 can comprise any kind of computer equipment, including a general purpose personal computer, portable computer, a server, a router, a network computer, a peer device or other common network node, etc. Remote computing device 2146 can include all of the features discussed above with respect to computer 2102, or some subset thereof.

Any type of network can be used to couple the computer 2102 with remote computing device 2146, such as a local area network (LAN) 2148, or a wide area network (WAN) 2150 (such as the Internet). When implemented in a LAN networking environment, the computer 2102 connects to local network 2148 via a network interface or adapter 2152. When implemented in a WAN networking environment, the computer 2102 can connect to the WAN 2150 via a modem 2154 or other connection strategy. The modem 2154 can be located internal or external to computer 2102, and can be connected to the bus 2110 via serial I/O interfaces 2156 or other appropriate coupling mechanism. Although not illustrated, the computing environment 2100 can provide wireless communication functionality for connecting computer 2102 with remote computing device 2146 (e.g., via modulated radio signals, modulated infrared signals, etc.).

In a networked environment, the computer 2102 can draw from program modules stored in a remote memory storage device 2158. Generally, the depiction of program modules as discrete blocks in FIG. 21 serves only to facilitate discussion; in actuality, the programs modules can be distributed over the computing environment 2100, and this distribution can change in a dynamic fashion as the modules are executed by the processing unit 2106.

Wherever physically stored, one or more memory modules 2108, 2122, 2126, 2158, etc. can be provided to store the media server 302 functionality described in FIGS. 3 and 5. In one exemplary implementation, aspects of the functionality provided by the media server 302 can be implemented in managed code that targets Microsoft® Corporation's .NET Framework, or other virtual machine environment.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A server for disseminating resource information over a network, the server comprising:
  a processor;
  a memory;
  a media service module stored in the memory and executed on the processor to operate in a first user context to facilitate administrative access and control of the server to share resource information over the network, wherein the first user context is a clamped-down user context that provides an associated first level of access, the first level of access comprising:
    monitoring for new devices added to the network;
    detecting announcements generated by new rendering devices added to the network;
    specifying the sharing of resource information, wherein the resource information comprises a resource metadata part and a resource content part, wherein the resource content part comprises media content and the resource metadata part describes attributes of the resource content part;
  a supplemental module stored in the memory and executed on the processor to operate in a second user context to facilitate an additional administrative access and control of the server to assist the media service module in sharing resource information over the network, wherein the second user context is a local system user context that provides an associated second level of access to resource information, wherein the second level of access is greater than the first level of access, wherein the second user context is operable to grant the first user context permission to access resource information associated with the second level of access;
  logic to provide multiple instances of a configuration and control panel module associated with multiple respective users that are logged onto the server, wherein:
    the multiple instances of the configuration and control panel module exist at the same time;
    the multiple respective users are logged onto the server at the same time;
    each respective user comprises an administrative user that performs administrative functions on the server comprising specifying the sharing of resource information;
    each respective user is permitted to start up at most one instance of the configuration and control panel module in a particular terminal service session;
    a private application program interface (API) facilitates communication between each instance of the configuration and control panel module and the media service module; and
    each instance of the configuration and control panel module is required to provide a callback object to the media service module, wherein the media service module notifies each instance of the configuration and control panel module of a unique client ID by using the associated provided callback object, wherein the requiring to provide the call back object to the media service module prevents a rogue application from masquerading as an instance of the configuration and control panel module and accessing the media service module via the private API; and
  logic to notify the callback object of concurrently active instances of the configuration and control panel module, when any instance of the configuration and control panel module modifies global data.

2. The server according to claim 1, wherein the network is configured as a Universal Plug and Play (UPnP) network.

3. The server according to claim 1, wherein the one or more instances of the configuration and control panel module operate in a third user context to interact with a user.

4. The server according to claim 3, wherein the third user context is a logged on user's user context that provides a level of access associated with a user who has logged onto the server.

5. The server according to claim 1, wherein the clamped down context is a local service user context.

6. The server according to claim 1, wherein the clamped down context is a network service user context.

7. The server according to claim 1, wherein the media service module includes a store that identifies shared resources to be shared out over the network.

8. The server according to claim 7, wherein the store includes plural repositories.

9. The server according to claim 8, where the plurality repositories correspond to separate drives accessible by the server.

10. The server according to claim 7, wherein the store includes resource metadata associated with the shared resources.

11. The server according to claim 10, wherein the store provides the resource metadata separately from its associated resources so that the resource metadata can be readily accessed.

12. The server according to claim 11, wherein the media service module further includes logic configured to update the resource metadata in the store upon changes in the associated resources.

13. The server according to claim 7, wherein the store includes at least one distribution criterion that governs the distribution of resource information over the network.

14. The server according to claim 13, wherein the store allocates two separate stores for storing the resource metadata and said at least one distribution criterion.

15. The server according to claim 13, wherein the store allocates a single store for storing the resource metadata and said at least one distribution criterion.

16. The server according to claim 1, wherein the media service module is configured to allow the user to organize member resources in a resource folder.

17. The server according to claim 16, wherein the media service module is configured to reorganize the member resources in the resource folder into at least one resource container.

18. The server according to claim 16, wherein the media service module is configured to allow the user to associate at least one distribution criteria with the folder resource.

19. The server according to claim 1, wherein the resource information includes resource metadata, and the media service module includes a content directory service module for serving out the resource metadata over the network in response to a browse or search request.

20. The server according to claim 19, wherein the content directory service module is configured to share out the resource metadata in response to the browse or search request on condition that at least one relevant distribution criterion is satisfied.

21. The server according to claim 1, wherein the resource information includes resource content, and the media service module includes a resource transfer module for serving out the resource content over the network in response to a resource content request.

22. The server according to claim 21, wherein the resource transfer module is an HTTP server for serving out resource content, and the resource content request is an HTTP request.

23. The server according to claim 21, wherein the resource transfer module is configured to share out the resource content in response to a resource content request on condition that at least one relevant distribution criterion is satisfied.

24. The server according to claim 1, wherein the media service module is configured to store an indication of recipient entities that are permitted to receive shared resource information, and wherein the media service module is configured to disseminate resource information in accordance with the stored indication.

25. The server according to claim 1, wherein the media service module is configured to prohibit the sharing of resource information corresponding to a resource if at least one of the following conditions is true:
the resource is stored on a removable memory media;
the resource resides remotely on the network with respect to the server;
a user who is attempting to share the resource does not have permission to access the resource;
the resource is stored in a hidden file or a subfolder; and
the resource is stored in a file having a media type that does not conform to a list of media types known by the server that the server is configured to share out.

26. The server according to claim 1, wherein the media service module includes an object configured to allow each instance of the configuration and control module to establish resources to be shared, to define distribution criteria associated therewith, and to authorize new devices added to the network.

27. The server according to claim 1, wherein the supplemental module includes logic configured to:
change an access permission attribute associated with at least one resource to allow the media service module to access said at least one resource; and
signal the media service module when a user has logged onto the server or has connected to a previously logged on session.

28. The server according to claim 1, wherein the supplemental module includes logic configured to:
change an access permission attribute associated with at least one resource to allow the media service module to access said at least one resource;
start the configuration and control panel module of the user context of a currently active logged on user upon the occurrence of at least one event; and
signal the media service module when a user has logged onto the server or has connected to a previously logged on session.

29. The server according to claim 28, wherein the event corresponds to at least one of:
detection of a new device joining the network;
detection of a warning condition associated with the network; and
detection of a warning condition on a computer system used to implement the server.

30. The server according to claim 1, wherein each instance of the configuration and control panel module includes logic configured to perform at least one of:
process the addition and/or removal of devices to the network;
manage resources having resource information to be shared out over the network and distribution criteria which govern the dissemination of the resource information;
start and stop the server; or
start and stop resource sharing functionality provided by the server for sharing out resource information.

31. The server according to claim 30, wherein the logic configured to process the addition and/or removal of devices to the network includes logic configured to:
receive notification of the addition and/or removal of devices to the network from the media service module;
inform a user of the addition and/or removal of said devices; and
allow the user to authorize or deny the addition and/or removal of said devices.

32. The server according to claim 1, wherein the server includes logic configured to ensure that no individual user session has generated more than one instance of the configuration and control panel module.

33. The server according to claim 1, wherein the callback object is used by an instance of the configuration and control panel module to interact with the media service module, the interaction comprising a notification of server events, the server events comprising:
   service shutdown;
   background data changes;
   discovery of a new control point; and
   discovery of a new media rendering device.

34. The server according to claim 33, wherein, when the supplemental module starts up the instance of the configuration and control panel module, the configuration and control panel module is configured to call an initialization function with the callback object.

35. The sever according to claim 33, wherein, when the user starts the instance of the configuration and control panel module, the configuration and control panel module is configured to call an initialization function with the callback object.

36. The server according to claim 1, wherein multiple users can be logged onto a computer system hosting the server at the same time, and wherein the server is configured to discriminate between the users based on terminal service session IDs extracted from respective client tokens associated with the users.

37. A computer readable medium encoded with machine executable instructions for implementing each of the media service module and the supplemental module, recited in claim 1.

38. A computer readable medium encoded with machine executable instructions for implementing each of the media service module, the supplemental module, and the configuration and control panel module recited in claim 1.

39. A server for disseminating resource information over a network, the server comprising:
   a processor;
   a memory;
   a media service module stored in the memory and configured to be executed on the processor to operate in a first user context to facilitate administrative access and control of the server, and configured to share resource information over the network, wherein the first user context is a clamped-down user context that provides an associated first level of access, the first level of access comprising:
   monitoring for new devices added to the network;
   detecting announcements generated by new rendering devices added to the network;
   responding to a request for resource information presentation to a rendering device made by a control point device coupled to the network;
   specifying the sharing of individual parts of resource information, wherein the individual parts of resource information comprise resource metadata parts and resource content parts;
   a private application program interface (API) to facilitate communications between an administrative configuration and control panel module and the media service module;
   a supplemental module stored in the memory and configured to be executed on the processor to operate in a second user context to facilitate an additional administrative access and control of the server, and configured to assist the media service module in sharing resource information over the network, wherein:
   the second user context is a local system user context that provides an associated second level of access to resource information;
   the second level of access is greater than the first level of access;
   the second user context is operable to grant the first user context permission to access resource information associated with the second level of access, the second level of access comprising:
   reading of stored resource information;
   deleting of stored resource information; and
   writing to stored resource information;
   in response to an event, the second user context starts an administrative configuration and control panel module to operate in a third user context configured to interact with a user, wherein:
   upon startup, the administrative configuration and control panel module is required to call an initialize method in the media service module and provide a required call back object to the media service module, wherein the media service module uses the callback object to supply a client ID to the administrative configuration and control panel module, wherein when the private API is reverse-engineered, thereby facilitating a rogue application to masquerade as an administrative configuration and control panel module to maliciously access the media service module, the requirement that the rogue application provide the callback object to the media service module presents an additional hurdle to the rogue application, preventing the rogue application from accessing the media service module;
   when the administrative configuration and control panel module attempts to interact with the media service module on another occasion, the administrative configuration and control panel module provides its client ID to the media service module for verification of the authenticity of the administrative configuration and control panel module; and
   the administrative configuration and control panel module facilitates a user to perform functions on the server, the functions comprising:
   processing the addition and/or removal of devices to the network;
   managing resources having resource information to be shared out over the network and distribution criteria which govern the dissemination of the resource information;
   specifying distribution criteria for resource content parts and resource metadata parts of the resource information;
   starting and/or stopping the server; and
   starting and/or stopping resource sharing functionality provided by the server for sharing out resource information.

* * * * *